US012591113B2

(12) United States Patent
Lee et al.

(10) Patent No.: US 12,591,113 B2
(45) Date of Patent: Mar. 31, 2026

(54) LENS ASSEMBLY AND ELECTRONIC APPARATUS INCLUDING THE SAME

(71) Applicant: Samsung Electronics Co., Ltd., Gyeonggi-do (KR)

(72) Inventors: Hwanseon Lee, Gyeonggi-do (KR); Haneung Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 707 days.

(21) Appl. No.: 17/666,785

(22) Filed: Feb. 8, 2022

(65) Prior Publication Data

US 2022/0269048 A1      Aug. 25, 2022

Related U.S. Application Data

(63) Continuation of application No. PCT/KR2022/001855, filed on Feb. 7, 2022.

(30) Foreign Application Priority Data

Feb. 8, 2021      (KR) ........................ 10-2021-0017871

(51) Int. Cl.
*G02B 13/00*      (2006.01)
*G02B 15/14*      (2006.01)
(Continued)

(52) U.S. Cl.
CPC . *G02B 13/0035* (2013.01); *G02B 15/143503* (2019.08); *G03B 5/00* (2013.01);
(Continued)

(58) Field of Classification Search
CPC ........ G02B 1/02; G02B 1/041; G02B 3/0087; G02B 3/04; G02B 13/0035; G02B 13/006;
(Continued)

(56) References Cited

U.S. PATENT DOCUMENTS 5,899,585 A      5/1999  Ogawa
6,885,507 B2     4/2005  Eguchi
(Continued)

FOREIGN PATENT DOCUMENTS

CN      208013518 U   * 10/2018   .......... G02B 13/004
CN      111133357 A      5/2020
(Continued)

OTHER PUBLICATIONS

Gross, H. (Ed.). (2005). Handbook of Optical Systems, vol. 3: Aberration Theory and Correction of Optical Systems (vol. 3), 377-379. Wiley-Vch.*
(Continued)

*Primary Examiner* — Travis S Fissel

*Assistant Examiner* — Daniel J. Jordan

(74) *Attorney, Agent, or Firm* — Sughrue Mion, PLLC

(57)      ABSTRACT

A lens assembly and an electronic apparatus having the lens assembly are disclosed. The disclosed lens assembly includes a plurality of lenses arranged from an object side to an image side, the image side being where an image sensor is located, and includes a first lens group having negative refractive power, a second lens group having positive refractive power, and a third lens group having negative refractive power. During zooming, the second lens group and the third lens group move to the object side, and the third lens group performs focusing. In addition, various other embodiments are possible.

19 Claims, 37 Drawing Sheets

(51) Int. Cl.
   *G02B 27/64* (2006.01)
   *G03B 5/00* (2021.01)

(52) U.S. Cl.
   CPC .... *G02B 27/646* (2013.01); *G03B 2205/0007* (2013.01); *G03B 2205/0046* (2013.01)

(58) Field of Classification Search
   CPC .. G02B 13/0065; G02B 13/009; G02B 13/18; G02B 15/143503; G02B 27/646; G02B 2003/0093; G03B 5/00; G03B 30/00; G03B 2205/0007; G03B 2205/0046
   USPC .... 359/207.3, 354, 441, 556, 645, 676, 677, 359/680, 682, 689, 695, 708, 716, 735, 359/745, 748, 749, 753, 784, 786, 787, 359/788
   See application file for complete search history.

(56) References Cited

U.S. PATENT DOCUMENTS

| | | | |
|---|---|---|---|
| 8,456,748 | B2 | 6/2013 | Saori |
| 8,472,125 | B2 | 6/2013 | Fakuta |
| 9,148,576 | B2 * | 9/2015 | Iwasawa ................ H04N 23/69 |
| 9,541,747 | B2 | 1/2017 | Chou et al. |
| 10,185,131 | B2 | 1/2019 | Fujikura et al. |
| 10,663,706 | B2 | 5/2020 | Lee et al. |
| 10,908,387 | B2 | 2/2021 | Lee |
| 2013/0342749 | A1 | 12/2013 | Tashiro |
| 2016/0147050 | A1 * | 5/2016 | Fujikura .............. H04N 23/663 359/689 |
| 2019/0086638 | A1 | 3/2019 | Lee |
| 2021/0026117 | A1 * | 1/2021 | Yao ...................... G02B 13/004 |

FOREIGN PATENT DOCUMENTS

| | | | |
|---|---|---|---|
| JP | 5-27171 A | | 2/1993 |
| JP | 2003-315677 A | | 11/2003 |
| JP | 2014026264 A | | 2/2014 |
| JP | 5615674 B2 | | 10/2014 |
| JP | 6165252 B | | 7/2017 |
| KR | 10-0296332 B1 | | 11/2001 |
| KR | 20020066251 A | * | 8/2002 |
| KR | 10-2019-0032905 A | | 3/2019 |
| WO | 2009/063766 A1 | | 5/2009 |

OTHER PUBLICATIONS

Google Patents translation of Yoon (KR 20020066251 A).*
Translation of Bao et al. (CN 208013518 U) (Year: 2018).*
Extended European Search Report dated Mar. 19, 2024.
Korean Office Action dated Jul. 22, 2025.
Communication issued Nov. 14, 2025 by the European Patent Office in European Patent Application No. 22750081.6.

* cited by examiner

Figure 1:
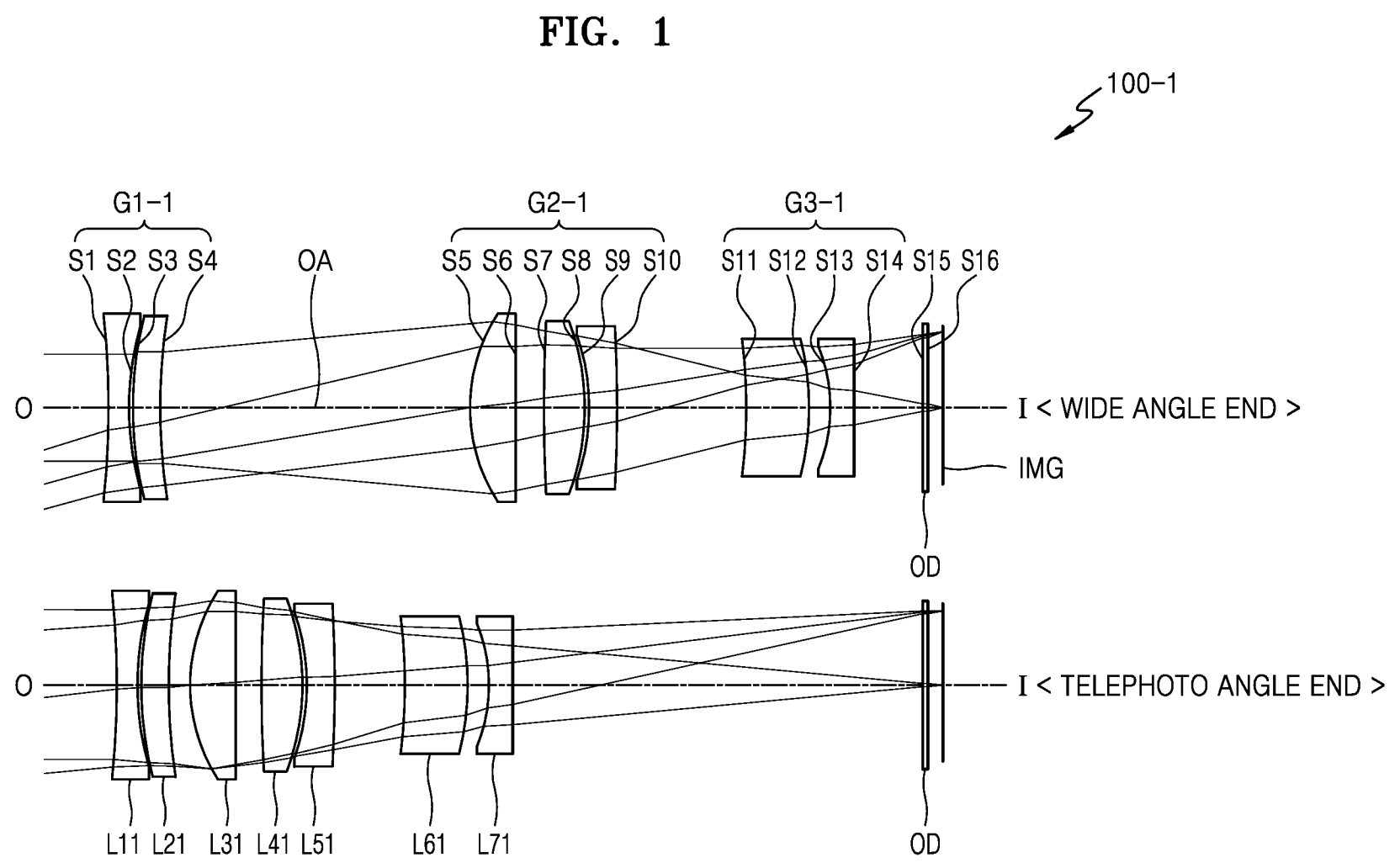

< WIDE ANGLE END >

G1-1
S1 S2 S3 S4

OA

G2-1
S5 S6 S7 S8 S9 S10

G3-1
S11 S12 S13 S14 S15 S16

I < WIDE ANGLE END >

IMG

OD

O

< TELEPHOTO ANGLE END >

L11 L21 L31 L41 L51 L61 L71

I < TELEPHOTO ANGLE END >

I < WIDE ANGLE END >

I < TELEPHOTO ANGLE END >

IMG

Figure 24:
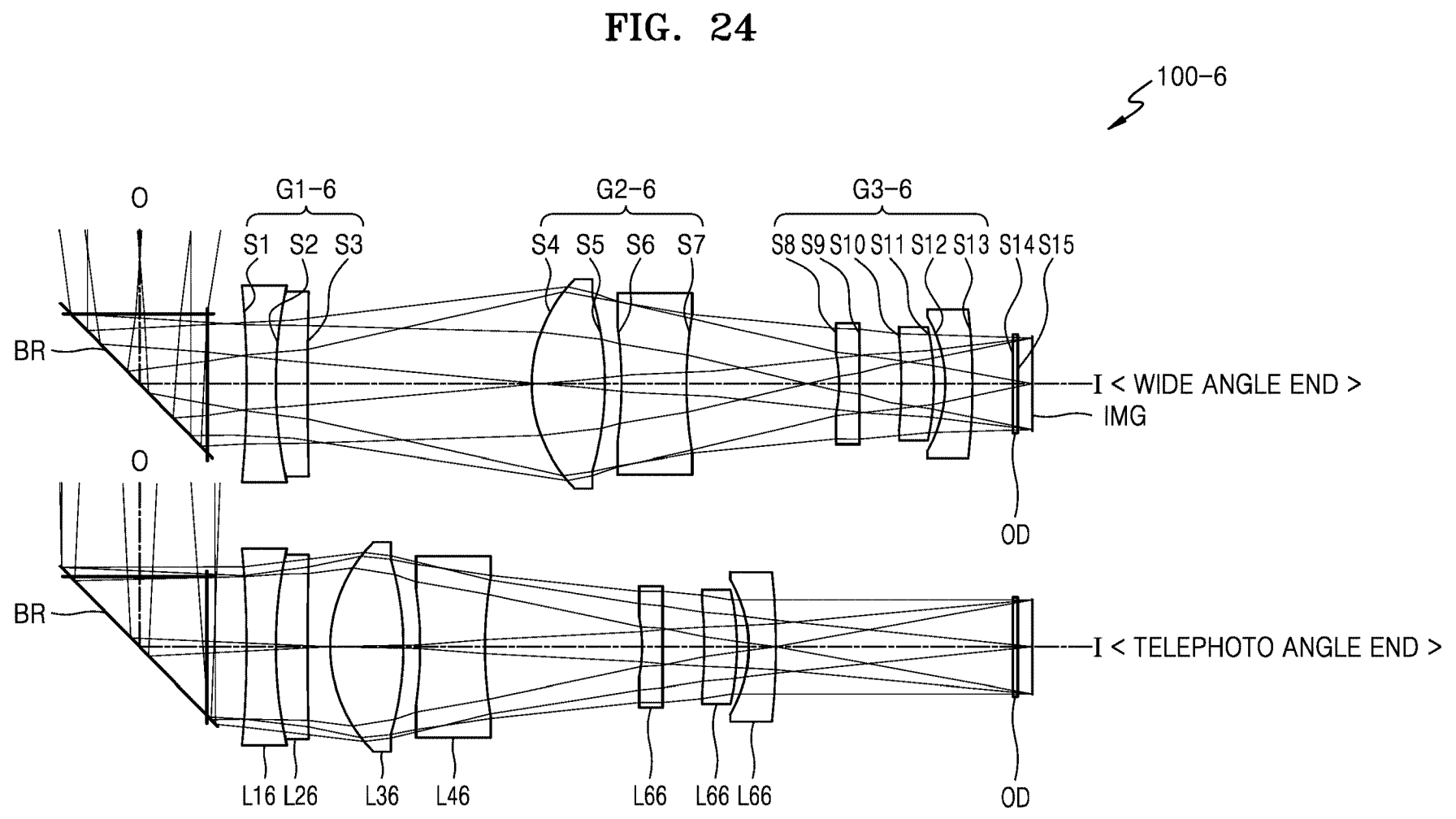

< WIDE ANGLE END >

IMG

OD

S8 S9 S10 S11 S12 S13 S14 S15

G3-6

S4 S5 S6 S7

G2-6

S1 S2 S3

G1-6

O

BR

< TELEPHOTO ANGLE END >

< WIDE ANGLE END >

I

IMG

OD

O

< TELEPHOTO ANGLE END >

LENS ASSEMBLY AND ELECTRONIC APPARATUS INCLUDING THE SAME

CROSS-REFERENCE TO RELATED APPLICATION(S)

This application is a continuation of International Application No. PCT/KR2022/001855, filed on Feb. 7, 2022, which is based on and claims priority to Korean Patent Application No. 10-2021-0017871, filed on Feb. 8, 2021, in the Korean Intellectual Property Office, the disclosure of which is incorporated by reference herein in its entirety.

TECHNICAL FIELD

One or more embodiments of the disclosure generally relate to a lens assembly and an electronic apparatus including the lens assembly, and more particularly, to a compact lens assembly and an electronic apparatus including the lens assembly.

BACKGROUND ART

Various services and functions provided by an electronic apparatus have gradually increased. Electronic apparatuses, for example, mobile devices or user devices, may provide various services through various sensor modules. Electronic apparatuses may provide multimedia services, for example, photo services or video services. As the use of electronic apparatuses increases, the use of cameras of the electronic apparatus is also gradually increasing. According to such user demand, the performance, resolution, etc. of the cameras of the electronic apparatuses have improved. Various types of photos such as landscapes, portraits, or selfies may be taken by using the cameras of electronic apparatuses. Such multimedia, for example, photos or videos, may be shared by social network sites or other media.

When a plurality of optical apparatuses are mounted on electronic apparatuses, the quality of captured images are improved, and also, various visual effects may be applied to the captured image. For example, object images may be obtained through a plurality of cameras such as telephoto camera and wide angle camera. These plurality of cameras may have different optical characteristics, and captured images may be obtained by synthesizing the obtained object images using computational photography. Such an optical apparatus may be mounted on electronic apparatuses specialized for image capture, such as digital cameras, and on compact portable electronic apparatuses, such as mobile communication terminals.

As the number of optical apparatuses being used in portable devices increases, demand for miniaturization has increased. However, aberration control is difficult due to the miniaturization of lens assemblies.

SUMMARY

Provided is a compact lens assembly in an electronic apparatus such as a mobile terminal.

Furthermore, provided is an electronic apparatus including a compact lens assembly.

According to an embodiment of the disclosure, in a lens assembly including a plurality of lenses that are arranged from an object side to an image side, the image side being where an image sensor is located, the lens assembly includes a first lens group having negative refractive power, a second lens group having positive refractive power, and a third lens group having negative refractive power, wherein, during zooming, the second lens group and the third lens group move to the object side, and the third lens group performs focusing, wherein the lens assembly satisfies the following inequalities, $$TL/ft < 1.26 \text{ and}$$

$$ft/fw \geq 2.$$

In the equalities, TL denotes a distance from an apex of an object side surface of a first lens to a surface of the image sensor, ft denotes a total focal length at a telephoto angle end, and fw denotes a total focal length at a wide angle end.

According to another embodiment of the disclosure, an electronic apparatus includes a lens assembly, at least one camera configured to acquire information about an object from light incident through the lens assembly, and an image signal processor configured to process an image of the object on the basis of the information, wherein the lens assembly includes a first lens group having negative refractive power, a second lens group having positive refractive power, and a third lens group having negative refractive power, the first to third lens groups being arranged from an object side to an image side, the image side being where an image sensor is located, wherein, during zooming, the second lens group and the third lens group move to the object side, and the third lens group performs focusing, wherein the lens assembly satisfies the following inequalities, $$TL/ft < 1.26 \text{ and}$$

$$ft/fw \geq 2.$$

In the inequalities, TL denotes a distance from an apex of an object side surface of a first lens to a surface of the image sensor, ft denotes a total focal length at a telephoto angle end, and fw denotes a total focal length at a wide angle end.

A lens assembly according to an embodiment of the disclosure may be, for example, compact, and may perform focusing. A lens assembly according to an embodiment of the disclosure may facilitate aberration correction by appropriately distributing the refractive power of its lenses. Furthermore, an electronic apparatus including a lens assembly according to an embodiment of the disclosure may be, for example, compact, and may capture multimedia, for example, photos, videos, and the like, with high performance. Furthermore, a lens assembly according to an embodiment of the disclosure may include a reflection member, and may perform image stabilization by using the reflection member.

In addition, various effects identified directly or indirectly through this document may be provided.

BRIEF DESCRIPTION OF DRAWINGS

FIG. 1 illustrates a lens assembly of a first numerical example according to an embodiment of the disclosure.

FIG. 4A illustrates an example in which an optical path is bent when the lens assembly of the first numerical example illustrated in FIG. 1 includes a reflection member.

FIG. 4B illustrates an example in which lenses of the lens assembly illustrated in FIG. 4A are cut to fit the short side of an image sensor.

FIG. 5 illustrates a lens assembly of a second numerical example according to an embodiment of the disclosure.

FIG. 8 illustrates an example in which an optical path is bent when the lens assembly of the second numerical example illustrated in FIG. 5 includes the reflection member.

FIG. 9 illustrates a lens assembly of a third numerical example according to an embodiment of the disclosure.

FIG. 12 illustrates an example in which an optical path is bent when the lens assembly of the third numerical example illustrated in FIG. 9 includes the reflection member.

FIG. 13 illustrates a lens assembly of a fourth numerical example according to an embodiment of the disclosure.

FIG. 16 illustrates an example in which an optical path is bent when the lens assembly of the fourth numerical example illustrated in FIG. 14 includes the reflection member.

FIG. 17 illustrates a lens assembly of a fifth numerical example according to an embodiment of the disclosure.

FIG. 20 illustrates an example in which an optical path is bent when the lens assembly of the fifth numerical example illustrated in FIG. 17 includes the reflection member.

FIG. 21 illustrates a lens assembly of a sixth numerical example according to an embodiment of the disclosure.

FIG. 24 illustrates an example in which an optical path is bent when the lens assembly of the sixth numerical example illustrated in FIG. 21 includes the reflection member.

FIG. 25 illustrates a lens assembly of a seventh numerical example according to an embodiment of the disclosure.

FIG. 28 illustrates an example in which an optical path is bent when the lens assembly of the seventh numerical example illustrated in FIG. 25 includes the reflection member.

FIG. 29 illustrates a lens assembly of an eighth numerical example according to an embodiment of the disclosure.

FIG. 32 illustrates an example in which an optical path is bent when the lens assembly of the eighth numerical example illustrated in FIG. 29 includes the reflection member.

FIG. 34 illustrates a rear side of a mobile device including a lens assembly according to an embodiment of the disclosure.

DETAILED DESCRIPTION

Figure 2:
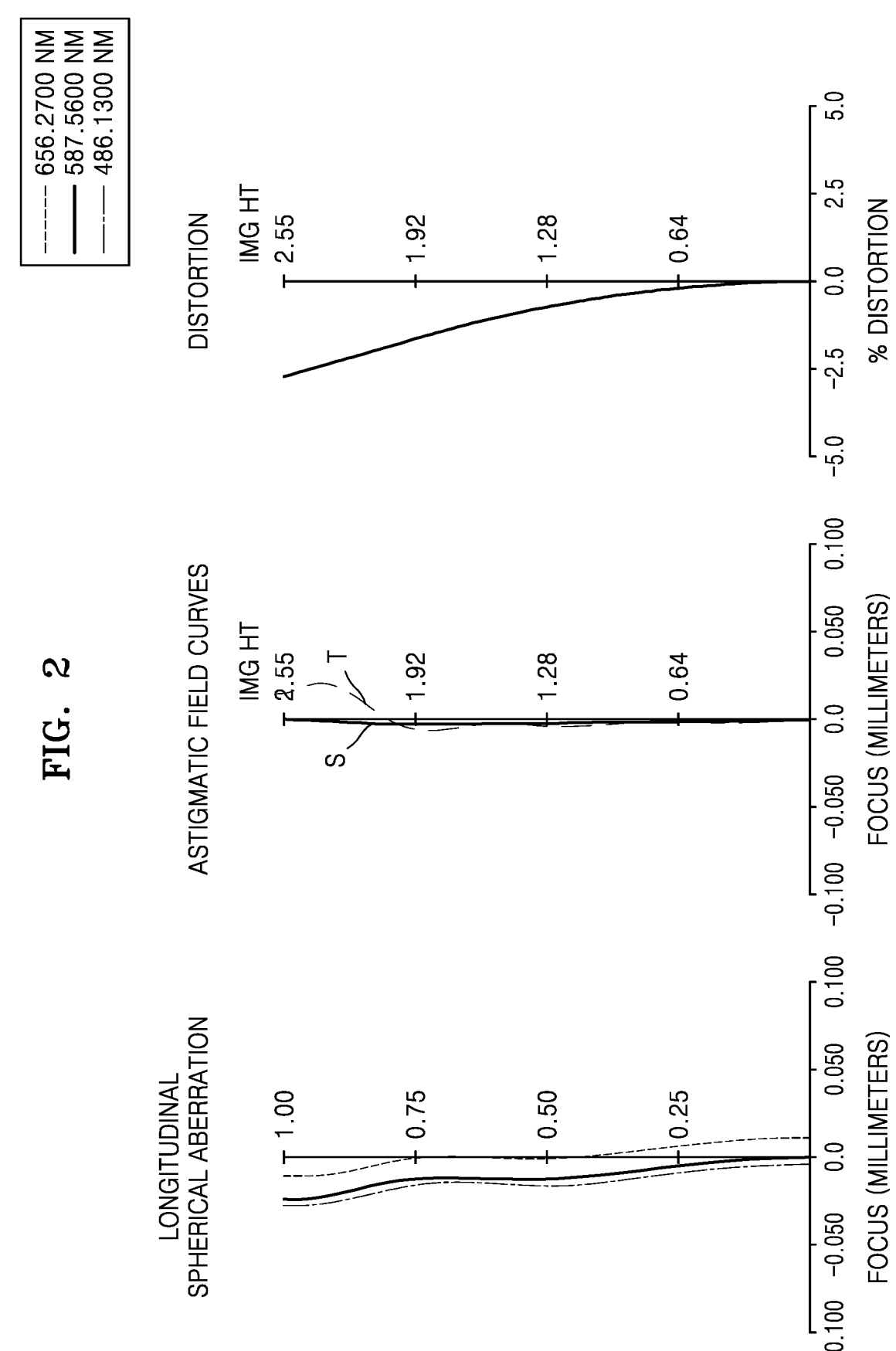
FIG. 2 is an aberration diagram of the lens assembly of the first numerical example according to an embodiment of the disclosure, at a wide angle end.

Throughout the disclosure, the expression "at least one of a, b or c" indicates only a, only b, only c, both a and b, both a and c, both b and c, all of a, b, and c, or variations thereof.

Hereinafter, various embodiments of the disclosure will be described with reference to the accompanying drawings. However, this is not intended to limit the disclosure to particular modes of practice, and it is to be appreciated that various modifications, equivalents, and/or alternatives that do not depart from the spirit and technical scope of the disclosure are encompassed in the disclosure. Throughout the drawings, like reference numerals denote like elements.

An electronic apparatus according to an embodiment of the disclosure disclosed in this document may be various types of apparatus. An electronic apparatus may include, for example, a portable communication device, for example, a smartphone, a computer device, a portable multimedia device, a portable medical device, a camera, a wearable device, or a home appliance device. The electronic apparatus according to the embodiment of this document is not limited to the above-described devices.

Various embodiment of the document and terms used therein are not intended to limit the disclosure to particular modes of practice, and it is to be appreciated that various modifications, equivalents, and/or alternatives that do not depart from the spirit and technical scope of the disclosure are encompassed in the disclosure. Throughout the drawings, similar or relevant parts are referenced with similar reference numerals. The singular form of the noun corresponding to an item may include one item or a plurality of items, unless the relevant context clearly dictates otherwise. In the specification, the expressions such as "A or B," "at least one of A and/or B," or "at least one of A and/or B" may include all available combinations of items listed together. For example, the expressions such as "A or B," "at least one of A and B," or "at least one of A or B" may signify all cases of including at least one A, including at least one B, or including both of at least one A and at least one B. Terms such as "first" and "second" are used herein merely to describe a variety of constituent elements, but the constituent elements are not limited by the terms. Such terms are used only for the purpose of distinguishing one constituent element from another constituent element. For example, a first user device and a second user device may denote different user devices regardless of order or importance. In the specification, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element.

Furthermore, the term "module" stated in the specification may include a unit embodied by hardware, software, or firmware, and may be interchangeably used with terms, for example, logic, a logic block, a component, or a circuit. The module may be an integrally composed part or the smallest unit or part thereof that performs one or more functions. For example, according to an embodiment of the disclosure, the module may be embodied in the form of an application-specific integrated circuit (ASIC).

Figure 35:
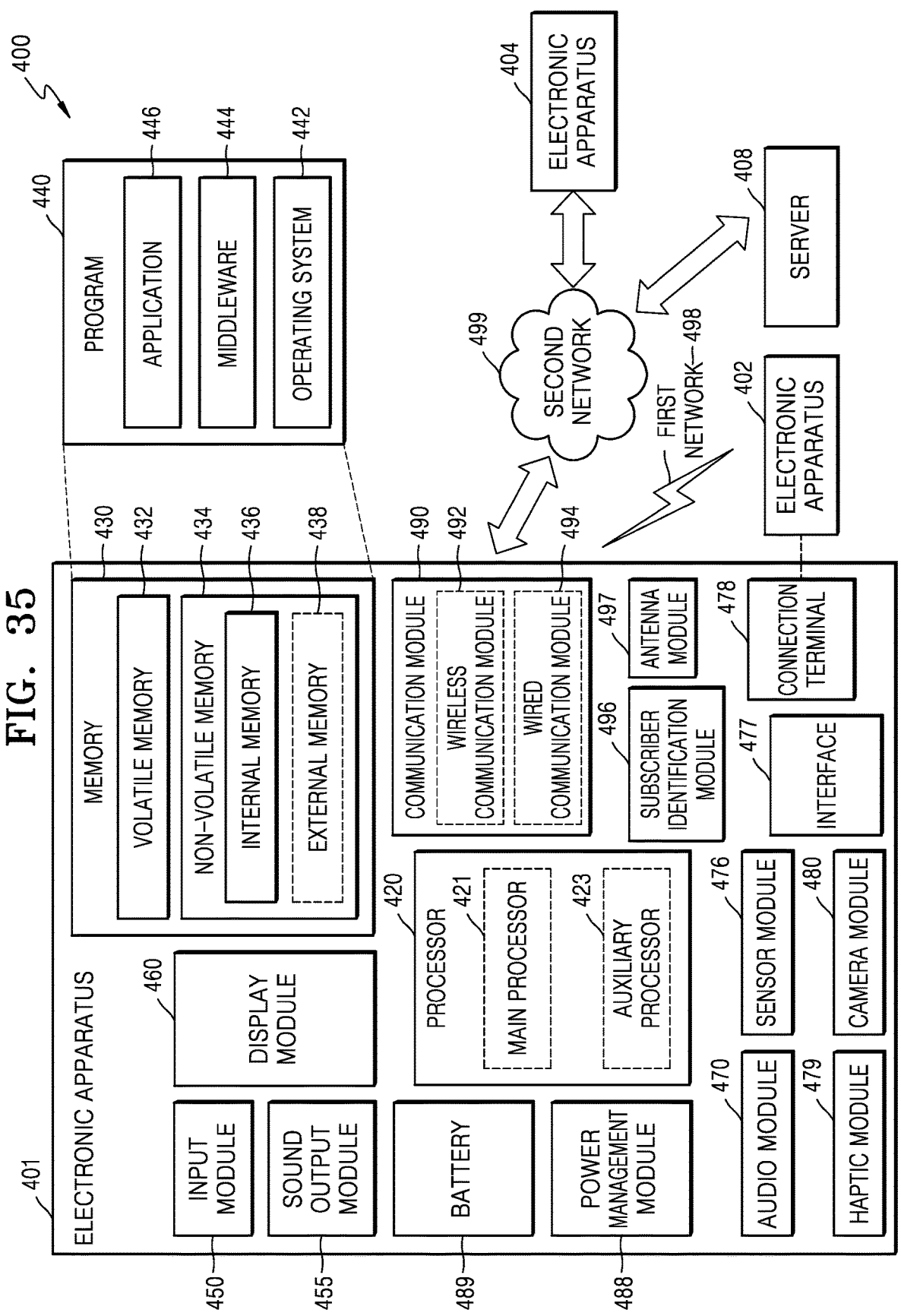
FIG. 35 is a block diagram of an electronic apparatus in a network environment, according to an embodiment of the disclosure.

Referring to FIG. 35, the embodiments of the disclosure may be embodied by software, for example, a program 440, including one or more instructions stored in a storage medium, for example, an internal memory 436 or an external memory 438, that is readable by a machine, for example, an electronic apparatus 401. For example, a machine, for example, a processor of the electronic apparatus 401, for example, a processor 420, may call at least one of instructions stored in a storage medium, and execute the called at least one instruction. This enables the machine to be operated to perform at least one function according to the called at least one instruction. The one or more instructions may include codes that are generated by a compiler or executable by an interpreter. A machine-readable storage medium may be provided in the form of a non-transitory storage medium. The non-transitory may mean that a storage medium is a tangible device, not including a signal, for example, an electromagnetic wave. However, the term does not distinguish a case of semi-permanently storing data in a storage medium from a case of temporarily storing data According to an embodiment of the disclosure, a method according to an embodiment of the disclosure disclosed in this document may be provided by being included in a computer program product. A computer program product as goods may be dealt between a seller and a buyer. The computer program product is distributed in the form of a machine-readable storage medium, for example, a compact disc read only memory (CD-ROM), or through application stores, for example, Play Store™, or can be distributed directly or online, for example, download or upload, between two user devices, for example, smart phones. In the case of online distribution, at least a part of the computer program product may be at least temporarily stored or temporarily generated in a machine-readable storage medium such as a manufacturer's server, an application store's server, or a memory of a relay server.

According to various embodiments, each constituent element, for example, a module or a program, of the constituent elements described above may include a singular or a plurality of entities, and some of the plurality of entities may be disposed separately in other constituent elements. According to various embodiments, one or more constituent elements or operations among the above-described constituent elements may be omitted, or one or more other constituent elements or operations may be added. Alternatively or additionally, a plurality of constituent elements, for example, modules or programs, may be integrated into one constituent element. In this case, the integrated constituent element may perform one or more functions of each of the plurality of constituent elements in the same or similar manner as that performed by the corresponding constituent element of the plurality of constituent elements prior to the integration. In this document, the term user may refer to a person using an electronic apparatus or a device using an electronic apparatus, for example, an artificial intelligence electronic apparatus.

Hereinafter, with reference to the accompanying drawings, a lens assembly according to an embodiment of the disclosure, and an apparatus including the same, will be described in detail with reference to the accompanying drawings.

FIG. 1 illustrates a lens assembly 100-1 of a first numerical example according to an embodiment of the disclosure.

The lens assembly 100-1 according to an embodiment of the disclosure may include a first lens group G1-1 having negative refractive power, a second lens group G2-1 having positive refractive power, and a third lens group G3-1 having negative refractive power, which are arranged from an object side O to an image side I. In the description below about the structure of each lens, the image side may denote the direction in which an image plane IMG on which an image is formed, and an object side may denote the direction in which an object (i.e. an object whose image is to be captured) is present. Furthermore, an "object side surface" of a lens may denote the lens surface toward the object with respect to an optical axis OA and where light is incident with respect to the optical axis OA, and an "image side surface" may denote the lens surface toward the image plane IMG with respect to the optical axis OA and where light exits with respect to the optical axis OA. The image plane IMG may be, for example, an imaging device surface or an image sensor surface. An image sensor may include, for example, a complementary metal oxide semiconductor (CMOS) image sensor or a charge coupled device (CCD). The image sensor is not limited thereto, and for example, may be any device that converts images of an object into electrical image electrical image signals.

When the lens assembly 100-1 is zoomed from a wide angle end to a telephoto angle end, the first lens group G1-1 may be fixed, and the second lens group G2-1 and the third lens group G3-1 may be moved toward the object side O. The third lens group G3-1 may perform focusing for image plane adjustment according to a change in the distance to the object.

The first lens group G1-1 may include a first lens L11 having negative refractive power and a second lens L21 having positive refractive power. The first lens L11 may include an object side surface S1 that is concave to the object side O, thereby reducing the overall length of the lens assembly 100-1. The first lens L11 may be, for example, a bi-concave lens. The second lens L21 may include an object side surface S3 that is convex to the object side O. The second lens L21 may have, for example, a meniscus shape that is convex to the object side O. The first lens L11 and the second lens L21 may each be an aspherical plastic lens. Alternatively, the first lens L11 and the second lens L21 may each be a glass lens. References, such as S1, S2, S3 . . . Sn, where n is a natural number, are assigned to the object side surface and the image side surface of each lens, sequentially from the object side O to the image side I along the optical axis OA, as shown in the figure.

The second lens group G2-1 may include one or more positive lenses and one negative lens. For example, the second lens group G2-1 may include a third lens L31 having positive refractive power, a fourth lens L41 having positive refractive power, and a fifth lens L51 having negative refractive power. The second lens group G2-1 may include at least one glass lens. The third lens L31 may be, for example, a glass lens, and may correct for chromatic aberration. A stop ST may be provided at the object side O or the image side I of the second lens group G2-1. The stop ST may be provided at the object side O of the third lens L31. Alternatively, the stop ST may be provided at an object side surface S5 of the third lens L31. The stop ST is provided to adjust the diameter of luminous flux, and may include, for example, an opening stop, a variable stop, or a mask type stop, and the like.

The third lens group G3-1 may include one positive lens and one or more negative lenses. All lenses included in the third lens group G3-1 may be aspherical plastic lenses. For example, the third lens group G3-1 may include a sixth lens L61 having positive refractive power and a seventh lens L71 having negative refractive power. The sixth lens L61 may include a concave object side surface S12 toward the object side O. The sixth lens L61 may be a meniscus lens concave to the object side O. The seventh lens L71 may be, for example, a bi-concave lens.

According to an embodiment of the disclosure, at least one optical device OD may be provided between the seventh lens L71 and the image plane IMG. The optical device OD may include at least one of, for example, a low pass filter, an infrared (IR)-cut filter, or a cover glass. For example, when an IR-cut filter is provided as an optical device, visible light may be transmitted to the image plane IMG, and IR may be blocked or rejected so that IR may not be transmitted to the image plane IMG. However, it is possible to configure an optical lens assembly without the optical device.

The lens assembly 100-1 according to an embodiment of the disclosure may include at least one aspherical lens. For example, each of the first lens L11, the second lens L21, the third lens L31, the fourth lens L41, the fifth lens L51, the sixth lens L61, and the seventh lens L71 of the lens assembly 100-1 may be an aspherical lens.

Photos may be captured in telephoto by using the lens assembly 100-1 according to an embodiment of the disclosure. The lens assembly 100-1 according to an embodiment of the disclosure may be mounted on a mobile device such as a cellular phone or a digital camera. Furthermore, the lens assembly 100-1 according to an embodiment of the disclosure may be applied to cameras for monitoring, cameras for vehicles, augmented reality (AR) glasses, virtual reality (VR) glasses, action cameras, and the like.

Figure 3:
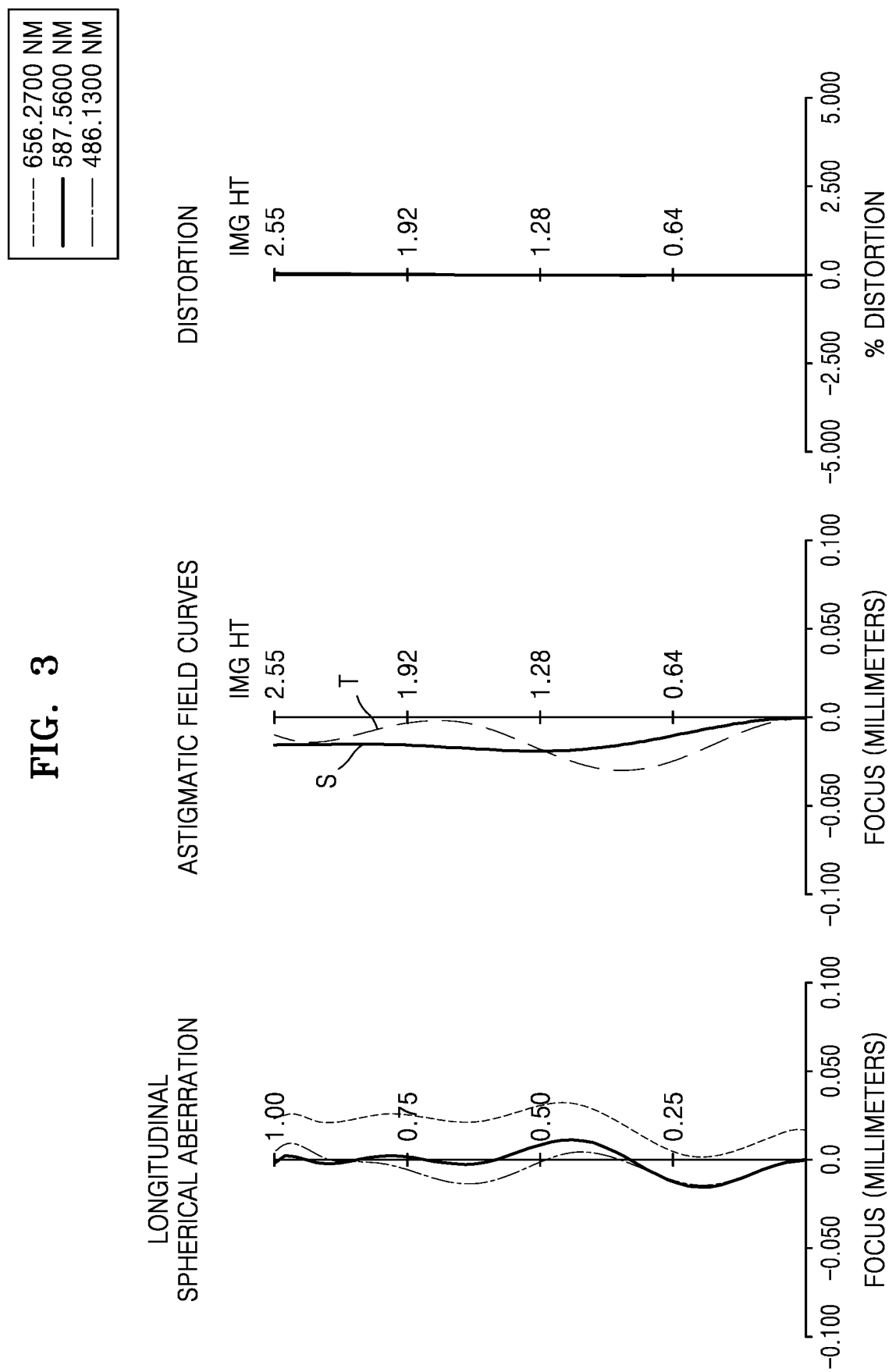
FIG. 3 is an aberration diagram of the lens assembly of the first numerical example according to an embodiment of the disclosure, at a telephoto angle end.

FIG. 2 illustrates the longitudinal spherical aberration, astigmatic field curves, and distortion of the lens assembly 100-1 of the first numerical example at the wide angle end. The longitudinal spherical aberration are shown, for example, light having wavelengths of 656.2700 nanometers NM, 587.5600 NM, and 486.1300 NM, and a tangential field curvature T and a sagittal field curvature S are shown as the astigmatic field curves. The astigmatic field curves are shown with respect to light having a wavelength of 587.5600 NM, and the distortion is shown with respect to light having a wavelength of 587.5600 NM. FIG. 3 illustrates the longitudinal spherical aberration, astigmatic field curves, and distortion of the lens assembly 100-1 of the first numerical example at the telephoto angle end.

Figure 4A:
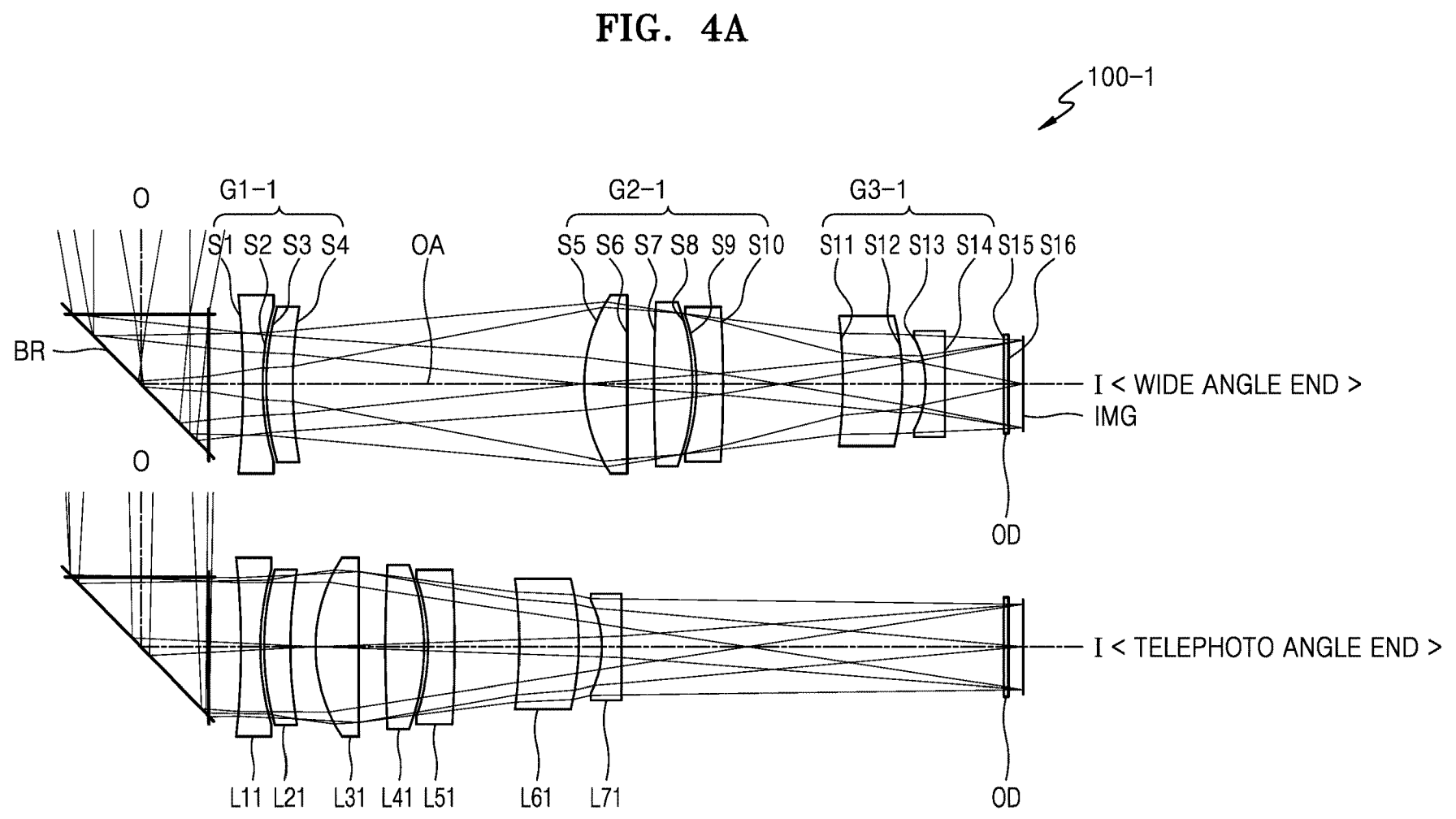

FIG. 4A illustrates an example in which a reflection member BR is further provided in the lens assembly 100-1 of FIG. 1. In FIG. 4A, detailed descriptions about the constituent elements using the same reference numerals as those in FIG. 1 are omitted. The reflection member BR may be provided at the object side O of the first lens group G1-1. The reflection member BR may include, for example, a prism or a reflection mirror. When the lens assembly 100-1 is employed in the electronic apparatus, a degree of freedom in the arrangement of the lens assembly 100-1 may be increased by the reflection member BR. The path of light coming from the object may be bent by the reflection member BR. When the reflection member BR is provided as in FIG. 4A, the object side O can be determined when the bent optical axis OA is unfolded in a straight line.

Figure 4B:
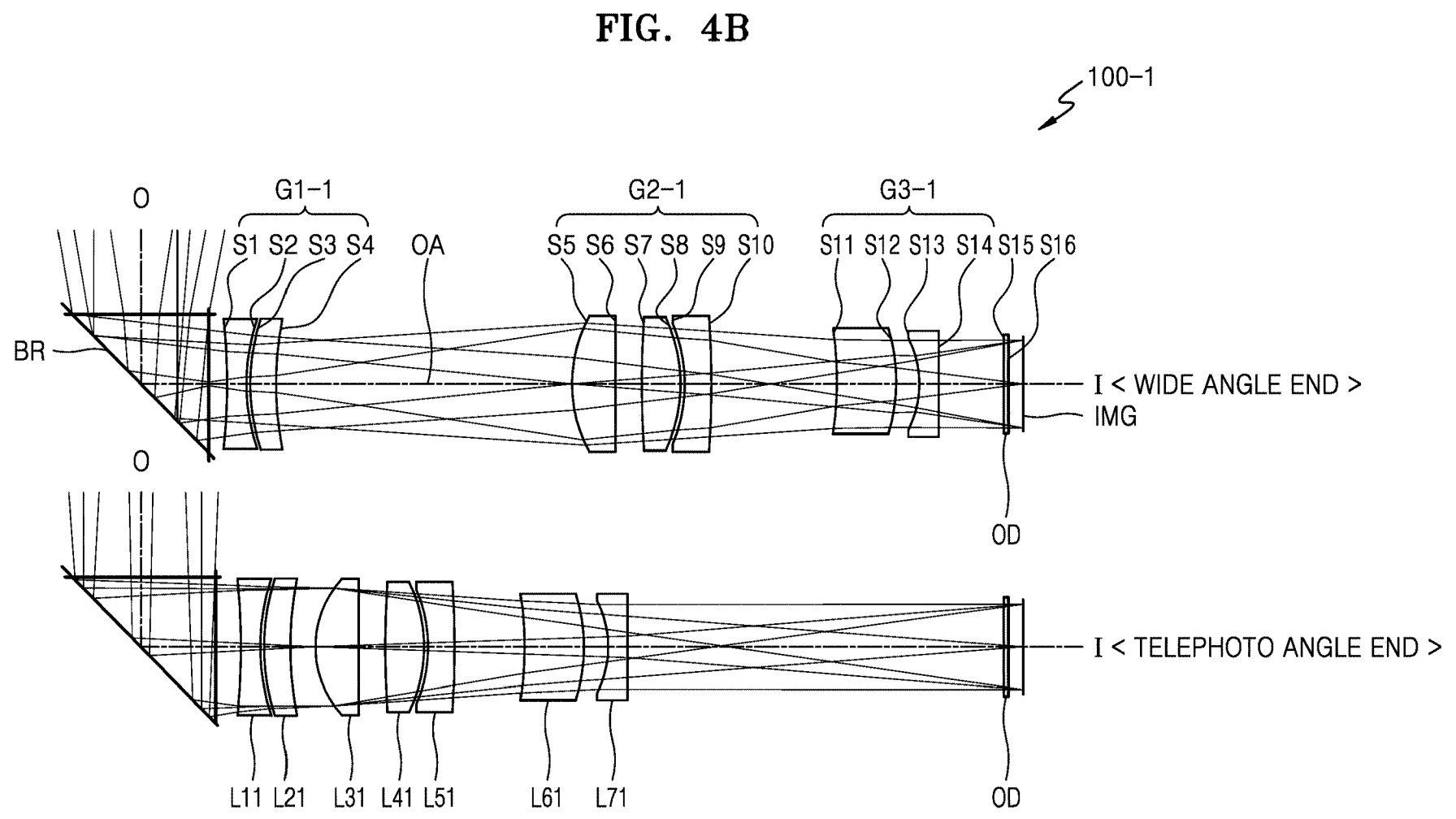

FIG. 4B illustrates an example in which the lenses in the lens assembly 100-1 illustrated in FIG. 4A are cut to fit the short side of an image sensor. Accordingly, the size of the lens assembly may be reduced when the lens assembly is applied to a camera module.

The lens assembly 100-1 according to an embodiment of the disclosure may satisfy the following inequalities. The following inequalities are described with reference to the lens assembly 100-1 of the first numerical example illustrated in FIG. 1. However, the inequalities may be identically applied to other embodiments.

$$TL/ft < 1.26 \qquad \text{<Inequality 1>}$$

$$ft/fw \geq 2 \qquad \text{<Inequality 2>}$$

In the inequalities 1 and 2, TL denotes the total distance from the apex of the object side surface of the first lens to the surface of the image sensor, ft denotes the total focal length at the telephoto angle end, and fw denotes the total focal length at the wide angle end.

Inequality 1 expresses the ratio of the total focal length at the telephoto angle end to the overall length of the lens assembly. When (TL/ft) satisfies Inequality 1, a remote object may be enlarged to be clearly captured, and the lens assembly may be miniaturized. Accordingly, the lens assembly 100-1 according to an embodiment of the disclosure may be mounted on a compact mobile machine or electronic apparatus. For example, the lens assembly 100-1 according to an embodiment of the disclosure may have the range of $0.5 < (TL/ft) < 1.26$.

Inequality 2 expresses the ratio of the focal length at the telephoto angle end and the focal length at the wide angle end, which limits zoom magnification. The lens assembly 100-1 according to an embodiment of the disclosure may have the range of, for example, $2 \leq (ft/fw) \leq 10$. Alternatively, the lens assembly 100-1 according to an embodiment of the disclosure may have the range of, for example, $2 \leq (ft/fw) \leq 5$. The lens assembly 100-1 according to an embodiment of the disclosure may be configured to have high magnification and to be compact.

The lens assembly 100-1 according to an embodiment of the disclosure may satisfy the following inequality.

$$0.9 < f1/f3 < 1.7 \qquad \text{<Inequality 3>}$$

In the inequality 3, f1 denotes the focal length of the first lens group G1-1, and f3 denotes the focal length of the third lens group G3-1.

Inequality 3 limits the ratio of the focal length of the first lens group G1-1 and the focal length of the third lens group G3-1. When (f1/f3) exceeds the upper limit of Inequality 3, the focal length of the first lens group G1-1 may be long, and the focal length of the third lens group G3-1 may be short.

In this case, restriction of coma aberration by the first lens group G1-1 and the third lens group G3-1 at the wide angle end may be difficult, and the correction of astigmatism by the third lens group G3-1 may be difficult. Furthermore, at the telephoto angle end, the generation of spherical aberration by the third lens group G3-1 may be increased. When (f1/f3) is less than the lower limit of Inequality 3, the focal length of the first lens group G1-1 may be decreased, and the focal length of the third lens group G3-1 may be increased. In this case, control of astigmatism at the wide angle end may be difficult, and large amount of spherical aberration by the first lens group G1-1 and the third lens group G3-1 at the telephoto angle end may be generated. When (f1/f3) satisfies Inequality 3, coma aberration and astigmatism may be easily corrected.

For example, the lens assembly 100-1 according to an embodiment of the disclosure may satisfy the following inequality.

$$1.4 < |f1|/fw < 2.5 \qquad \text{<Inequality 4>}$$

In the inequality 4, f1 denotes the focal length of the first lens group G1-1, and fw denotes the total focal length at the wide angle end.

Inequality 4 defines the ratio of the focal length of the first lens group G1-1 to the total focal length at the wide angle end, and when Inequality 4 is satisfied, field curvature during zooming may be easily corrected, and the size of the lens assembly 100-1 may be reduced. When (f1/fw) exceeds the upper limit of Inequality 4, the focal length of the first lens group G1-1 is increased and the effective diameter of the overall lens assembly is increased, and the distance from the most image side surface of a lens to the image plane IMG of the third lens group G3-1 at the wide angle end is decreased. Then, at the wide angle end, an incident angle CRA of an outermost ray incident on the image plane IMG is increased, and as the difference between the CRA angle at the telephoto angle end and the CRA angle at the wide angle end increases, control of coma aberration may be difficult. When (f1/fw) is less than the lower limit of Inequality 4, the focal length of the first lens group G1-1 is decreased so that the correction of astigmatism and field curvature at the wide angle end may be difficult.

For example, the lens assembly 100-1 according to an embodiment of the disclosure may satisfy the following inequality.

$$\Sigma vd\_2G \geq 80 \qquad \text{<Inequality 5>}$$

In the inequality 5, $\Sigma vd\_2G$ denotes the sum of Abbe numbers of all lenses including in the second lens group G2-1. Vd denotes the Abbe number based on the d-line of a lens. The lens assembly 100-1 according to an embodiment of the disclosure may have the range of, for example, $80 \leq \Sigma vd\_2G \leq 120$.

Inequality 5 shows a conditional expression about the material of all lenses forming the second lens group G2-1, and when Inequality 5 is satisfied, at the telephoto angle end, longitudinal chromatic aberration and magnification chromatic aberration may be easily restricted. For example, the second lens group G2-1 may include a low-dispersion glass lens.

For example, the lens assembly 100-1 according to an embodiment of the disclosure may satisfy the following inequality.

$$-0.7 \leq \beta 2t/\beta 3t \leq -0.28 \qquad \text{<Inequality 6>}$$

In the inequality 6, $\beta 2t$ denotes image forming magnification of the second lens group G2-1 at the telephoto angle end, and $\beta 3t$ denotes image forming magnification of the third lens group G3-1 at the telephoto angle end.

Inequality 6 defines the ratio of the image forming magnification of the second lens group G2-1 at the telephoto angle end to the image forming magnification of the third lens group G3-1. When ($\beta 2t/\beta 3t$) exceeds the upper limit of Inequality 6, the magnification of the third lens group G3-1 increases so that, when focusing is performed by using the third lens group G3-1, sensitivity increases and thus focusing control may be difficult because the third lens group G3-1 needs to be controlled very precisely. When ($\beta 2t/\beta 3t$) is less than the lower limit of Inequality 6, the magnification of the third lens group G3-1 decreases so that sensitivity to the image plane movement is lowered and thus the amount of the movement of the third lens group G3-1 for focusing increases too much so that a focusing speed may be decreased.

Figure 5:
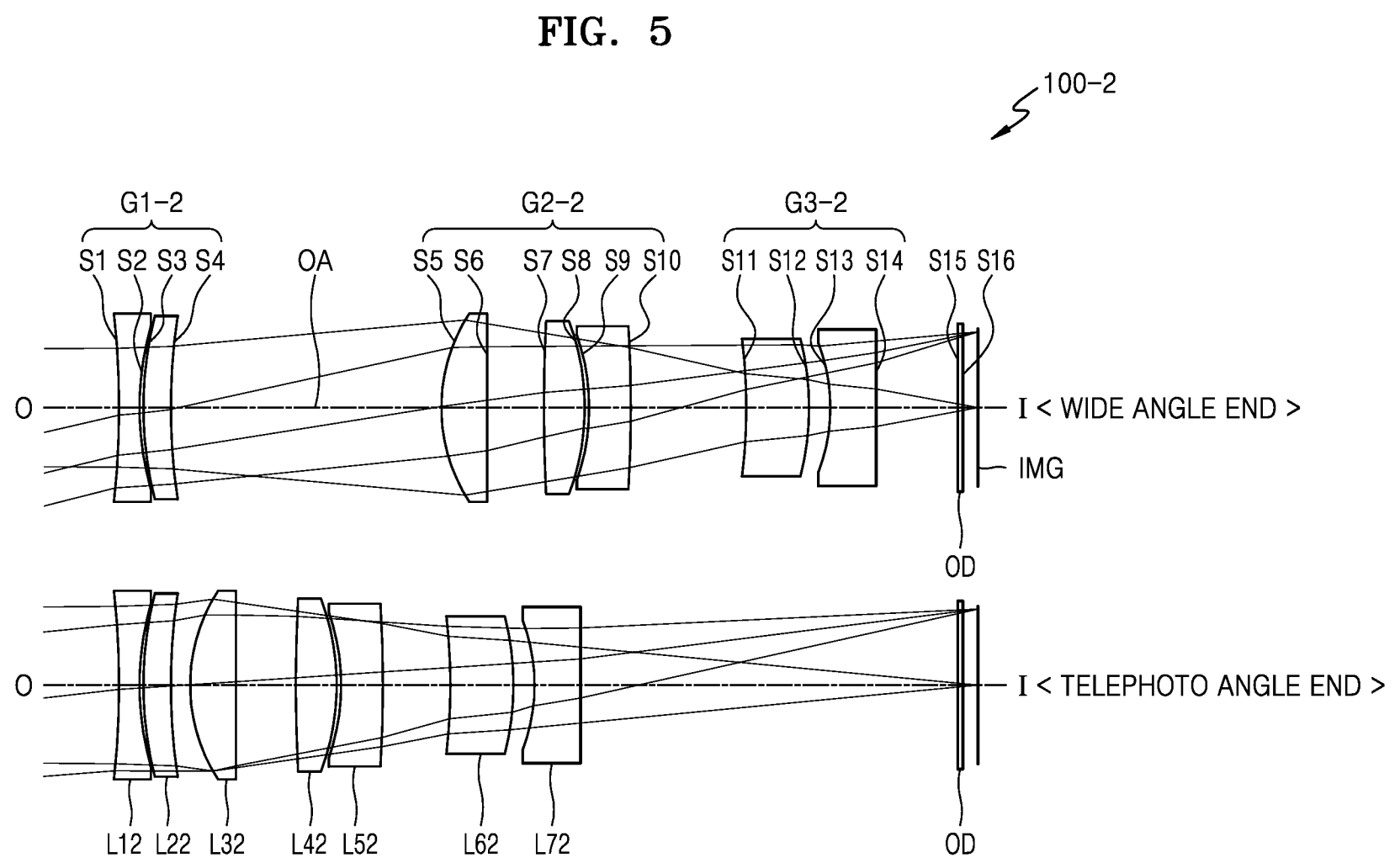

FIG. 5 illustrates a lens assembly 100-2 of a second numerical example according to an embodiment of the disclosure.

The lens assembly 100-2 may include a first lens L12, a second lens L22, a third lens L32, a fourth lens L42, a fifth lens L52, a sixth lens L62, and a seventh lens L72, which are arranged from the object side O to the image side I. As each lens of the lens assembly 100-2 of the second numerical example is substantially the same as that of the lens assembly 100-1 of the first numerical example, detailed descriptions thereof are omitted.

Figure 6:
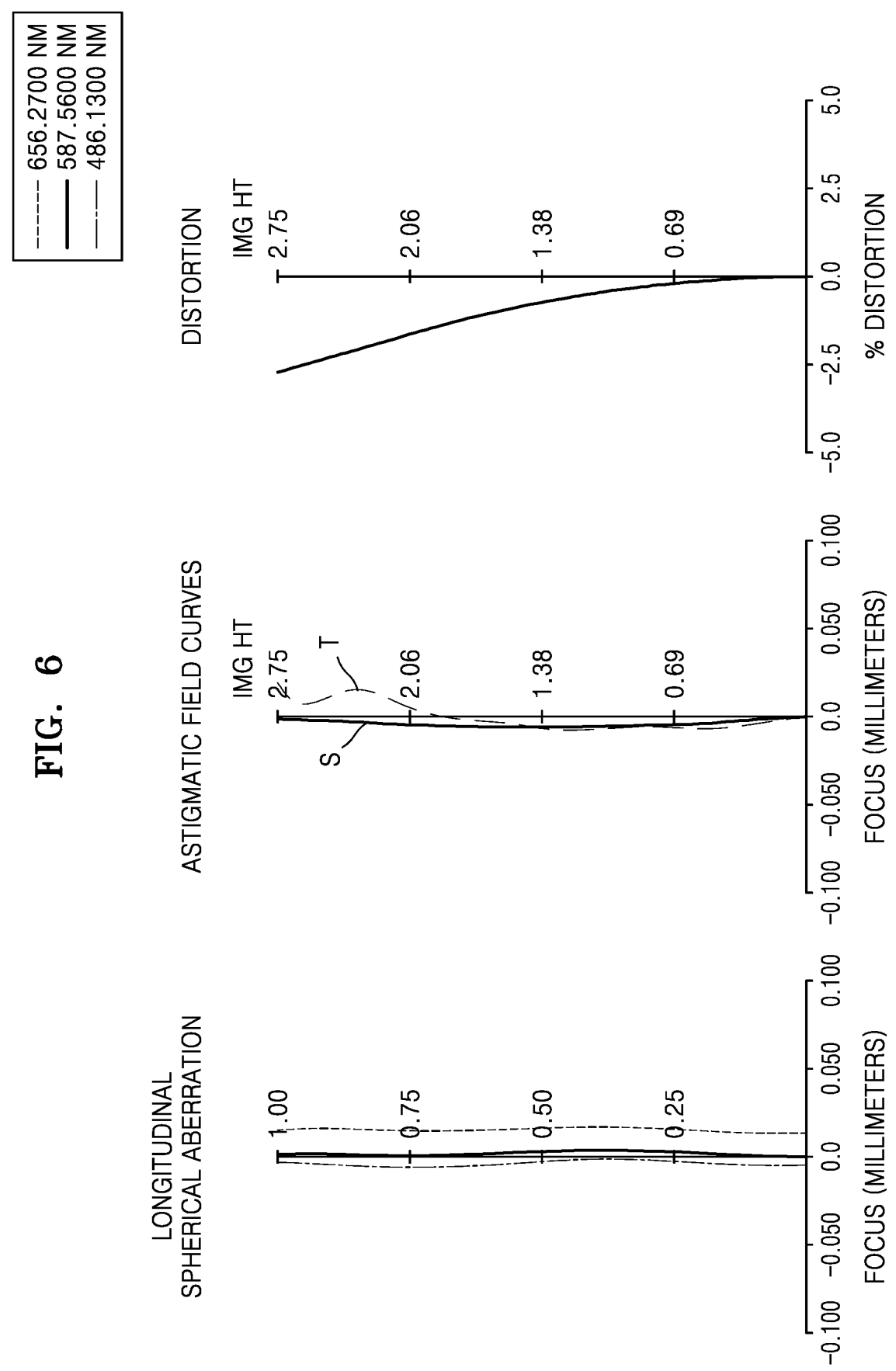
FIG. 6 is an aberration diagram of the lens assembly of the second numerical example according to an embodiment of the disclosure, at a wide angle end.
Figure 7:
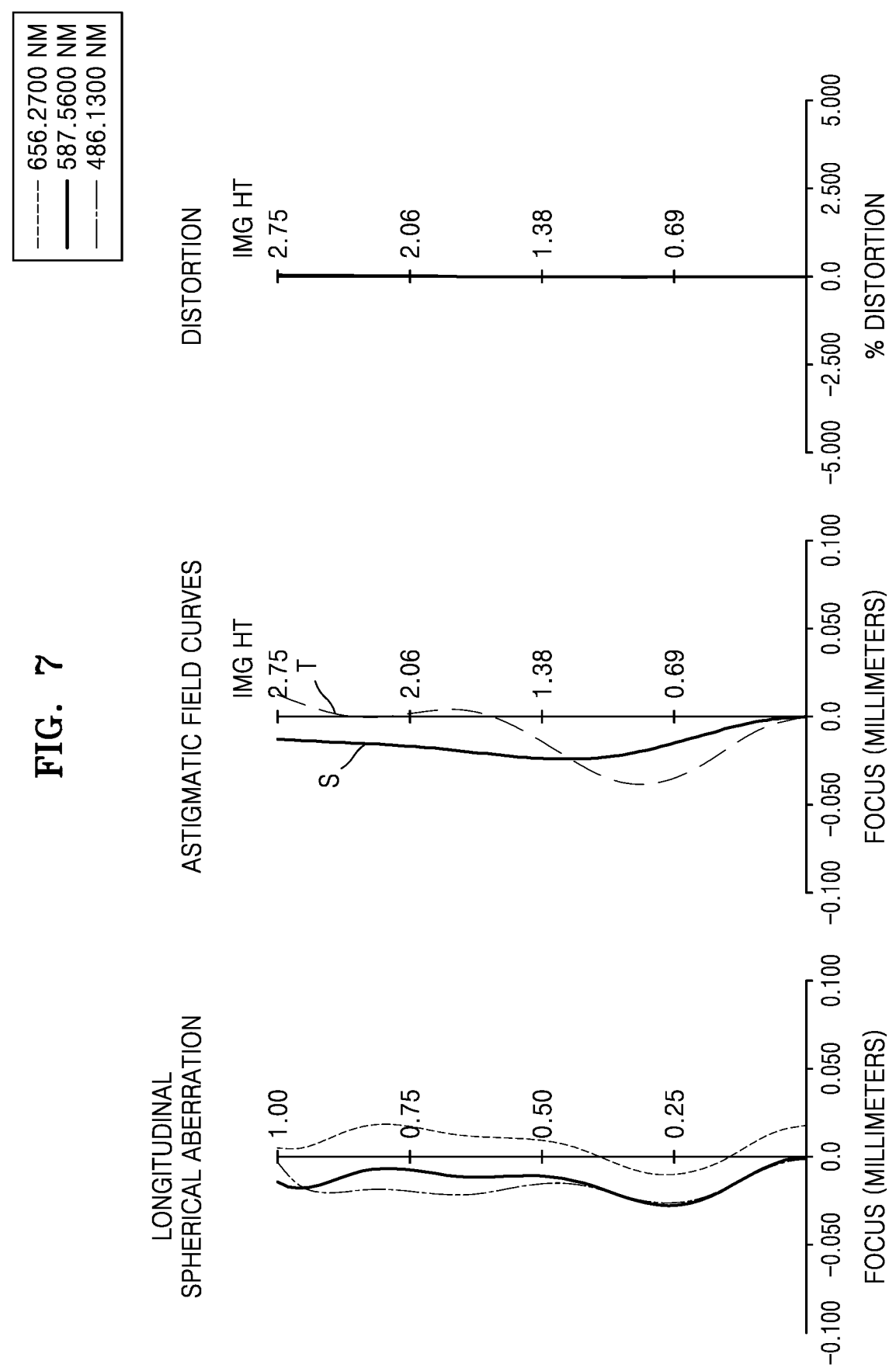
FIG. 7 is an aberration diagram of the lens assembly of the second numerical example according to an embodiment of the disclosure, at a telephoto angle end.

FIG. 6 illustrates the longitudinal spherical aberration, astigmatic field curves, and distortion of the lens assembly 100-2 of the second numerical example at the wide angle end. FIG. 7 illustrates the longitudinal spherical aberration, astigmatic field curves, and distortion of the lens assembly 100-2 of the second numerical example at the telephoto angle end.

Figure 8:
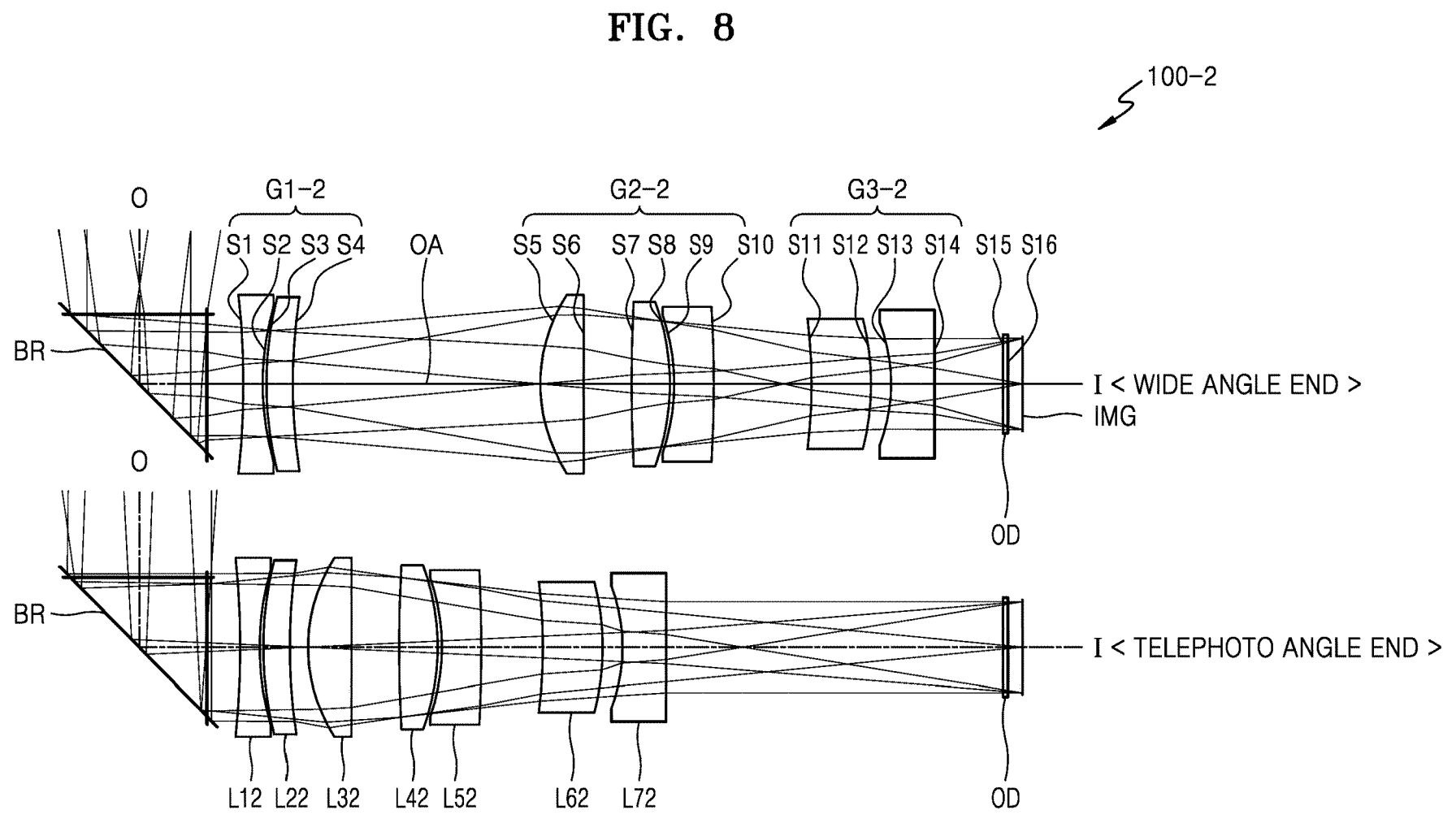

FIG. 8 illustrates an example in which the reflection member BR is further provided at the object side O of the lens assembly 100-2. The light from the object may be incident on the first lens L12 by changing a path through the reflection member BR.

Figure 9:
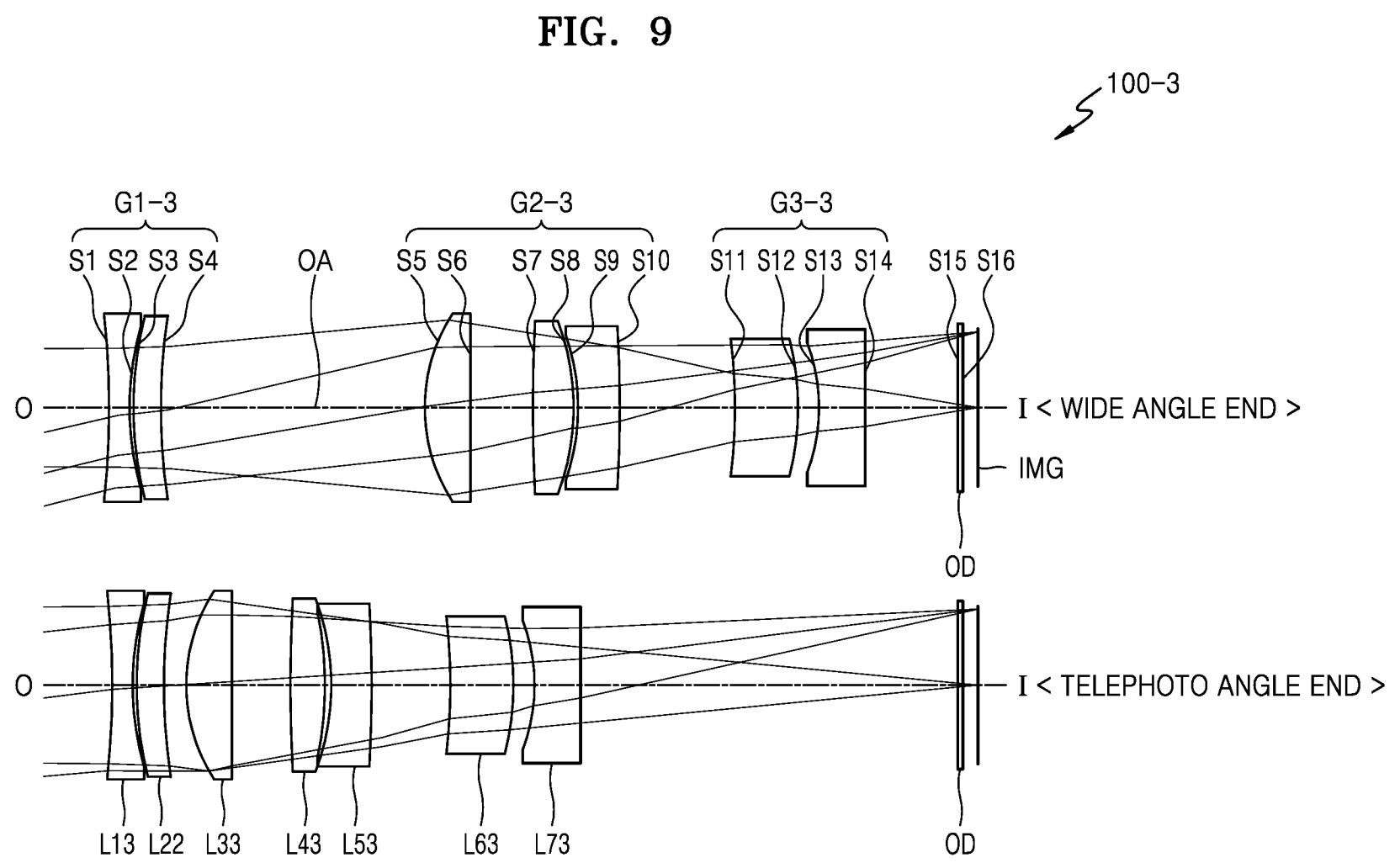

FIG. 9 illustrates a lens assembly 100-3 of a third numerical example according to an embodiment of the disclosure.

The lens assembly 100-3 may include a first lens L13, a second lens L23, a third lens L33, a fourth lens L43, a fifth lens L53, a sixth lens L63, and a seventh lens L73, which are arranged from the object side O to the image side I. As each lens of the lens assembly 100-3 of the third numerical example is substantially the same as that of the lens assembly 100-1 of the first numerical example, detailed descriptions thereof are omitted.

Figure 10:
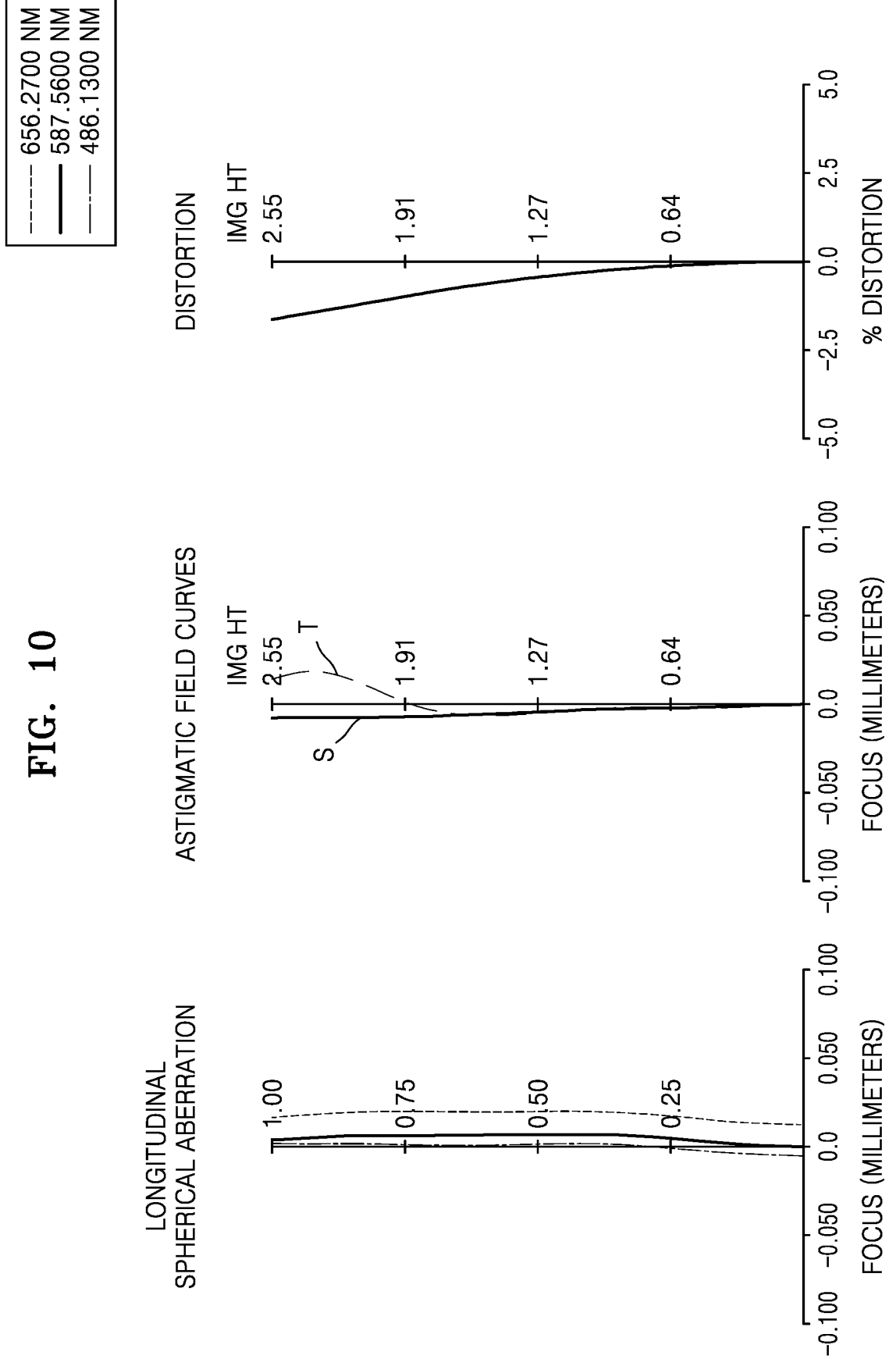
FIG. 10 is an aberration diagram of the lens assembly of the third numerical example according to an embodiment of the disclosure, at a wide angle end.
Figure 11:
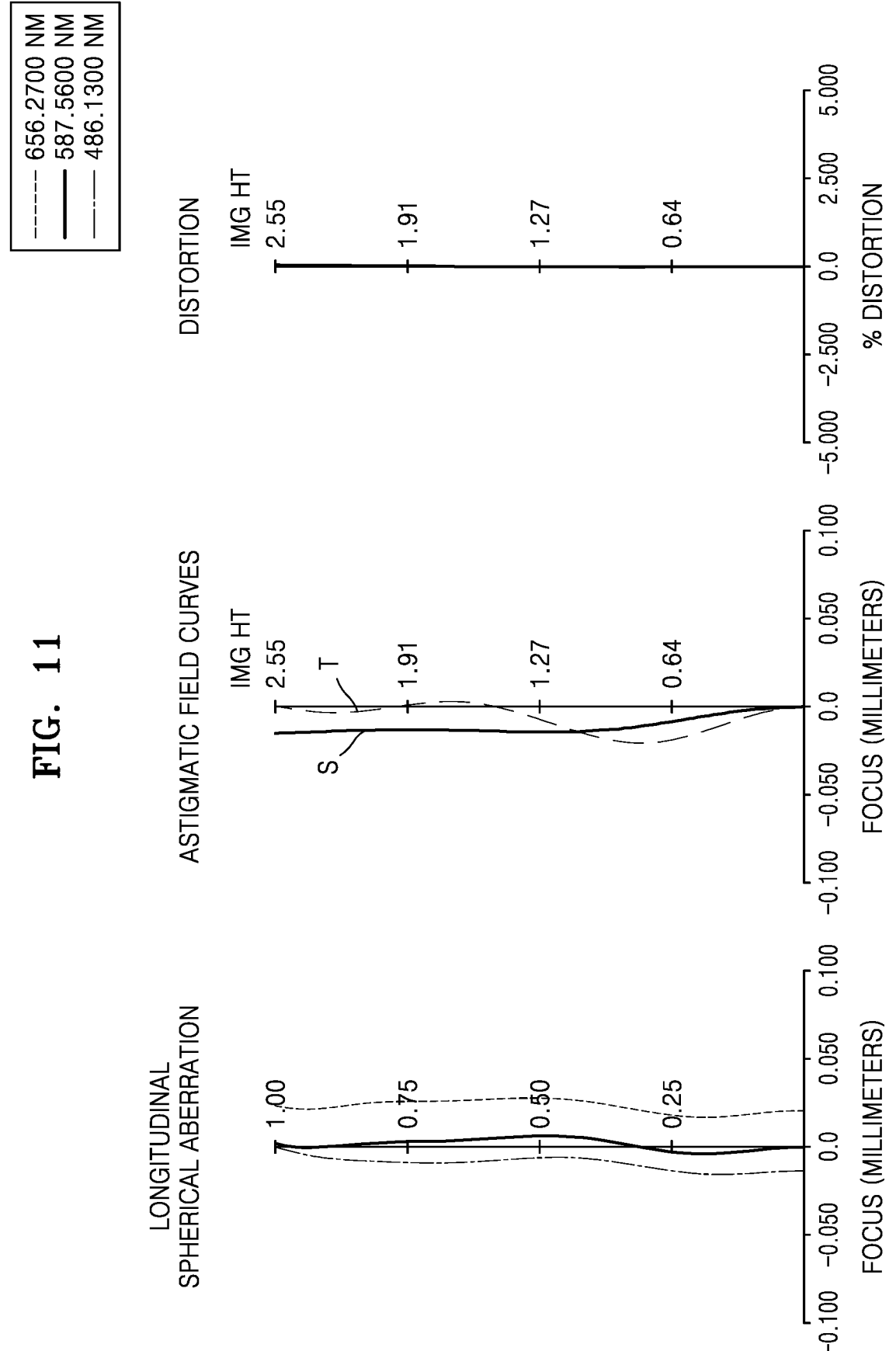
FIG. 11 is an aberration diagram of the lens assembly of the third numerical example according to an embodiment of the disclosure, at a telephoto angle end.

FIG. 10 illustrates the longitudinal spherical aberration, astigmatic field curves, and distortion of the lens assembly 100-3 of the third numerical example at the wide angle end. FIG. 11 illustrates the longitudinal spherical aberration, astigmatic field curves, and distortion of the lens assembly 100-3 of the third numerical example at the telephoto angle end.

Figure 12:
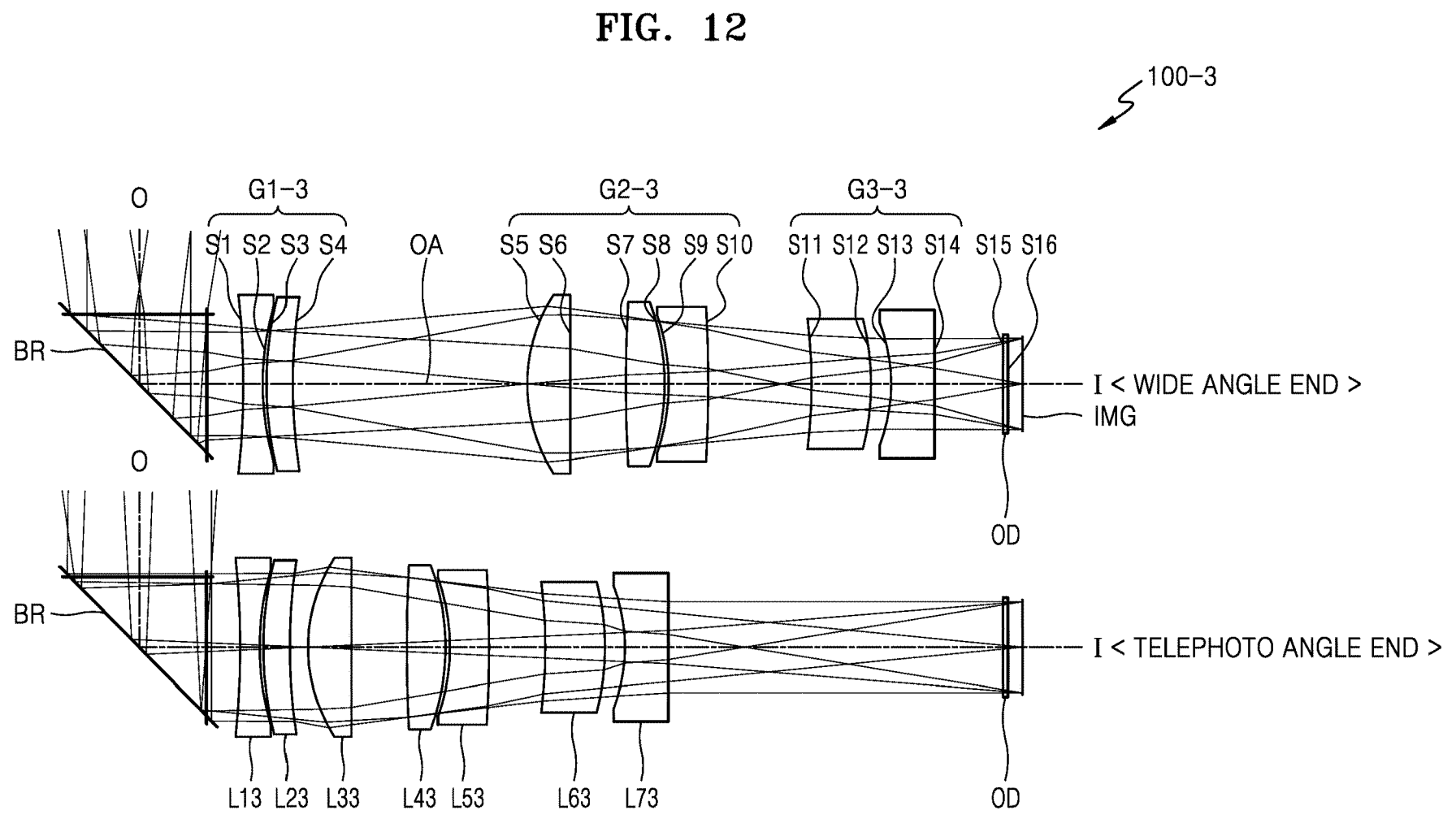

FIG. 12 illustrates an example in which the reflection member BR is further provided at the object side O of the lens assembly 100-3.

Figure 13:
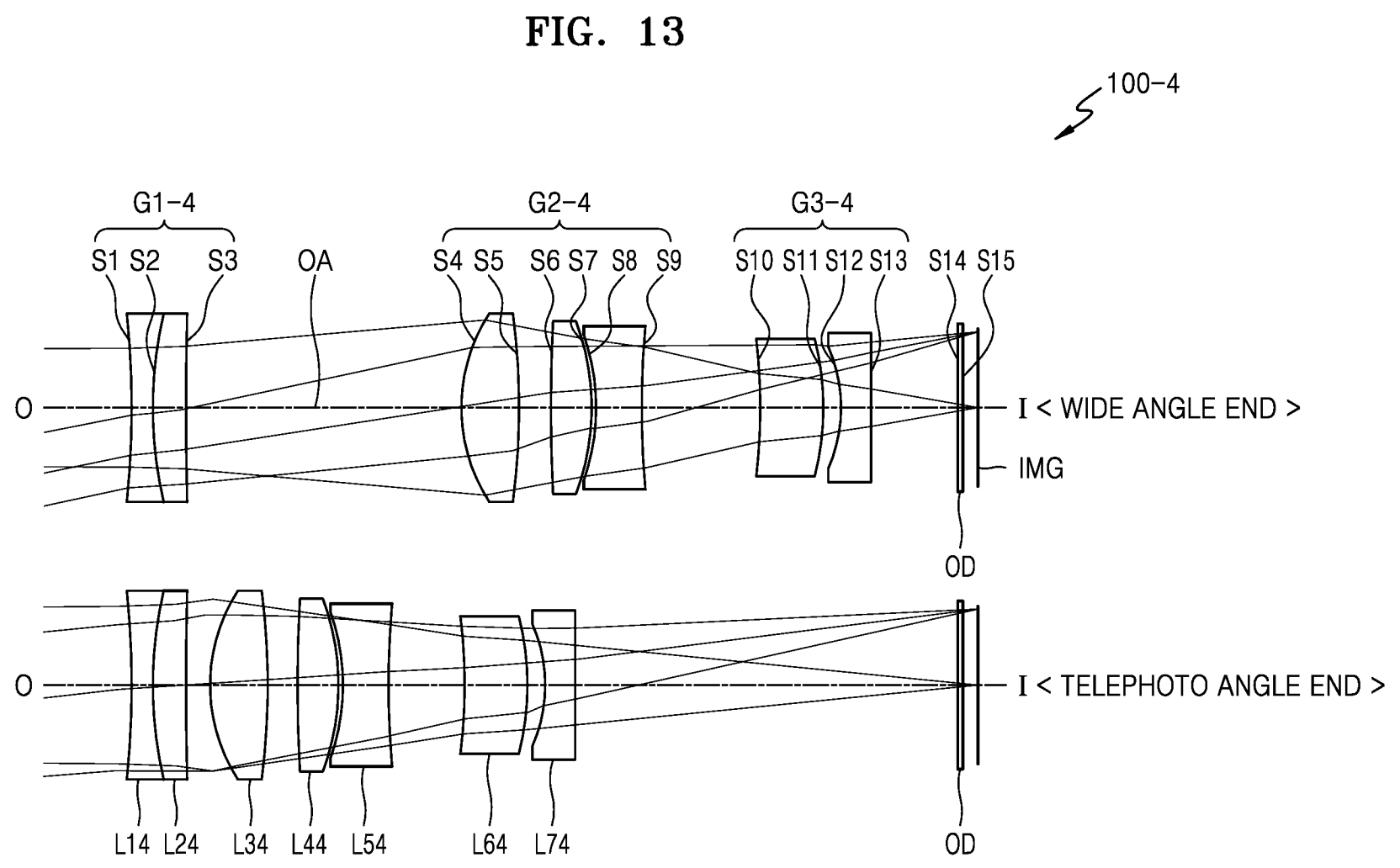

FIG. 13 illustrates a lens assembly 100-4 of a fourth numerical example according to an embodiment of the disclosure.

The lens assembly 100-4 may include a first lens L14, a second lens L24, a third lens L34, a fourth lens L44, a fifth lens L54, a sixth lens L64, and a seventh lens L74, which are arranged from the object side O to the image side I. The first lens L14 may be a bi-concave lens, and the object side surface S2 of the second lens L24 may be a convex meniscus lens. The first lens L14 and the second lens L24 may be bonded to each other to form a compound lens. For example, the first lens L14 and the second lens L24 may each be a spherical glass lens. As the other lenses of the lens assembly 100-4 of the third numerical example are substantially the same as those of the lens assembly 100-1 of the first numerical example, detailed descriptions thereof are omitted.

Figure 14:
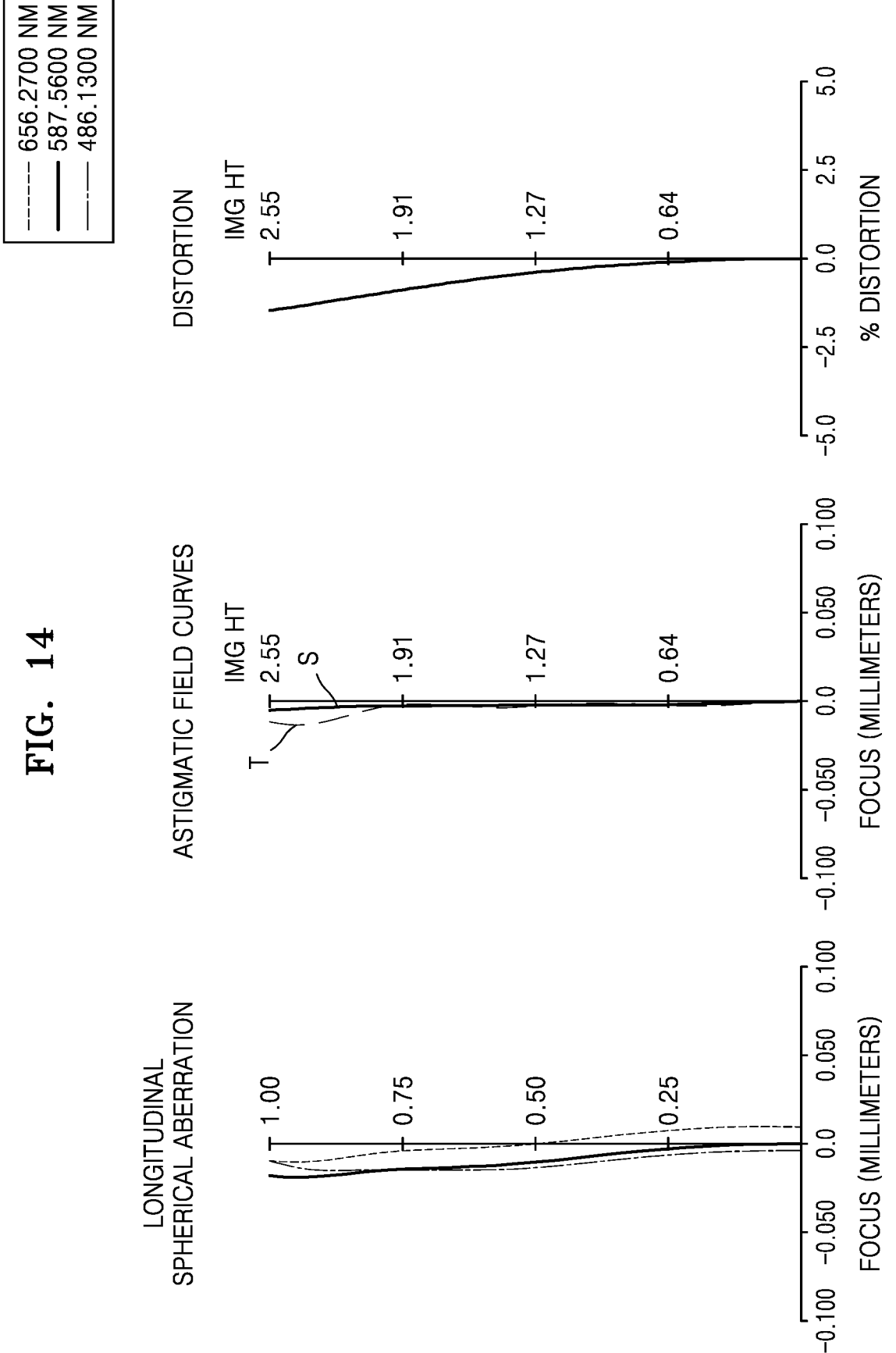
FIG. 14 is an aberration diagram of the lens assembly of the fourth numerical example according to an embodiment of the disclosure, at a wide angle end.
Figure 15:
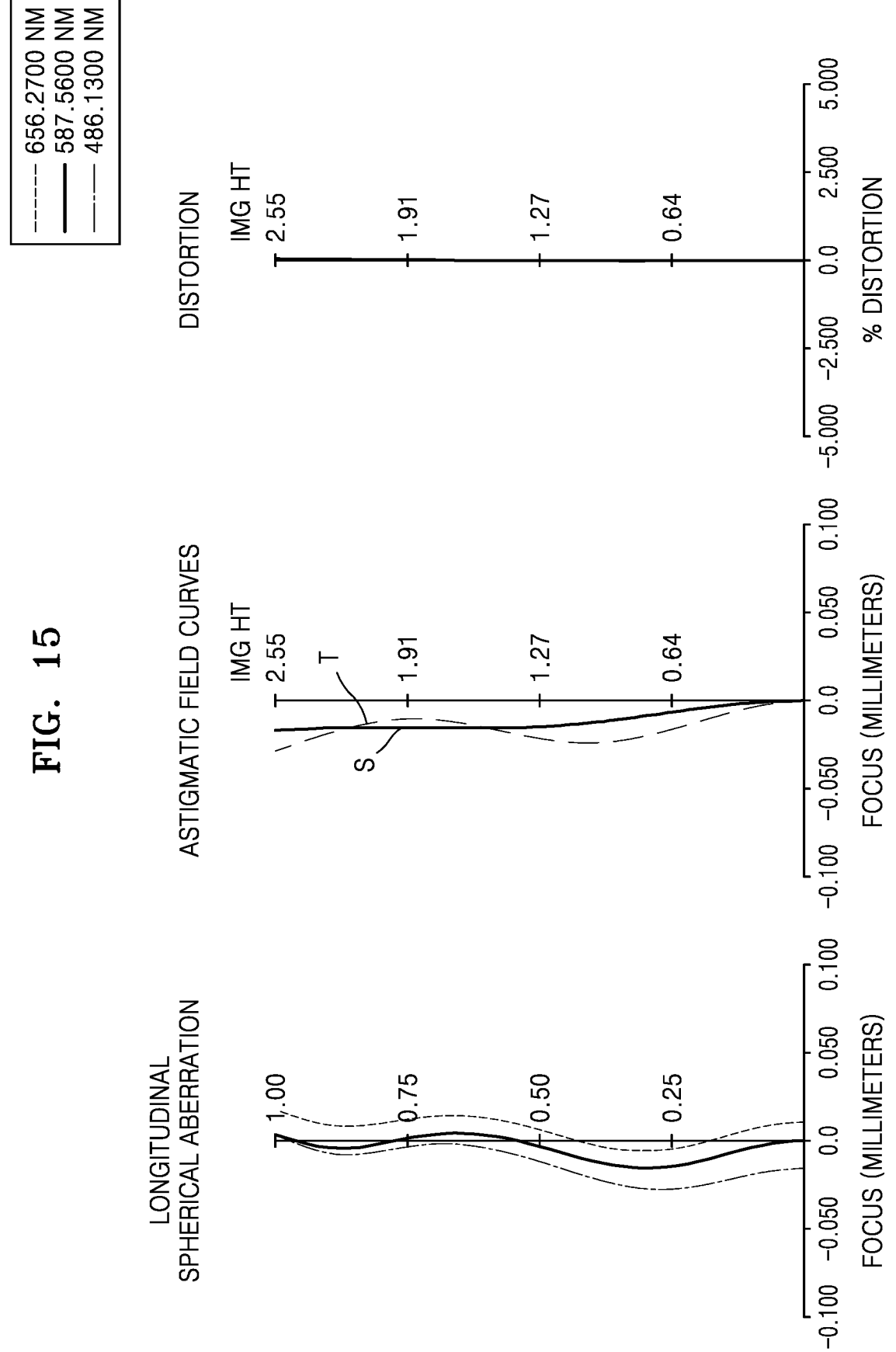
FIG. 15 is an aberration diagram of the lens assembly of the fourth numerical example according to an embodiment of the disclosure, at a telephoto angle end.

FIG. 14 illustrates the longitudinal spherical aberration, astigmatic field curves, and distortion of the lens assembly 100-4 of the fourth numerical example at the wide angle end. FIG. 15 illustrates the longitudinal spherical aberration, astigmatic field curves, and distortion of the lens assembly 100-4 of the fourth numerical example at the telephoto angle end.

Figure 16:
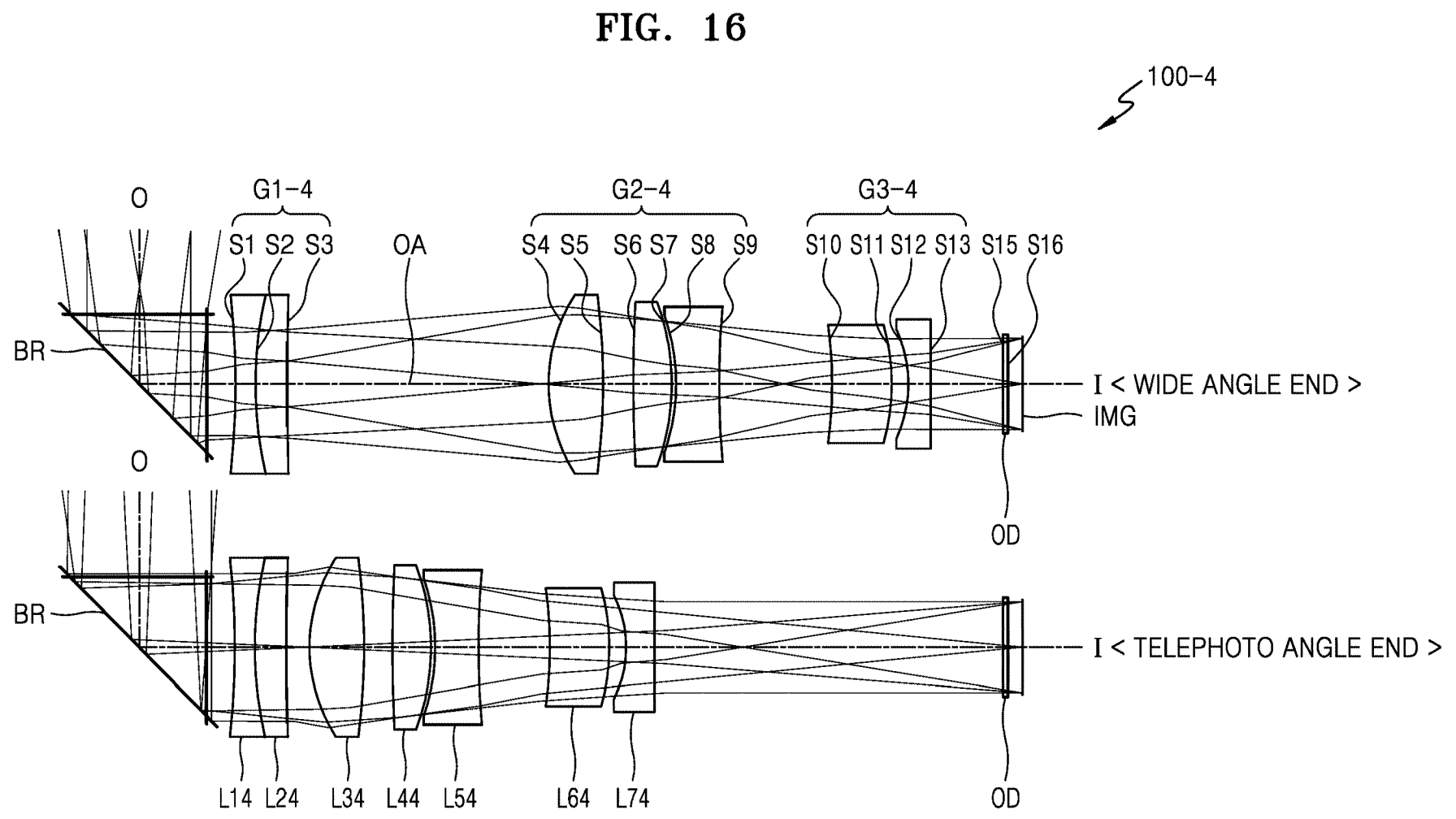

FIG. 16 illustrates an example in which the reflection member BR is further provided at the object side O of the lens assembly 100-4.

Figure 17:
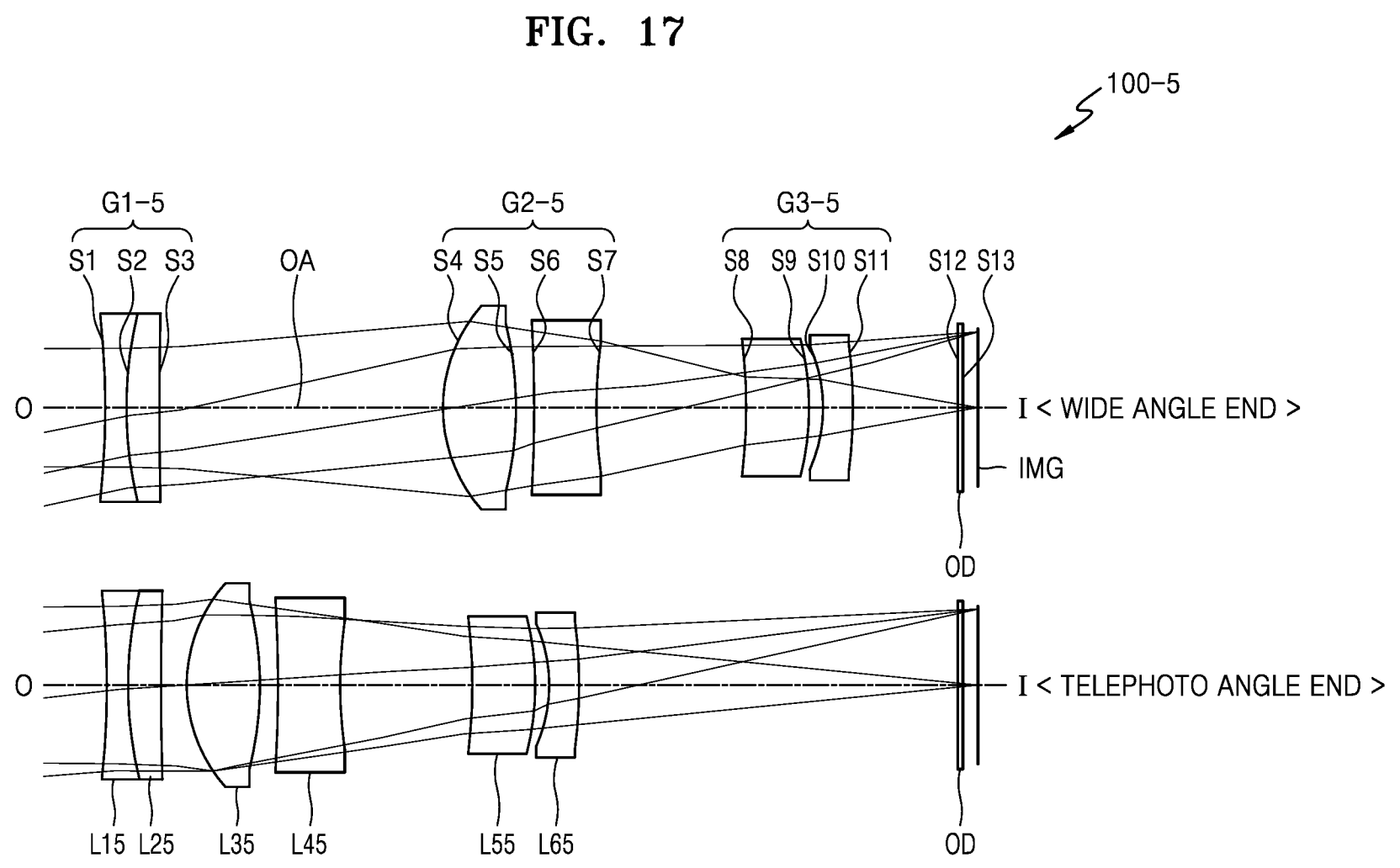

FIG. 17 illustrates a lens assembly 100-5 of a fifth numerical example according to an embodiment of the disclosure.

The lens assembly 100-5 may include a first lens L15, a second lens L25, a third lens L35, a fourth lens L45, a fifth lens L55, and a sixth lens L65, which are arranged from the object side O to the image side I. The lens assembly 100-5 according to an embodiment of the disclosure may include six lenses. A first lens group G1-5 may include the first lens L15 and the second lens L25, a second lens group G2-5 may include the third lens L35 and the fourth lens L45, and a third lens group G3-5 may include the fifth lens L55 and the sixth lens L65. The first lens L15 and the second lens L25 may be bonded to each other to form a compound lens. For example, the first lens L15 and the second lens L25 may each be a spherical glass lens. The third lens L35 may be a biconvex lens, and the fourth lens L45 may be a bi-concave lens. The third lens L35 may be, for example, a glass lens, and the fourth lens L45 may be a plastic lens. The fifth lens L55 may be a meniscus lens concave to the object side O, and the sixth lens L65 may be a bi-concave lens.

Figure 18:
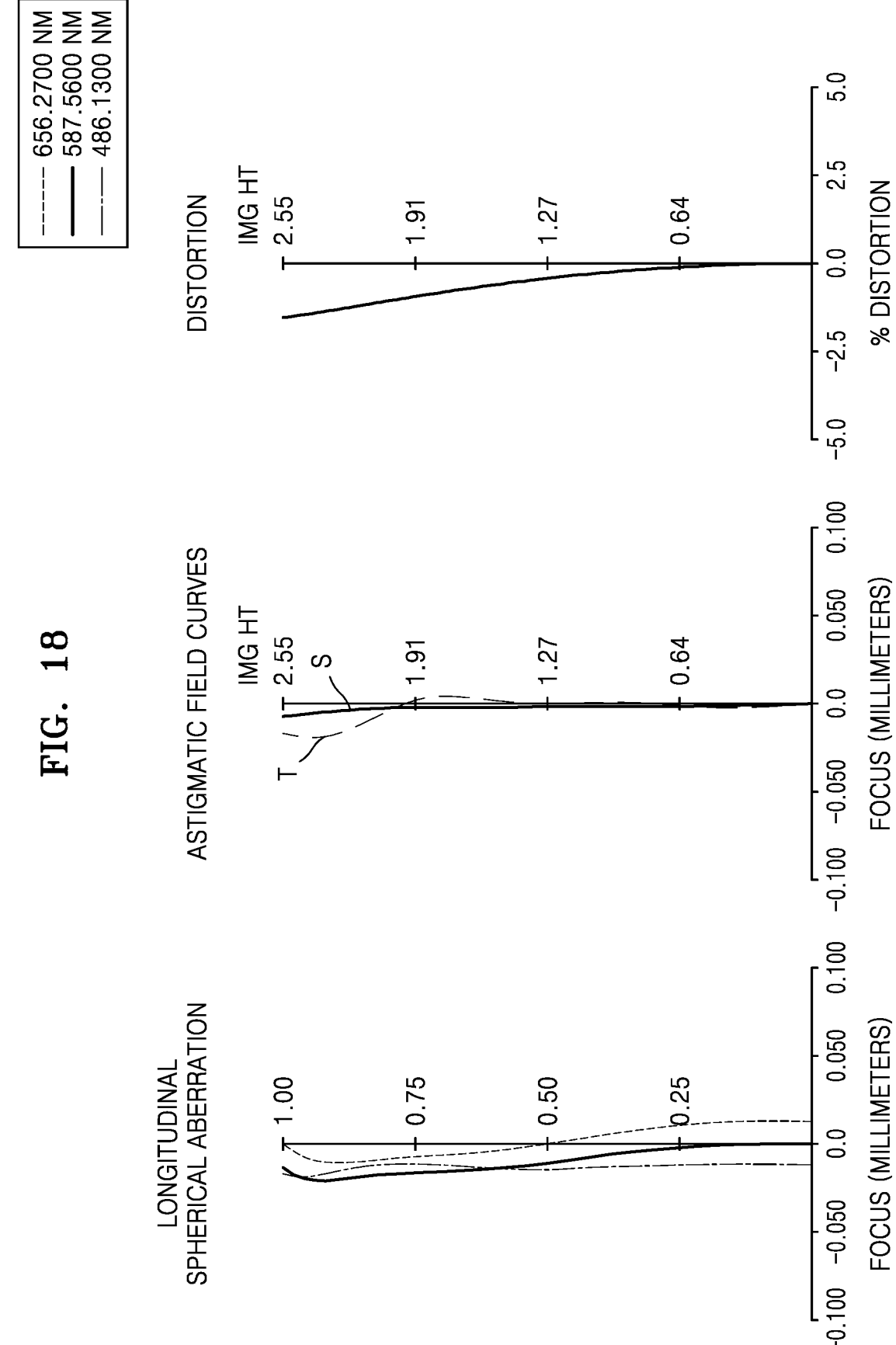
FIG. 18 is an aberration diagram of the lens assembly of the fifth numerical example according to an embodiment of the disclosure, at a wide angle end.
Figure 19:
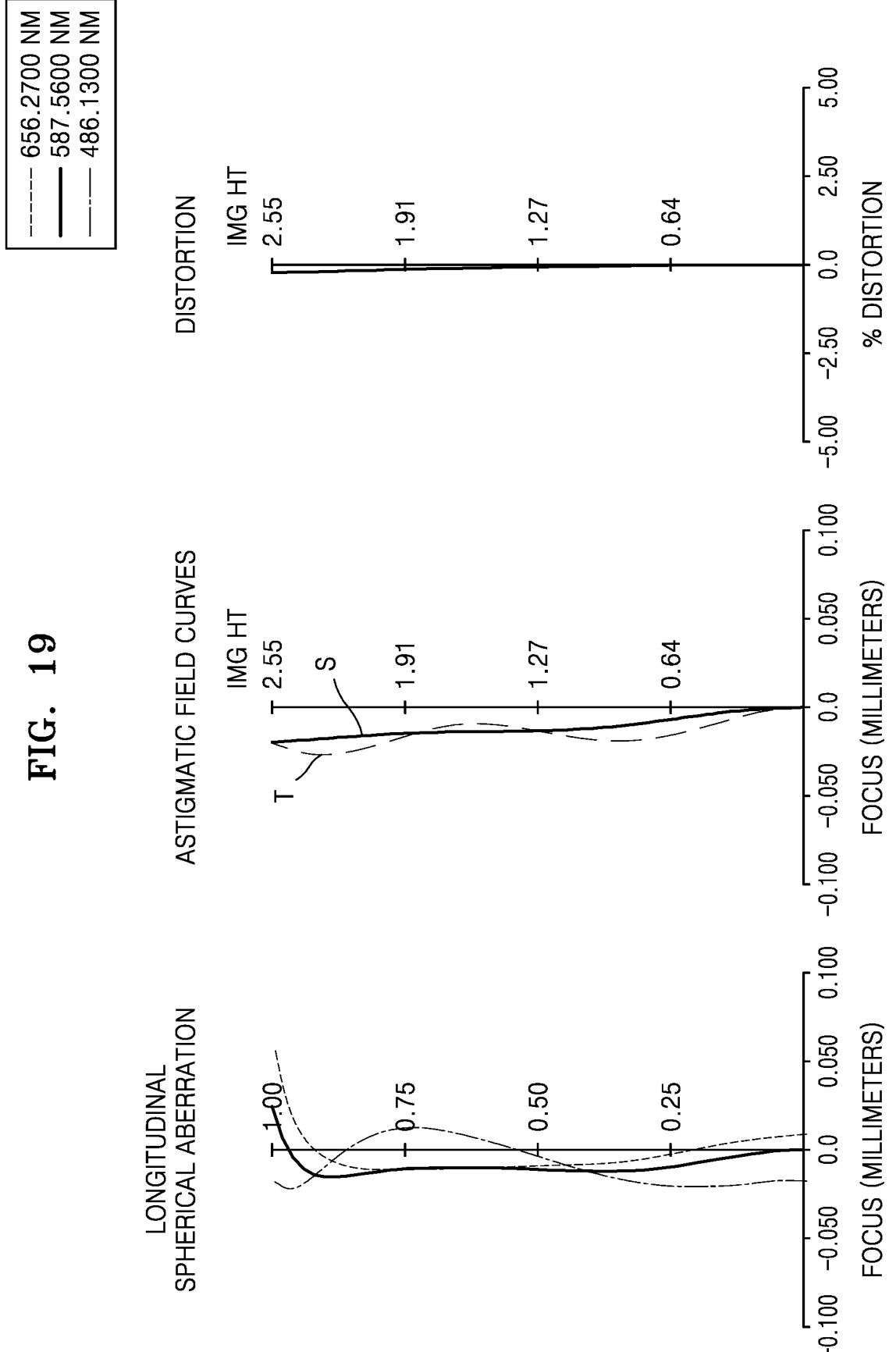
FIG. 19 is an aberration diagram of the lens assembly of the fifth numerical example according to an embodiment of the disclosure, at a telephoto angle end.

FIG. 18 illustrates the longitudinal spherical aberration, astigmatic field curves, and distortion of lens assembly 100-5 of the fifth numerical example at the wide angle end. FIG. 19 illustrates the longitudinal spherical aberration, astigmatic field curves, and distortion of lens assembly 100-5 of the fifth numerical example at the telephoto angle end.

Figure 20:
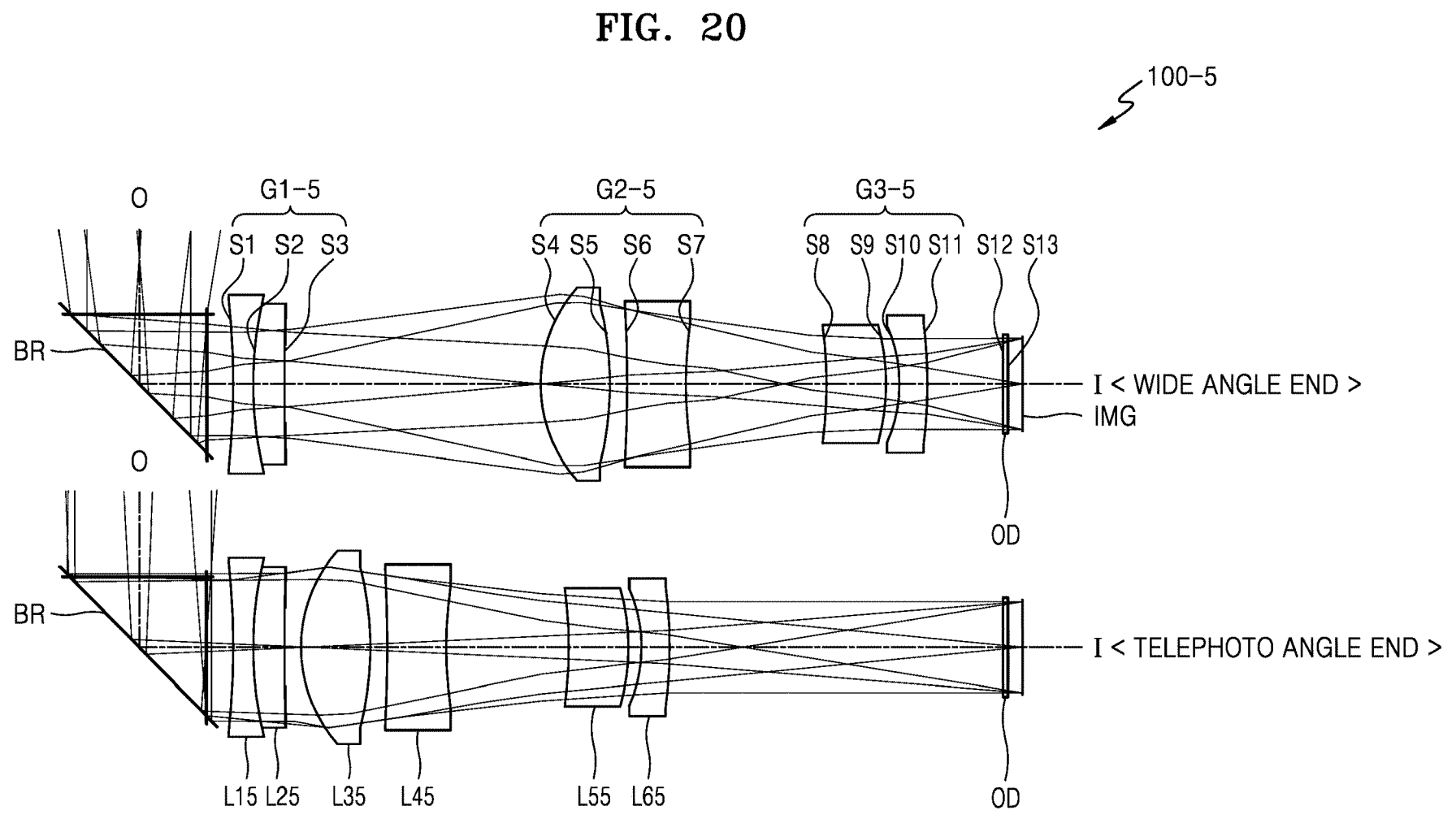

FIG. 20 illustrates an example in which the reflection member BR is further provided at the object side O of the lens assembly 100-4.

Figure 21:
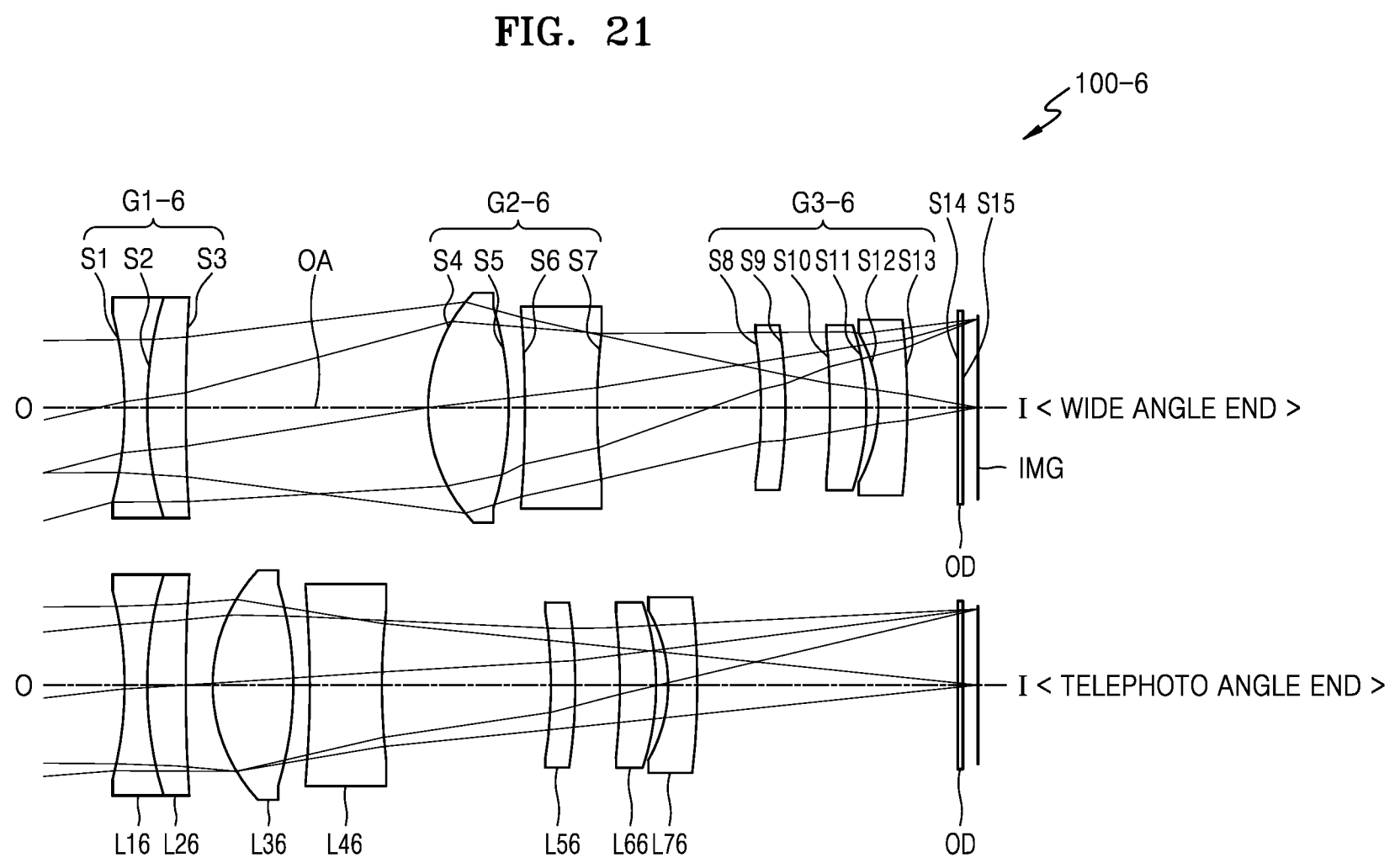

FIG. 21 illustrates a lens assembly 100-6 of a sixth numerical example according to an embodiment of the disclosure.

The lens assembly 100-6 may include a first lens L16, a second lens L26, a third lens L36, a fourth lens L46, a fifth lens L56, a sixth lens L66, and a seventh lens L76, which are arranged from the object side O to the image side I. The lens assembly 100-6 according to an embodiment of the disclosure may include seven lenses. A first lens group G1-6 may include the first lens L16 and the second lens L26, a second lens group G2-6 may include the third lens L36 and the fourth lens L46, and a third lens group G3-6 may include the fifth lens L56, the sixth lens L66, and the seventh lens L76. The first lens L16 and the second lens L26 may be bonded to each other to form a compound lens. For example, the first lens L16 and the second lens L26 may each be a spherical glass lens. The third lens L36 may be a biconvex lens, and the fourth lens L46 may be a bi-concave lens. The third lens L36 may be, for example, a glass lens, and the fourth lens L46 may be a plastic lens. The fifth lens L56 may have negative refractive power, the sixth lens L66 may have positive refractive power, and the seventh lens L76 may have negative refractive power. For example, the fifth lens L56 may be a meniscus lens concave to the object side O, and the sixth lens L66 may be a meniscus lens concave to the object side O, and the seventh lens L76 may be a bi-concave lens. The fifth lens L56, the sixth lens L66, and the seventh lens L76 may each be a bi-sided aspherical plastic lens.

Figure 22:
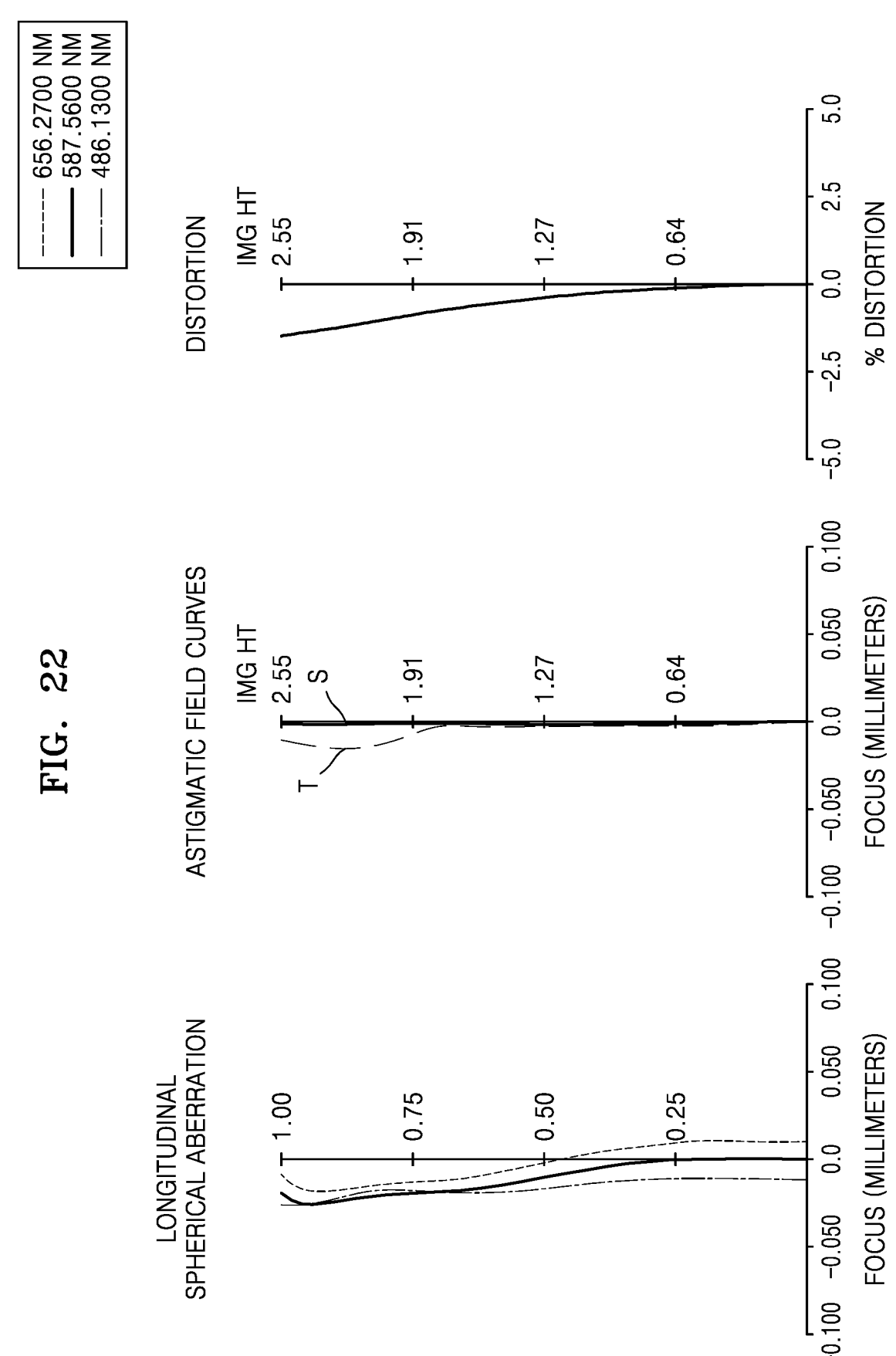
FIG. 22 is an aberration diagram of the lens assembly of the sixth numerical example according to an embodiment of the disclosure, at a wide angle end.
Figure 23:
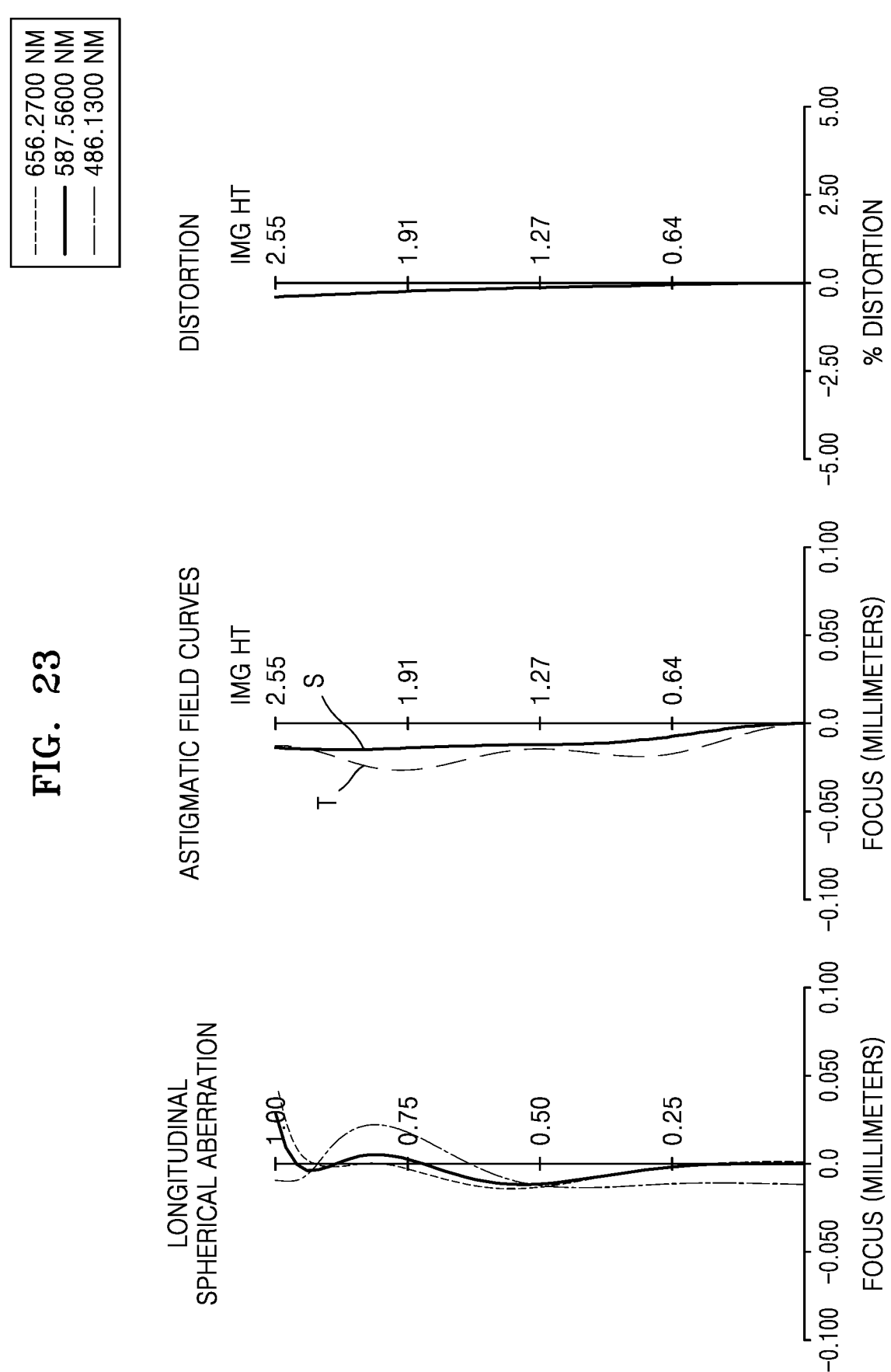
FIG. 23 is an aberration diagram of the lens assembly of the sixth numerical example according to an embodiment of the disclosure, at a telephoto angle end.

FIG. 22 illustrates the longitudinal spherical aberration, astigmatic field curves, and distortion of the lens assembly 100-6 of the sixth numerical example at the wide angle end. FIG. 23 illustrates the longitudinal spherical aberration, astigmatic field curves, and distortion of the lens assembly 100-6 of the sixth numerical example at the telephoto angle end.

FIG. 24 illustrates an example in which the reflection member BR is further provided at the object side O of the lens assembly 100-6.

Figure 25:
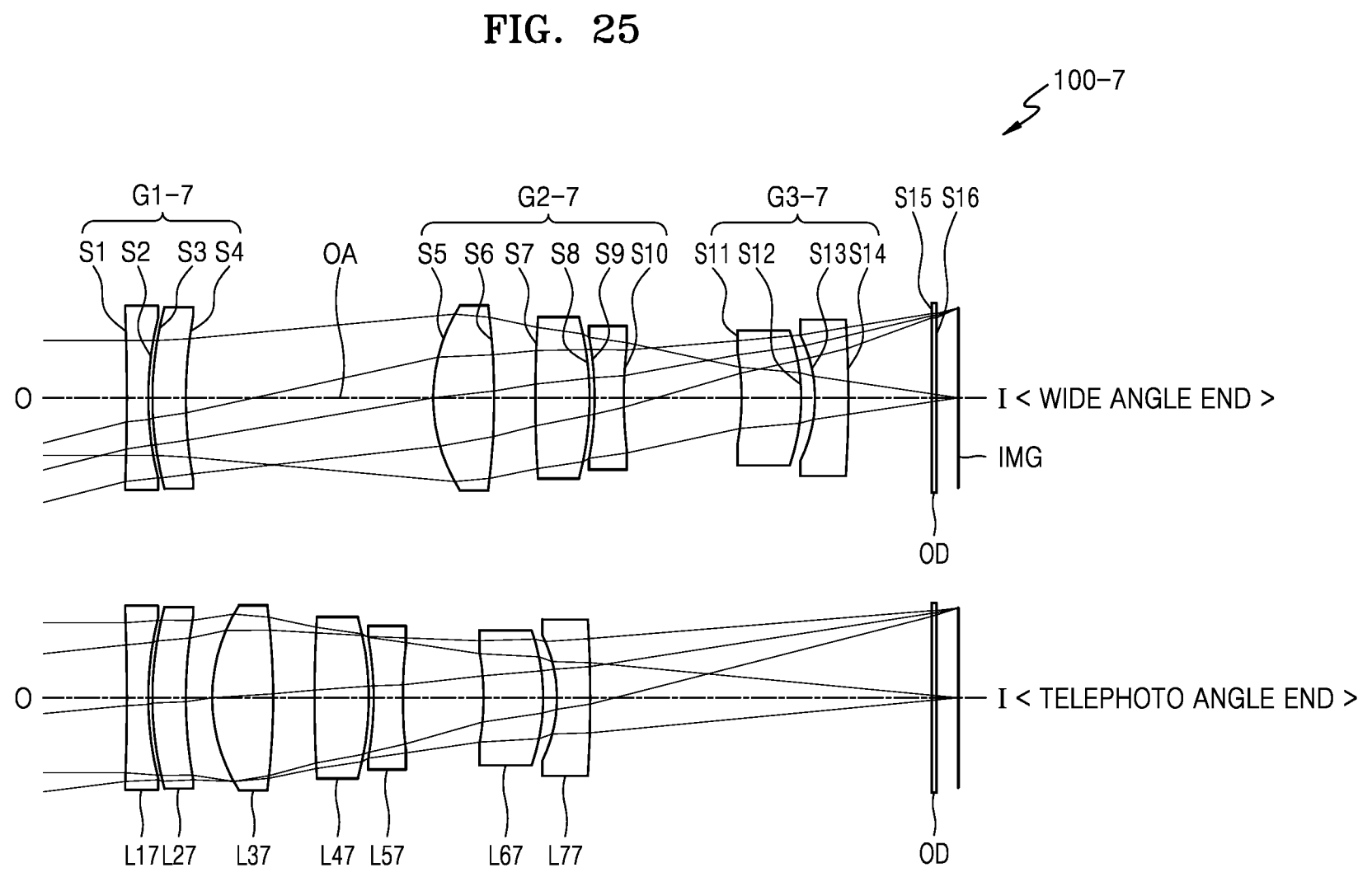

FIG. 25 illustrates a lens assembly 100-7 of a seventh numerical example according to an embodiment of the disclosure.

The lens assembly 100-7 may include a first lens L17, a second lens L27, a third lens L37, a fourth lens L47, a fifth lens L57, a sixth lens L67, and a seventh lens L77, which area arranged from the object side O to the image side I. A first lens group G1-7 may include the first lens L17 and the second lens L27, a second lens group G2-7 may include the third lens L37, the fourth lens L47, and the fifth lens L57, and a third lens group G3-7 may include the sixth lens L67 and the seventh lens L77. The first lens L17 and the second lens L27 may each be an aspherical glass lens. The third lens L37 may be a biconvex lens, and the fourth lens L47 may be a biconvex lens, and the fifth lens L57 may be a bi-concave lens. The sixth lens L67 may have positive refractive power, and the seventh lens L77 may have negative refractive power. For example, the sixth lens L67 may be a meniscus lens concave to the object side O, and the seventh lens L77 may be a bi-concave lens. The first to seventh lenses L17, L27, L37, L47, L57, L67, and L77 may each be a bi-aspherical lens.

Figure 26:
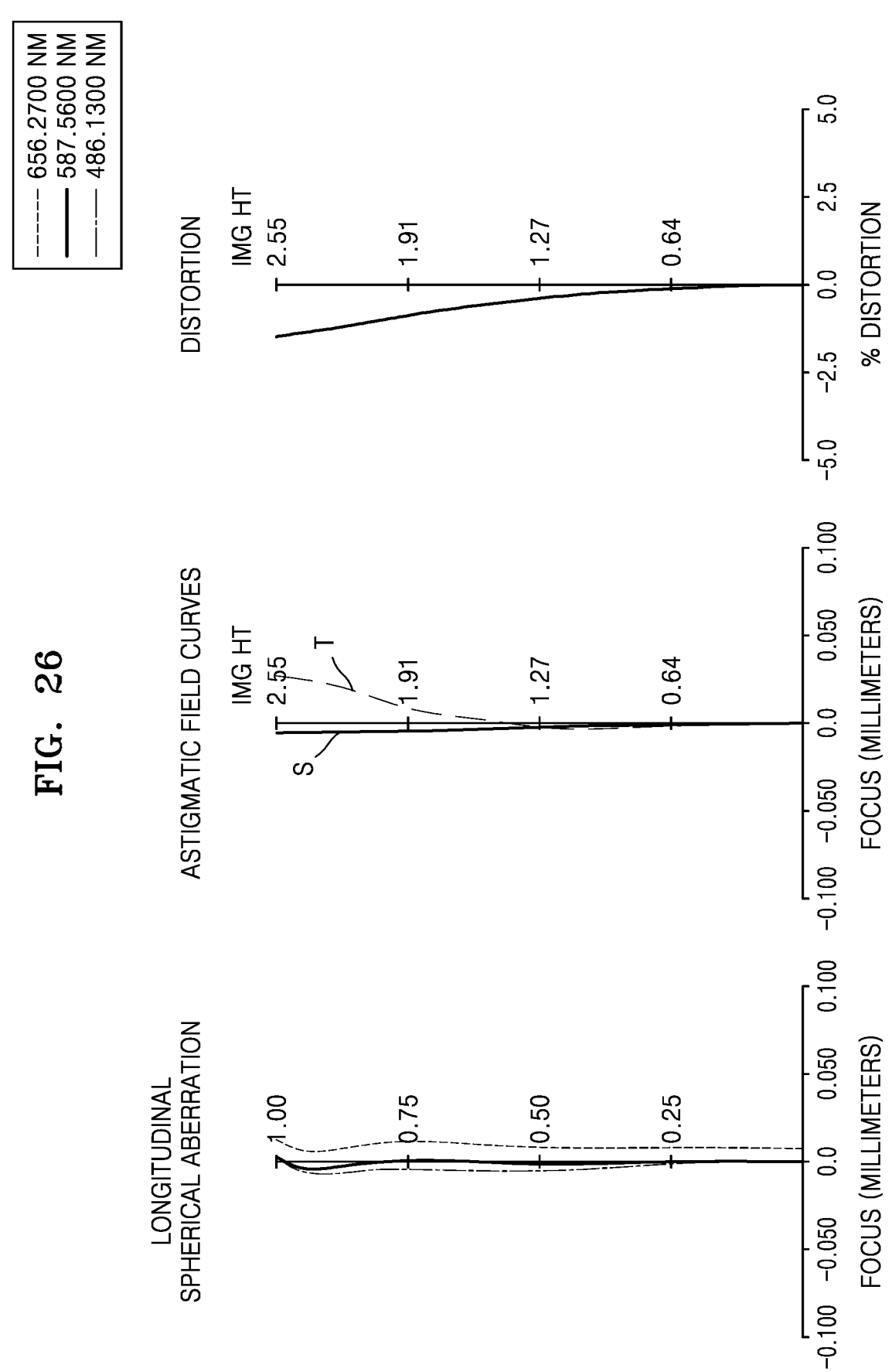
FIG. 26 is an aberration diagram of the lens assembly of the seventh numerical example according to an embodiment of the disclosure, at a wide angle end.
Figure 27:
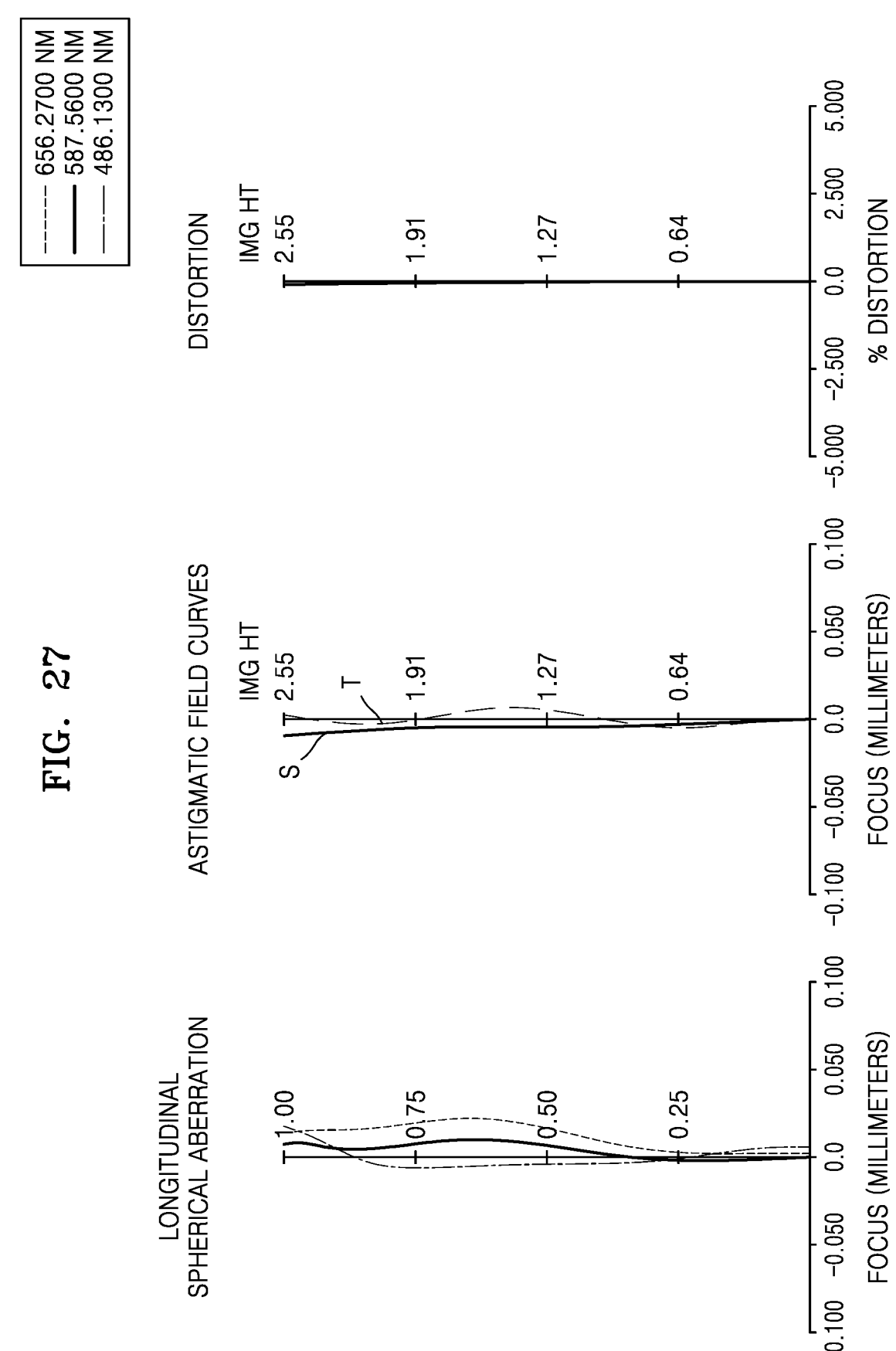
FIG. 27 is an aberration diagram of the lens assembly of the seventh numerical example according to an embodiment of the disclosure, at a telephoto angle end.

FIG. 26 illustrates the longitudinal spherical aberration, astigmatic field curves, and distortion of the lens assembly 100-7 of the seventh numerical example at the wide angle end. FIG. 27 illustrates the longitudinal spherical aberration, astigmatic field curves, and distortion of the lens assembly 100-7 of the seventh numerical example at the telephoto angle end.

Figure 28:
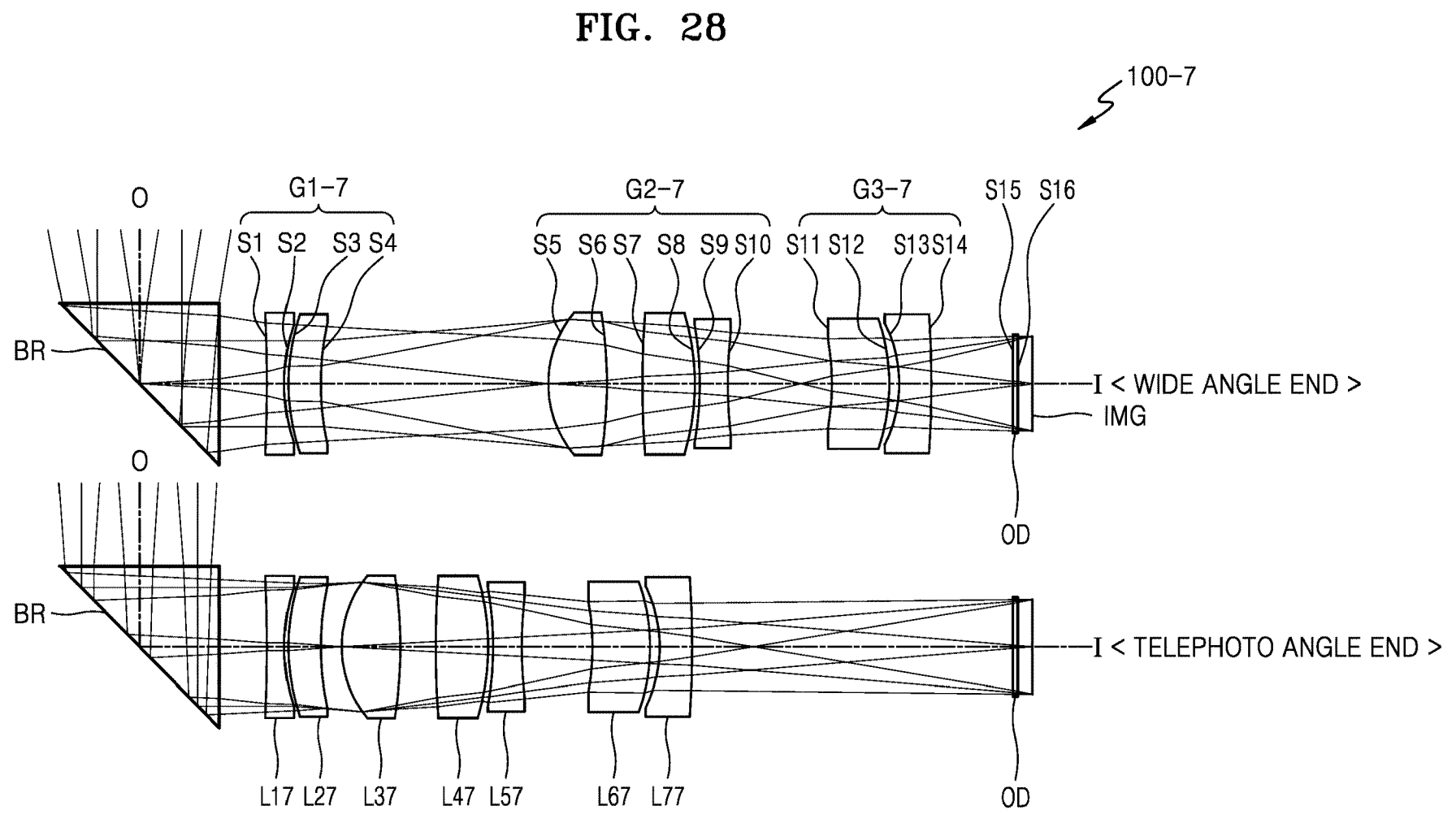

FIG. 28 illustrates an example in which the reflection member BR is further provided at the object side O of the lens assembly 100-7.

Figure 29:
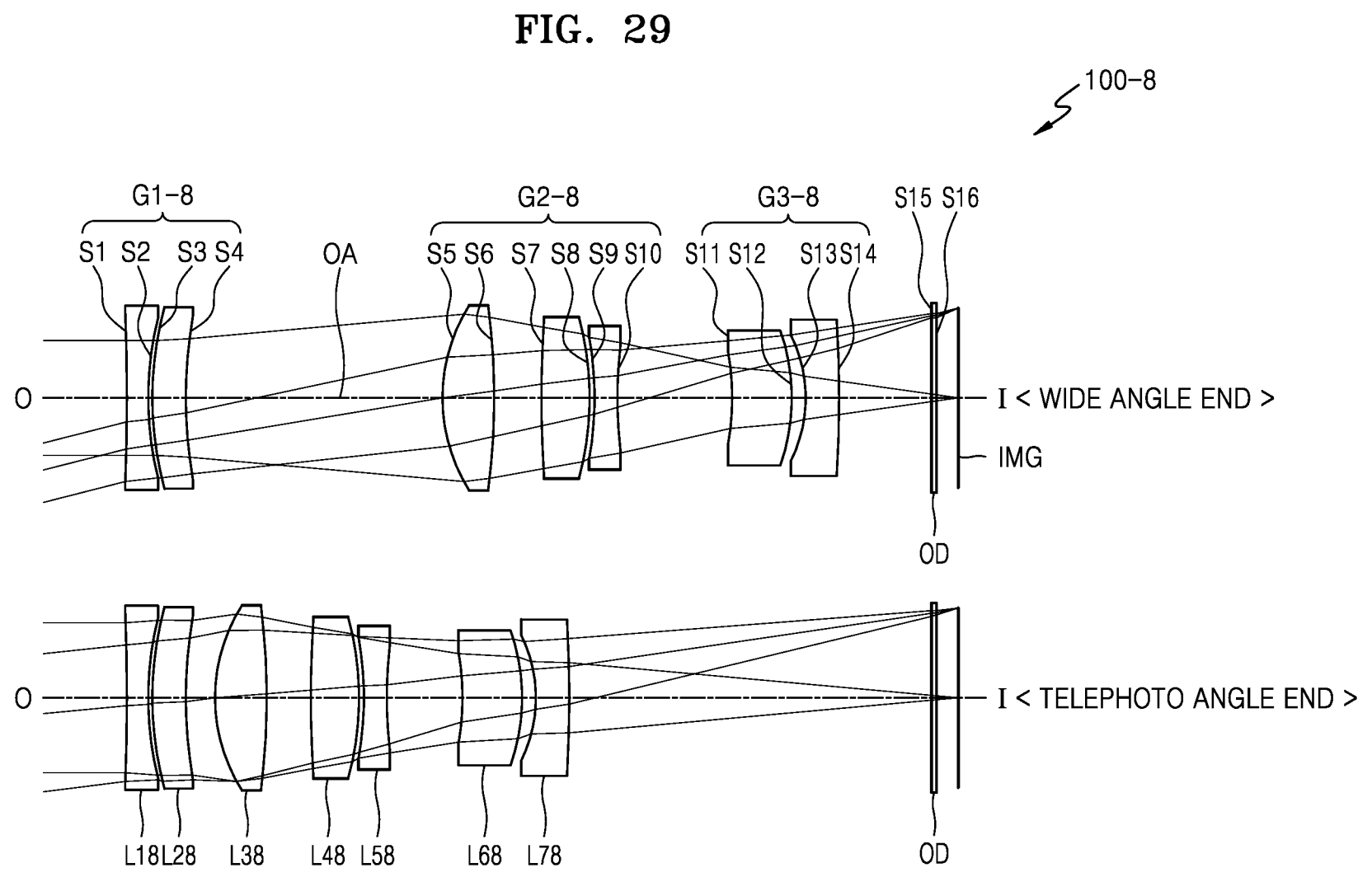

FIG. 29 illustrates a lens assembly 100-8 of an eighth numerical example according to an embodiment of the disclosure.

The lens assembly 100-8 may include a first lens L18, a second lens L28, a third lens L38, a fourth lens L48, a fifth lens L58, a sixth lens L68, and a seventh lens L78, which are arranged from the object side O to the image side I. A first lens group G1-8 may include the first lens L18 and the second lens L28, a second lens group G2-8 may include the third lens L38, the fourth lens L48, and the fifth lens L58, and a third lens group G3-8 may include the sixth lens L68 and the seventh lens L78. The first lens L18 and the second lens L28 may each be an aspherical glass lens. The third lens L38 may be a biconvex lens, and the fourth lens L48 may be a biconvex lens, and the fifth lens L58 may be a bi-concave lens. The sixth lens L68 may have positive refractive power, and the seventh lens L78 may have negative refractive power. For example, the sixth lens L68 may be a meniscus lens concave to the object side O, and the seventh lens L78 may be a meniscus lens concave to the object side O. The first to seventh lenses L18, L28, L38, L48, L58, L68, and L78 may each be a bi-aspherical lens.

Figure 30:
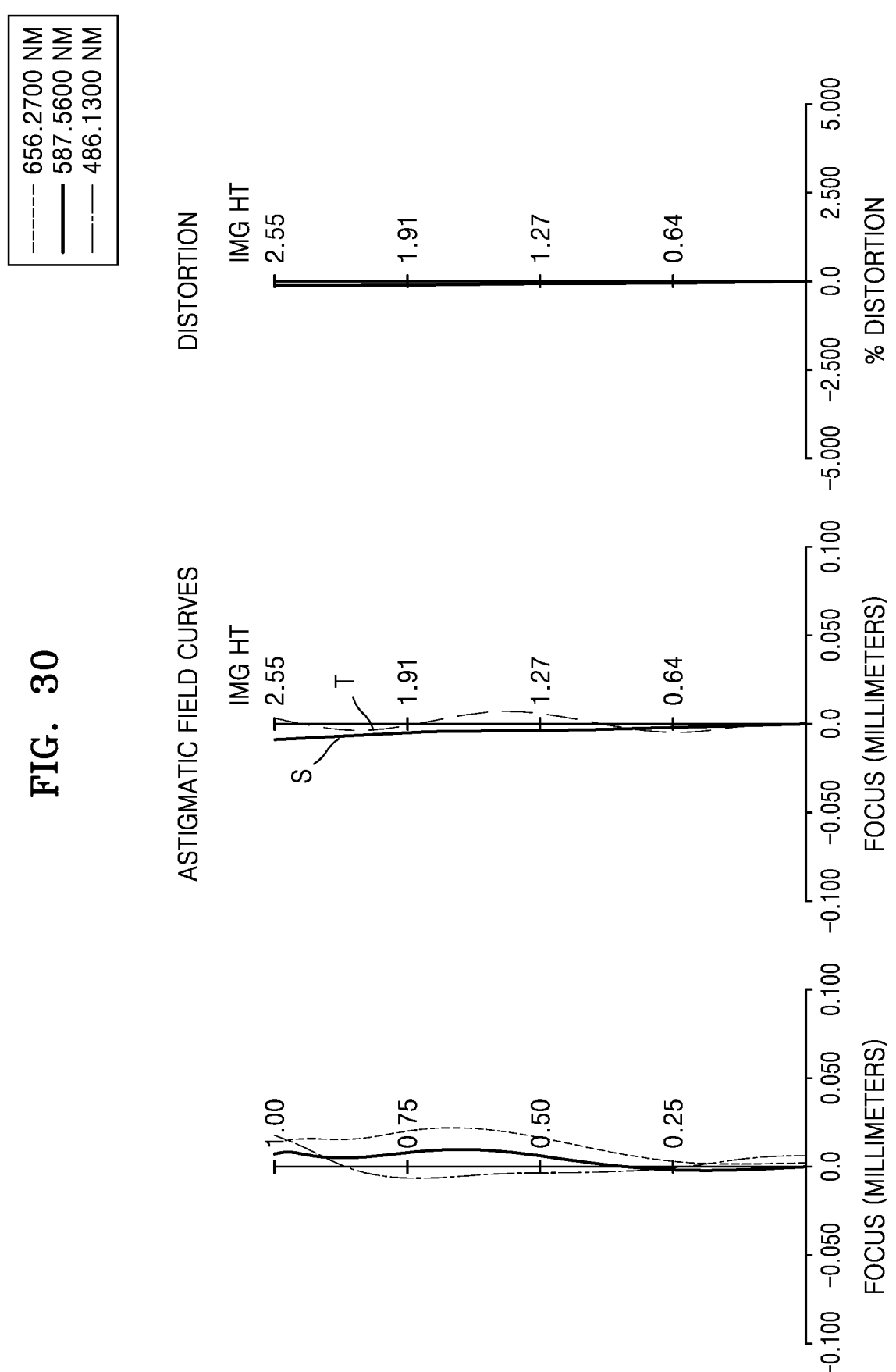
FIG. 30 is an aberration diagram of the lens assembly of the eighth numerical example according to an embodiment of the disclosure, at a wide angle end.
Figure 31:
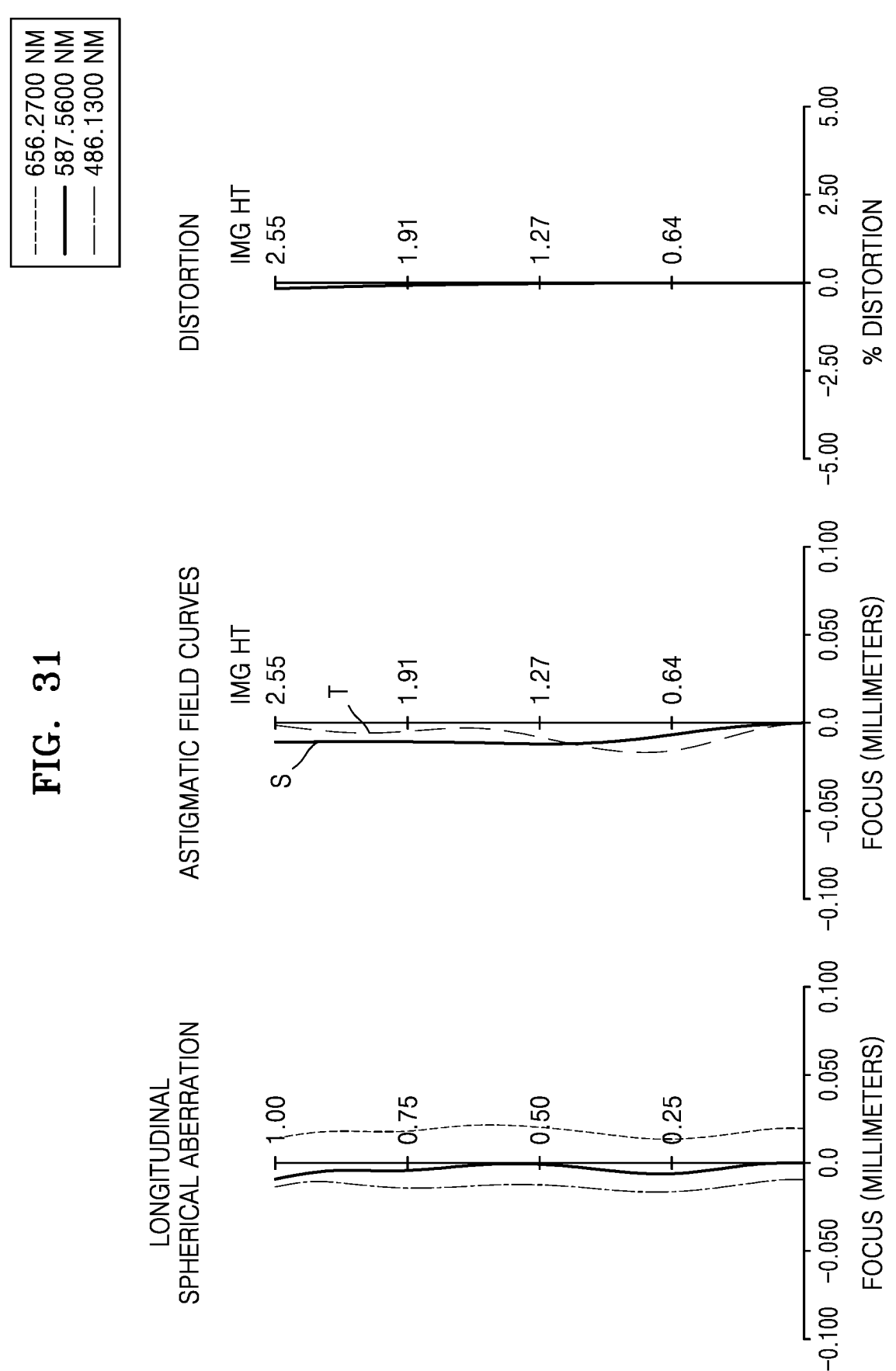
FIG. 31 is an aberration diagram of the lens assembly of the eighth numerical example according to an embodiment of the disclosure, at a telephoto angle end.

FIG. 30 illustrates the longitudinal spherical aberration, astigmatic field curves, and distortion of the lens assembly 100-8 of the eighth numerical example at the wide angle end. FIG. 31 illustrates the longitudinal spherical aberration, astigmatic field curves, and distortion of the lens assembly 100-8 of the eighth numerical example at the telephoto angle end.

Figure 32:
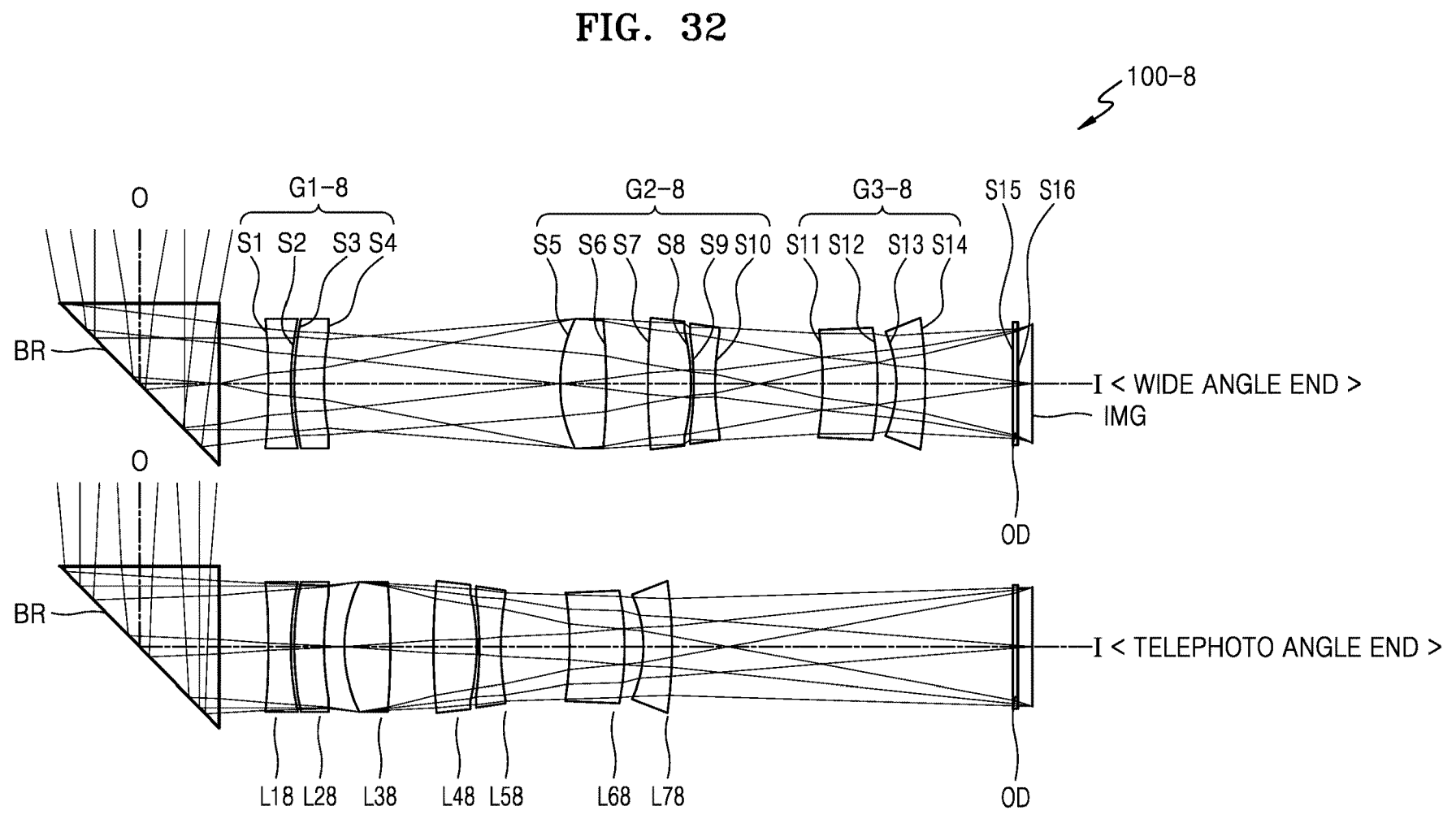

FIG. 32 illustrates an example in which the reflection member BR is further provided at the object side O of the lens assembly 100-8.

An aspherical surface used for a lens assembly according to an embodiment of the disclosure is defined as follows.

When an optical axis direction is the X-axis and the direction perpendicular to the optical axis direction is the Y-axis, aspherical shape may be expressed by the following equation with a light ray proceeding direction as being positive. In the equation, x denotes a distance from the apex of a lens in the optical axis direction, y denotes a distance in a direction perpendicular to the optical axis, K denotes a conic constant, A, B, C, D . . . denote aspherical coefficients, and c denotes a reciprocal (1/R) of a curvature radius at the apex of a lens.

$$x = \frac{cy^2}{1 + \sqrt{1 - (K+1)c^2y^2}} + Ay^4 + By^6 + Cy^8 + Dy^{10} + \dots \qquad < \text{Equation 1} >$$

In this document, a lens assembly may be embodied through numeral examples according to various different designs as follows.

In each numerical example, lens surface numbers such as S1, S2, S3 . . . Sn, where n is a natural number, are assigned sequentially and linearly from the object side O to the image side I. f denotes the focal length of the lens assembly, fn denotes the focal length of a lens included in the lens assembly, FNO denotes an F number, 2w denotes a viewing angle, R denotes a curvature radius, Dn denotes the thickness of a lens or an air interval between lenses, Nd denotes a refractive index, and Vd denotes an Abbe number. ST denotes a stop, and obj denotes an object. * denotes an aspherical surface.

First Numerical Example

FIG. 1 illustrates the lens assembly 100-1 of the first numerical example according to an embodiment of the disclosure, and Table 1 shows, for example, design data of the first numerical example.

f: 9.7 mm to 27.6 mm, FNO: 2.7 to 5.37, 2w=30.28° to 10.57°

TABLE 1

| Lens Surface | R | Dn | Nd | Vd | fn |
|---|---|---|---|---|---|
| obj | infinity | infinity | | | |
| S1* | −34.833 | 0.70 | 1.544 | 56.09 | −13.2 |
| S2* | 9.116 | 0.13 | | | |
| S3* | 9.958 | 0.96 | 1.650 | 21.52 | 37.1 |
| S4* | 16.313 | 10.33 | | | |
| S5 (ST)* | 5.175 | 1.57 | 1.497 | 81.56 | 10.4 |
| S6* | −1246.455 | 0.91 | | | |
| S7* | 36.709 | 1.40 | 1.544 | 56.09 | 9.7 |
| S8* | −6.102 | 0.10 | | | |
| S9* | −5.626 | 0.92 | 1.614 | 25.94 | −12.9 |
| S10* | −20.449 | 4.35 | | | |
| S11* | −13.722 | 2.12 | 1.671 | 19.23 | 28.9 |
| S12* | −8.532 | 0.75 | | | |
| S13* | −6.397 | 0.77 | 1.535 | 55.71 | −9.8 |
| S14* | 29.641 | 2.28 | | | |
| S15 | infinity | 0.11 | 1.517 | 64.2 | |
| S16 | infinity | 0.61 | | | |
| IMG | infinity | — | | | |

Table 2 shows intervals between the lens groups changed during zooming in the first numerical example.

TABLE 2

| | Wide Angle End | Telephoto Angle End |
|---|---|---|
| D1 | 10.34 | 0.75 |
| D2 | 4.35 | 2.46 |
| D3 | 2.28 | 13.76 |

Table 3 shows aspherical coefficients in the first numerical example.

TABLE 3

| Lens Surface | K (Conic) | A (4th) | B (6th) | C (8th) | D(10th) |
|---|---|---|---|---|---|
| S1 | 19.2517 | −4.6149E−05 | −2.9809E−05 | −2.7225E−06 | 3.3386E−07 |
| S2 | −0.0804 | 2.0424E−04 | −5.8526E−05 | −2.2875E−06 | −1.0685E−07 |
| S3 | 0.0000 | −7.9623E−04 | −3.3258E−05 | 1.1677E−07 | 2.9500E−07 |
| S4 | −1.6252 | −1.0326E−03 | −2.4906E−05 | 2.9433E−06 | 3.3147E−07 |
| S5 | −0.1074 | −5.7781E−04 | −1.8912E−05 | −2.4642E−06 | −6.2311E−08 |
| S6 | −50.0000 | −6.7839E−04 | 6.1743E−06 | 2.8280E−06 | 1.1801E−07 |
| S7 | −28.6820 | −8.2458E−04 | −3.6518E−05 | 1.0984E−06 | 2.3700E−06 |
| S8 | −5.3699 | 6.8595E−05 | −1.0957E−04 | 5.9769E−07 | 1.9875E−06 |
| S9 | −6.8161 | 1.6021E−03 | 6.5499E−05 | −3.4961E−06 | −2.4901E−07 |
| S10 | −91.3129 | 2.8437E−03 | 1.0628E−04 | 1.8141E−05 | −4.5325E−06 |
| S11 | −29.5639 | 2.3288E−03 | −2.7689E−03 | 3.5959E−03 | −2.6047E−03 |
| S12 | −19.9912 | 3.0801E−03 | −9.5188E−03 | 1.2349E−02 | −9.0254E−03 |
| S13 | −79.5637 | −3.4350E−02 | 6.4698E−03 | 9.4773E−03 | −1.1397E−02 |
| S14 | 60.3999 | −3.5124E−03 | −1.0250E−02 | 1.4759E−02 | −1.1045E−02 |

TABLE 3-continued

| Lens Surface | E (12th) | F (14th) | G (16th) | H (18th) | J (20th) |
|---|---|---|---|---|---|
| S1 | −5.9377E−09 | 0.0000E+00 | 0.0000E+00 | 0.0000E+00 | 0.0000E+00 |
| S2 | 2.4044E−08 | 0.0000E+00 | 0.0000E+00 | 0.0000E+00 | 0.0000E+00 |
| S3 | −2.2217E−08 | 0.0000E+00 | 0.0000E+00 | 0.0000E+00 | 0.0000E+00 |
| S4 | −3.3229E−08 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | −1.3083E−09 | 0.0000E+00 | 0.0000E+00 | 0.0000E+00 | 0.0000E+00 |
| S7 | −1.1037E−07 | 0.0000E+00 | 0.0000E+00 | 0.0000E+00 | 0.0000E+00 |
| S8 | −1.0934E−07 | 0.0000E+00 | 0.0000E+00 | 0.0000E+00 | 0.0000E+00 |
| S9 | 4.2012E−08 | 0.0000E+00 | 0.0000E+00 | 0.0000E+00 | 0.0000E+00 |
| S10 | 5.5797E−07 | −1.5395E−08 | 0.0000E+00 | 0.0000E+00 | 0.0000E+00 |
| S11 | 1.1574E−03 | −3.2283E−04 | 5.5152E−05 | −5.2800E−06 | 2.1701E−07 |
| S12 | 4.0915E−03 | −1.1748E−03 | 2.0794E−04 | −2.0667E−05 | 8.7961E−07 |
| S13 | 6.0857E−03 | −1.8680E−03 | 3.3853E−04 | −3.3588E−05 | 1.3978E−06 |
| S14 | 4.9641E−03 | −1.3754E−03 | 2.3012E−04 | −2.1293E−05 | 8.3466E−07 |

Second Numerical Example

FIG. 5 illustrates the lens assembly 100-2 of the second numerical example according to an embodiment of the disclosure, and Table 4 shows, for example, design data in the second numerical example.

f: 11.4 mm to 27.6 mm, FNO: 3.0 to 5.4, 2w=25.6° to 10.6°

TABLE 4

| Lens Surface | R | Dn | Nd | Vd | fn |
|---|---|---|---|---|---|
| obj | infinity | infinity | | | |
| S1* | −35.356 | 0.73 | 1.544 | 56.09 | −14.2 |
| S2* | 9.957 | 0.06 | | | |
| S3* | 9.432 | 1.00 | 1.650 | 21.52 | 40.4 |
| S4* | 14.089 | D1 | | | |
| S5 (ST)* | 5.475 | 1.43 | 1.497 | 81.56 | 11.8 |
| S6* | 78.680 | 1.87 | | | |
| S7* | 14.021 | 1.34 | 1.544 | 56.09 | 9.7 |
| S8* | −8.117 | 0.12 | | | |
| S9* | −7.926 | 1.34 | 1.635 | 23.89 | −14.0 |
| S10* | −76.724 | D2 | | | |
| S11* | −11.647 | 2.05 | 1.671 | 19.23 | 26.1 |
| S12* | −7.484 | 0.61 | | | |

TABLE 4-continued

| Lens Surface | R | Dn | Nd | Vd | fn |
|---|---|---|---|---|---|
| S13* | −7.122 | 1.50 | 1.535 | 55.71 | −9.4 |
| S14* | 18.473 | D3 | | | |
| S15 | infinity | 0.11 | 1.517 | 64.2 | |
| S16 | infinity | 0.61 | | | |
| IMG | infinity | — | | | |

Table 5 shows intervals between the lens groups changed during zooming in the second numerical example.

TABLE 5

| | Wide Angle End | Telephoto Angle End |
|---|---|---|
| D1 | 8.75 | 0.60 |
| D2 | 3.71 | 2.26 |
| D3 | 2.64 | 12.26 |

Table 6 shows aspherical coefficients in the second numerical example.

TABLE 6

| Lens Surface | K (Conic) | A (4th) | B (6th) | C (8th) | D (10th) |
|---|---|---|---|---|---|
| S1 | 0.0000 | 2.7522E−05 | −2.8815E−05 | −1.0534E−06 | −1.9252E−08 |
| S2 | −0.1646 | 1.9475E−04 | −4.7102E−05 | −3.3346E−06 | 6.5300E−08 |
| S3 | −0.0315 | −7.4850E−04 | −3.7832E−05 | 1.6996E−06 | 2.4021E−07 |
| S4 | −0.1643 | −9.3196E−04 | −1.3975E−05 | 1.9595E−06 | 4.3241E−07 |
| S5 | −0.0984 | −6.0797E−04 | −5.9352E−06 | −1.1980E−06 | 6.2788E−08 |
| S6 | 69.3140 | −8.0446E−04 | 9.6679E−06 | 2.5194E−06 | 2.5731E−08 |
| S7 | −14.8122 | −6.8251E−04 | −5.3957E−05 | 1.9100E−07 | 2.6229E−06 |
| S8 | −5.3182 | 1.1901E−04 | −8.5031E−05 | 2.0177E−06 | 1.9022E−06 |
| S9 | −6.5003 | 1.3039E−03 | 4.0026E−06 | −8.3524E−06 | −3.0004E−07 |
| S10 | 23.4254 | 2.0928E−03 | 2.5313E−05 | 8.6225E−06 | −4.8112E−06 |
| S11 | −27.3618 | 1.9874E−03 | −2.3329E−03 | 3.0138E−03 | −2.3310E−03 |
| S12 | −17.9711 | 2.5123E−03 | −9.4808E−03 | 1.1652E−02 | −8.6015E−03 |
| S13 | −99.0000 | −2.9053E−02 | 6.9341E−03 | 4.4831E−03 | −7.2866E−03 |
| S14 | 19.6994 | −2.8533E−03 | −5.6821E−03 | 7.0356E−03 | −4.9634E−03 |

| Lens Surface | E (12th) | F (14th) | G (16th) | H (18th) | J (20th) |
|---|---|---|---|---|---|
| S1 | 5.7509E−09 | 0.0000E+00 | 0.0000E+00 | 0.0000E+00 | 0.0000E+00 |
| S2 | 7.2284E−09 | 0.0000E+00 | 0.0000E+00 | 0.0000E+00 | 0.0000E+00 |
| S3 | −9.3117E−09 | 0.0000E+00 | 0.0000E+00 | 0.0000E+00 | 0.0000E+00 |
| S4 | −3.6369E−08 | 1.2174E−09 | 0.0000E+00 | 0.0000E+00 | 0.0000E+00 |
| S5 | 6.3322E−09 | 0.0000E+00 | 0.0000E+00 | 0.0000E+00 | 0.0000E+00 |
| S6 | 4.6084E−09 | 0.0000E+00 | 0.0000E+00 | 0.0000E+00 | 0.0000E+00 |
| S7 | −8.2791E−08 | 0.0000E+00 | 0.0000E+00 | 0.0000E+00 | 0.0000E+00 |
| S8 | −6.3917E−08 | 0.0000E+00 | 0.0000E+00 | 0.0000E+00 | 0.0000E+00 |
| S9 | 4.4584E−08 | 0.0000E+00 | 0.0000E+00 | 0.0000E+00 | 0.0000E+00 |

TABLE 6-continued

| | | | | | |
|---|---|---|---|---|---|
| S10 | 7.2121E-07 | -3.7361E-08 | 0.0000E+00 | 0.0000E+00 | 0.0000E+00 |
| S11 | 1.1263E-03 | -3.3928E-04 | 6.1746E-05 | -6.2037E-06 | 2.6379E-07 |
| S12 | 4.0180E-03 | -1.1832E-03 | 2.1271E-04 | -2.1298E-05 | 9.0834E-07 |
| S13 | 4.5040E-03 | -1.5525E-03 | 3.1138E-04 | -3.3997E-05 | 1.5612E-06 |
| S14 | 2.1799E-03 | -5.9462E-04 | 9.7673E-05 | -8.8271E-06 | 3.3632E-07 |

Third Numerical Example

FIG. 9 illustrates the lens assembly 100-3 of the third numerical example according to an embodiment of the disclosure, and Table 7 shows, for example, design data of the third numerical example.

f: 11.4 mm to 25.5 mm, FNO: 3.0 to 5.1, 2w=25.5° to 11.4°

TABLE 7

| Lens Surface | R | Dn | Nd | Vd | fn |
|---|---|---|---|---|---|
| obj | infinity | infinity | | | |
| S1* | -32.612 | 0.73 | 1.544 | 56.09 | -13.8 |
| S2* | 9.808 | 0.11 | | | |
| S3* | 10.603 | 1.01 | 1.650 | 21.52 | 38.4 |
| S4* | 17.733 | D1 | | | |
| S5 (ST)* | 5.465 | 1.54 | 1.497 | 81.56 | 11.7 |
| S6* | 79.382 | 1.73 | | | |
| S7* | 14.073 | 1.34 | 1.544 | 56.09 | 9.5 |
| S8* | -7.904 | 0.12 | | | |
| S9* | -7.544 | 1.48 | 1.635 | 23.89 | -14.1 |
| S10* | -51.142 | D2 | | | |
| S11* | -10.844 | 2.05 | 1.671 | 19.23 | 27.5 |
| S12* | -7.352 | 0.63 | | | |

TABLE 7-continued

| Lens Surface | R | Dn | Nd | Vd | fn |
|---|---|---|---|---|---|
| S13* | -7.285 | 1.32 | 1.535 | 55.71 | -10.0 |
| S14* | 21.629 | D3 | | | |
| 18 | infinity | 0.11 | 1.517 | 64.2 | |
| 19 | infinity | 0.61 | | | |
| IMG | infinity | — | | | |

Table 8 shows intervals between the lens groups changed during zooming in the third numerical example.

TABLE 8

| | Wide Angle End | Telephoto Angle End |
|---|---|---|
| D1 | 7.98 | 0.60 |
| D2 | 3.71 | 2.08 |
| D3 | 2.65 | 11.66 |

Table 9 shows aspherical coefficients in the third numerical example.

TABLE 9

| Lens Surface | K (Conic) | A (4th) | B (6th) | C (8th) | D (10th) |
|---|---|---|---|---|---|
| S1 | 0.0000 | 2.6360E-05 | -2.9585E-05 | -9.6051E-07 | 2.2363E-08 |
| S2 | -0.1913 | 1.9057E-04 | -4.7160E-05 | -3.0295E-06 | 1.3875E-07 |
| S3 | -0.0039 | -7.4506E-04 | -3.6430E-05 | 1.7551E-06 | 2.3554E-07 |
| S4 | -0.1058 | -9.3042E-04 | -1.5371E-05 | 1.7597E-06 | 3.9280E-07 |
| S5 | -0.0991 | -6.0641E-04 | -6.6455E-06 | -1.4489E-06 | 5.7320E-08 |
| S6 | 70.0000 | -8.0004E-04 | 9.5920E-06 | 2.5415E-06 | 1.3575E-08 |
| S7 | -14.8963 | -6.7560E-04 | -4.9985E-05 | 6.2041E-07 | 2.6401E-06 |
| S8 | -5.3731 | 1.2549E-04 | -8.5760E-05 | 1.7820E-06 | 1.8917E-06 |
| S9 | -6.4258 | 1.2952E-03 | 4.6558E-06 | -8.0947E-06 | -3.0150E-07 |
| S10 | -65.5433 | 2.1354E-03 | 3.5191E-05 | 8.6394E-06 | -4.7896E-06 |
| S11 | -25.5072 | 1.1927E-03 | -6.7363E-04 | 8.2292E-04 | -5.7755E-04 |
| S12 | -18.3895 | 4.6306E-04 | -4.1897E-03 | 5.4940E-03 | -4.2332E-03 |
| S13 | -93.7730 | -2.9188E-02 | 1.2635E-02 | -4.0890E-03 | -2.3032E-04 |
| S14 | 25.1041 | -4.5775E-03 | -2.5845E-03 | 3.7706E-03 | -2.8215E-03 |

| Lens Surface | E (12th) | F (14th) | G (16th) | H (18th) | J (20th) |
|---|---|---|---|---|---|
| S1 | 1.0942E-08 | 0.0000E+00 | 0.0000E+00 | 0.0000E+00 | 0.0000E+00 |
| S2 | 2.3304E-08 | 0.0000E+00 | 0.0000E+00 | 0.0000E+00 | 0.0000E+00 |
| S3 | -1.3218E-08 | 0.0000E+00 | 0.0000E+00 | 0.0000E+00 | 0.0000E+00 |
| S4 | -4.2062E-08 | 5.9231E-10 | 0.0000E+00 | 0.0000E+00 | 0.0000E+00 |
| S5 | 6.4542E-09 | 0.0000E+00 | 0.0000E+00 | 0.0000E+00 | 0.0000E+00 |
| S6 | 6.2937E-09 | 0.0000E+00 | 0.0000E+00 | 0.0000E+00 | 0.0000E+00 |
| S7 | -8.8092E-08 | 0.0000E+00 | 0.0000E+00 | 0.0000E+00 | 0.0000E+00 |
| S8 | -6.5495E-08 | 0.0000E+00 | 0.0000E+00 | 0.0000E+00 | 0.0000E+00 |
| S9 | 4.2042E-08 | 0.0000E+00 | 0.0000E+00 | 0.0000E+00 | 0.0000E+00 |
| S10 | 7.4099E-07 | -4.0873E-08 | 0.0000E+00 | 0.0000E+00 | 0.0000E+00 |
| S11 | 2.5184E-04 | -6.7303E-05 | 1.0343E-05 | -7.7663E-07 | 1.6542E-08 |
| S12 | 2.0730E-03 | -6.4829E-04 | 1.2540E-04 | -1.3623E-05 | 6.3209E-07 |
| S13 | 9.3879E-04 | -4.4289E-04 | 1.0482E-04 | -1.2911E-05 | 6.5228E-07 |
| S14 | 1.2883E-03 | -3.6299E-04 | 6.1642E-05 | -5.7744E-06 | 2.2853E-07 |

Fourth Numerical Example

FIG. 13 illustrates the lens assembly 100-4 of the fourth numerical example according to an embodiment of the disclosure, and Table 10 shows, for example, design data of the fourth numerical example.

f: 11.4 mm to 27.6 mm FNO: 3.0 to 5.3, 2w=25.6° to 11.4°

TABLE 10

| Lens Surface | R | Dn | Nd | Vd | fn |
|---|---|---|---|---|---|
| obj | infinity | infinity | | | |
| S1 | −17.983 | 0.70 | 1.834 | 37.34 | −9.5 |
| S2 | 14.478 | 1.04 | 1.923 | 20.88 | 18.1 |
| S3 | 106.745 | D1 | | | |
| S4 (ST)* | 5.157 | 1.86 | 1.497 | 81.56 | 9.1 |
| S5* | −31.170 | 1.00 | | | |
| S6* | 32.183 | 1.26 | 1.544 | 56.09 | 13.2 |
| S7* | −9.128 | 0.10 | | | |
| S8* | −9.320 | 1.72 | 1.614 | 25.94 | −11.8 |
| S9* | 34.399 | D2 | | | |
| S10* | −10.677 | 2.15 | 1.635 | 23.89 | 17.3 |
| S11* | −5.845 | 0.50 | | | |
| S12* | −5.861 | 0.93 | 1.544 | 56.09 | −8.7 |

TABLE 10-continued

| Lens Surface | R | Dn | Nd | Vd | fn |
|---|---|---|---|---|---|
| S13* | 26.419 | D3 | | | |
| S14 | infinity | 0.11 | 1.517 | 64.2 | |
| S15 | infinity | 0.61 | | | |
| IMG | infinity | — | | | |

Table 11 shows intervals between the lens groups changed during zooming in the fourth numerical example.

TABLE 11

| | Wide Angle End | Telephoto Angle End |
|---|---|---|
| D1 | 7.98 | 0.60 |
| D2 | 3.71 | 2.08 |
| D3 | 2.65 | 11.66 |

Table 12 shows aspherical coefficients in the fourth numerical example.

TABLE 12

| Lens Surface | K (Conic) | A (4th) | B (6th) | C (8th) | D (10th) |
|---|---|---|---|---|---|
| S4 | 0.0029 | −5.8403E−04 | −2.2389E−05 | −5.6149E−07 | 0.0000E+00 |
| S5 | −46.4138 | −5.7437E−04 | 8.7349E−06 | 3.0254E−06 | 0.0000E+00 |
| S6 | −6.0159 | −7.2643E−04 | −3.0616E−05 | 3.1741E−06 | 1.5866E−06 |
| S7 | −7.3513 | 3.1186E−04 | −9.4103E−05 | 9.2282E−07 | 1.6524E−06 |
| S8 | −5.9658 | 1.2683E−03 | 2.8672E−05 | −7.7852E−06 | −3.1406E−07 |
| S9 | −99.0000 | 2.3734E−03 | 1.6935E−04 | 7.7374E−06 | −4.0961E−06 |
| S10 | −19.5037 | 1.5018E−03 | −3.6049E−04 | 2.7661E−04 | −5.1900E−05 |
| S11 | −12.1221 | −5.7335E−04 | −1.7180E−03 | 1.2732E−03 | −3.5388E−04 |
| S12 | −38.9690 | −2.4854E−02 | 5.6864E−03 | −7.4977E−04 | −3.0797E−04 |
| S13 | −62.8553 | −6.1505E−03 | −1.4185E−03 | 1.7897E−03 | −9.3541E−04 |

| Lens Surface | E (12th) | F (14th) | G (16th) | H (18th) | J (20th) |
|---|---|---|---|---|---|
| S4 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S7 | 0.0000E+00 | 0.0000E+00 | 0.0000E+00 | 0.0000E+00 | 0.0000E+00 |
| S8 | 6.8450E−09 | 0.0000E+00 | 0.0000E+00 | 0.0000E+00 | 0.0000E+00 |
| S9 | 3.8316E−07 | −2.1437E−08 | 0.0000E+00 | 0.0000E+00 | 0.0000E+00 |
| S10 | −3.2469E−05 | 1.8941E−05 | −3.6685E−06 | 2.4901E−07 | 0.0000E+00 |
| S11 | −8.3119E−05 | 8.1335E−05 | −2.1092E−05 | 2.3847E−06 | −1.0044E−07 |
| S12 | 1.1453E−04 | 6.6689E−06 | −6.2765E−06 | 6.0233E−07 | 0.0000E+00 |
| S13 | 2.8260E−04 | −4.7918E−05 | 4.2334E−06 | −1.5208E−07 | 0.0000E+00 |

Fifth Numerical Example

FIG. 17 illustrates the lens assembly 100-5 of the fifth numerical example according to an embodiment of the disclosure, and Table 13 shows, for example, design data of the fifth numerical example.

f: 11.4 mm to 27.8 mm, FNO: 3.0 to 5.3, 2w=25.5° to 10.5°

TABLE 13

| Lens Surface | R | Dn | Nd | Vd | fn |
|---|---|---|---|---|---|
| obj | infinity | infinity | | | |
| S1 | −16.920 | 0.70 | 1.834 | 37.3 | −8.636 |
| S2 | 12.776 | 1.07 | 1.92286 | 20.9 | 16.176 |
| S3 | 85.063 | D1 | | | |
| S4 (ST)* | 4.613 | 2.35 | 1.4971 | 81.6 | 6.885 |
| S5* | −11.019 | 0.60 | | | |
| S6* | −28.201 | 2.01 | 1.63492 | 23.9 | −18.902 |
| S7* | 21.470 | D2 | | | |
| S8* | −9.403 | 2.01 | 1.63492 | 23.9 | 25.423 |
| S9* | −6.434 | 0.44 | | | |
| S10* | −6.671 | 0.94 | 1.5441 | 56.1 | −11.579 |
| S11* | 118.869 | D3 | | | |

TABLE 13-continued

| Lens Surface | R | Dn | Nd | Vd | fn |
|---|---|---|---|---|---|
| S12 | infinity | 0.11 | 1.517 | 64.2 | |
| S13 | infinity | 0.61 | | | |
| IMG | infinity | — | | | |

Table 14 shows intervals between the lens groups changed during zooming in the fifth numerical example.

TABLE 14

| | Wide Angle End | Telephoto Angle End |
|---|---|---|
| D1 | 7.98 | 0.60 |
| D2 | 3.71 | 2.08 |
| D3 | 2.65 | 11.66 |

Table 15 shows aspherical coefficients in the fifth numerical example.

TABLE 15

| Lens Surface | K (Conic) | A (4th) | B (6th) | C (8th) | D (10th) |
|---|---|---|---|---|---|
| S4 | −0.0160 | −5.7679E−04 | −3.0597E−05 | −2.1678E−06 | 0.0000E+00 |
| S5 | −14.2256 | −5.0214E−04 | 3.6297E−05 | 4.2691E−07 | 0.0000E+00 |
| S6 | 0.0000 | 7.3146E−04 | 5.4301E−05 | 8.7535E−06 | −4.2302E−07 |
| S7 | −18.2658 | 2.5791E−03 | 1.6405E−04 | 2.3107E−05 | −2.4727E−06 |
| S8 | −18.5050 | 1.7974E−03 | −3.4399E−04 | 2.7185E−04 | −5.2265E−05 |
| S9 | −14.6399 | −9.8127E−04 | −1.8563E−03 | 1.2786E−03 | −3.5394E−04 |
| S10 | −52.0084 | −2.7998E−02 | 5.4425E−03 | −7.7995E−04 | −2.8440E−04 |
| S11 | 36.4996 | −9.0944E−03 | −1.0660E−03 | 1.7214E−03 | −9.2519E−04 |

| Lens Surface | E (12th) | F (14th) | G (16th) | H (18th) | J (20th) |
|---|---|---|---|---|---|
| S4 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S7 | 3.5873E−07 | −1.2465E−08 | 0.0000E+00 | 0.0000E+00 | 0.0000E+00 |
| S8 | −3.2315E−05 | 1.8939E−05 | −3.6685E−06 | 2.4901E−07 | 0.0000E+00 |
| S9 | −8.2510E−05 | 8.1336E−05 | −2.1092E−05 | 2.3847E−06 | −1.0044E−07 |
| S10 | 1.1396E−04 | 6.6683E−06 | −6.2764E−06 | 6.0233E−07 | 0.0000E+00 |
| S11 | 2.8242E−04 | −4.7921E−05 | 4.2333E−06 | −1.5208E−07 | 0.0000E+00 |

Sixth Numerical Example

FIG. 21 illustrates the lens assembly 100-6 of the sixth numerical example according to an embodiment of the disclosure, and Table 16 shows, for example, design data of the sixth numerical example.

f: 10.2 mm to 23.6 mm, FNO: 2.7 to 4.6, 2w=28.6° to 12.4°

TABLE 16

| Lens Surface | R | Dn | Nd | Vd | fn |
|---|---|---|---|---|---|
| obj | infinity | infinity | | | |
| S1 | −13.991 | 0.70 | 1.834 | 37.3 | −7.215 |
| S2 | 10.799 | 1.12 | 1.92286 | 20.9 | 13.744 |
| S3 | 69.048 | D1 | | | |
| S4 (ST)* | 4.401 | 2.28 | 1.4971 | 81.6 | 6.291 |
| S5* | −8.946 | 0.51 | | | |
| S6* | −16.167 | 2.09 | 1.63493 | 23.9 | −20.063 |
| S7* | 63.095 | D2 | | | |
| S8* | −18.991 | 0.71 | 1.63359 | 24.1 | −32.974 |
| S9* | −211.703 | 1.25 | | | |
| S10* | −54.171 | 1.03 | 1.63493 | 23.9 | 13.297 |
| S11* | −7.358 | 0.35 | | | |
| S12* | −6.034 | 0.84 | 1.544 | 56.09 | −8.873 |

TABLE 16-continued

| Lens Surface | R | Dn | Nd | Vd | fn |
|---|---|---|---|---|---|
| S13* | 25.338 | D3 | | | |
| S14 | infinity | 0.11 | 1.517 | 64.2 | |
| S15 | infinity | 0.61 | | | |
| IMG | infinity | — | | | |

Table 17 shows intervals between the lens groups changed during zooming in the sixth numerical example.

TABLE 17

| | Wide Angle End | Telephoto Angle End |
|---|---|---|
| D1 | 7.98 | 0.60 |
| D2 | 3.71 | 2.08 |
| D3 | 2.65 | 11.66 |

Table 18 shows aspherical coefficients in the sixth numerical example.

TABLE 18

| Lens Surface | K (Conic) | A (4th) | B (6th) | C (8th) | D (10th) |
|---|---|---|---|---|---|
| S4 | −0.0328 | −6.0275E−04 | −3.2222E−05 | −3.0125E−06 | 0.0000E+00 |
| S5 | −11.3622 | −3.9030E−04 | 4.4819E−05 | −8.0884E−09 | 0.0000E+00 |
| S6 | 0.0000 | 1.0226E−03 | 5.9866E−05 | 1.0749E−05 | −6.4560E−07 |
| S7 | 0.0000 | 2.2400E−03 | 2.0922E−04 | 2.4937E−05 | −2.6683E−06 |
| S8 | −12.8703 | 1.3974E−03 | −5.2311E−04 | 2.6286E−04 | −6.3277E−05 |
| S9 | −99.0000 | −1.7809E−04 | −7.1627E−05 | −9.4711E−05 | −4.6370E−06 |
| S10 | −99.0000 | 2.2786E−04 | −2.7586E−04 | 6.3553E−06 | 2.3158E−07 |
| S11 | −26.3976 | −2.2621E−03 | −2.0299E−03 | 1.3458E−03 | −3.5448E−04 |
| S12 | −43.8380 | −2.6995E−02 | 5.9606E−03 | −9.0274E−04 | −2.8819E−04 |
| S13 | 0.0000 | −8.5404E−03 | −7.9599E−04 | 1.6148E−03 | −9.2137E−04 |

| Lens Surface | E (12th) | F (14th) | G (16th) | H (18th) | J (20th) |
|---|---|---|---|---|---|
| S4 | 0.0000E+00 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S7 | 3.4259E−07 | −1.2465E−08 | 0.0000E+00 | 0.0000E+00 | 0.0000E+00 |
| S8 | −3.2315E−05 | 1.8939E−05 | −3.6685E−06 | 2.4901E−07 | 0.0000E+00 |
| S9 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 |
| S11 | −8.2510E−05 | 8.1336E−05 | −2.1092E−05 | 2.3847E−06 | −1.0044E−07 |
| S12 | 1.1396E−04 | 6.6683E−06 | −6.2764E−06 | 6.0233E−07 | 0.0000E+00 |
| S13 | 2.8242E−04 | −4.7921E−05 | 4.2333E−06 | −1.5208E−07 | 0.0000E+00 |

Seventh Numerical Example

FIG. 25 illustrates the lens assembly 100-7 of the seventh numerical example according to an embodiment of the disclosure, and Table 19 shows, for example, design data of the seventh numerical example.

F: 10.2 mm to 22.7 mm, FNO: 3.1 to 5.2, 2w=28.6° to 12.8°

TABLE 19

| Lens Surface | R | Dn | Nd | Vd | fn |
|---|---|---|---|---|---|
| obj | infinity | infinity | | | |
| S1* | −52.971 | 0.62 | 1.694 | 53.2 | −12.3 |
| S2* | 10.179 | 0.11 | | | |
| S3* | 9.142 | 0.97 | 1.671 | 19.23 | 39.6 |
| S4* | 13.352 | D1 | | | |
| S5 (ST) | 4.694 | 1.70 | 1.497 | 81.56 | 8.5 |
| S6* | −35.742 | 1.20 | | | |
| S7* | 26.644 | 1.59 | 1.544 | 56.09 | 9.9 |
| S8* | −6.606 | D2 | | | |
| S9* | −10.629 | 0.84 | 1.635 | 23.89 | −10.3 |
| S10* | 17.611 | 3.36 | | | |
| S11* | −9.541 | 1.70 | 1.671 | 19.23 | 16.7 |
| S12* | −5.514 | 0.42 | | | |

TABLE 19-continued

| Lens Surface | R | Dn | Nd | Vd | fn |
|---|---|---|---|---|---|
| S13* | −4.939 | 0.91 | 1.535 | 55.71 | −8.1 |
| S14* | 37.656 | D3 | | | |
| S18 | infinity | 0.21 | 1.517 | 64.2 | |
| S19 | infinity | 0.60 | | | |
| IMG | infinity | — | | | |

Table 20 shows intervals between the lens groups changed during zooming in the seventh numerical example.

TABLE 20

| | Wide Angle End | Telephoto Angle End |
|---|---|---|
| D1 | 7.10 | 0.75 |
| D2 | 3.36 | 2.32 |
| D3 | 2.37 | 9.75 |

Table 21 shows aspherical coefficients in the seventh numerical example.

TABLE 21

| Lens Surface | K (Conic) | A (4th) | B (6th) | C (8th) | D (10th) |
|---|---|---|---|---|---|
| S4 | 36.8605 | 2.2793E−05 | −9.2074E−05 | 2.8539E−06 | −2.9880E−07 |
| S5 | 0.1522 | 3.2167E−04 | −1.3037E−04 | −6.8380E−06 | 5.0384E−07 |
| S6 | 0.4909 | −9.4396E−04 | −6.5768E−05 | 6.0120E−06 | 0.0000E+00 |
| S7 | 0.2853 | −1.2958E−03 | −7.3299E−06 | 7.9475E−06 | 6.7123E−07 |
| S8 | −0.1643 | −8.7655E−04 | −3.7689E−05 | −8.6862E−06 | 8.0573E−07 |
| S9 | −36.6639 | −8.3382E−04 | −2.4370E−05 | 2.6251E−06 | 5.9628E−07 |
| S10 | −33.1133 | −7.6385E−04 | 6.4252E−06 | 1.8676E−05 | 6.9112E−06 |
| S11 | −7.0630 | −1.3614E−04 | −1.9116E−04 | 2.9177E−05 | 5.2806E−06 |
| S12 | −2.1177 | 9.5291E−04 | −5.4293E−05 | −3.3937E−05 | 2.9454E−07 |
| S13 | −90.0000 | 2.6797E−03 | 1.2615E−04 | −1.4977E−05 | −7.1308E−06 |
| S14 | −33.8690 | −2.0770E−04 | 1.9320E−03 | −2.6234E−03 | 2.9916E−03 |
| S15 | −15.3478 | −5.7216E−03 | 3.1410E−03 | −3.9798E−03 | 4.6578E−03 |
| S16 | −44.4624 | −5.3371E−02 | 3.6862E−02 | −3.3436E−02 | 2.6835E−02 |
| S17 | 90.0000 | −1.0374E−02 | 4.8276E−04 | 8.4272E−04 | −4.1097E−04 |

| Lens Surface | E (12th) | F (14th) | G (16th) | H (18th) | J (20th) |
|---|---|---|---|---|---|
| S4 | 8.8127E−08 | 0.0000E+00 | 0.0000E+00 | 0.0000E+00 | 0.0000E+00 |
| S5 | 1.7262E−07 | 0.0000E+00 | 0.0000E+00 | 0.0000E+00 | 0.0000E+00 |
| S6 | 0.0000E+00 | 0.0000E+00 | 0.0000E+00 | 0.0000E+00 | 0.0000E+00 |
| S7 | −1.7727E−07 | 0.0000E+00 | 0.0000E+00 | 0.0000E+00 | 0.0000E+00 |
| S8 | −4.5611E−08 | 0.0000E+00 | 0.0000E+00 | 0.0000E+00 | 0.0000E+00 |
| S9 | −6.5659E−08 | 0.0000E+00 | 0.0000E+00 | 0.0000E+00 | 0.0000E+00 |
| S10 | −9.8277E−07 | 0.0000E+00 | 0.0000E+00 | 0.0000E+00 | 0.0000E+00 |
| S11 | −1.1559E−06 | 0.0000E+00 | 0.0000E+00 | 0.0000E+00 | 0.0000E+00 |
| S12 | 7.3424E−07 | 0.0000E+00 | 0.0000E+00 | 0.0000E+00 | 0.0000E+00 |
| S13 | 3.2338E−06 | −2.1916E−07 | 0.0000E+00 | 0.0000E+00 | 0.0000E+00 |
| S14 | −2.0753E−03 | 8.3015E−04 | −1.7696E−04 | 1.5507E−05 | 0.0000E+00 |
| S15 | −3.1428E−03 | 1.1670E−03 | −2.2245E−04 | 1.6929E−05 | 0.0000E+00 |
| S16 | −1.5536E−02 | 5.8321E−03 | −1.3100E−03 | 1.5728E−04 | −7.6430E−06 |
| S17 | 1.5157E−05 | 4.7730E−05 | −1.5166E−05 | 1.7593E−06 | −6.6076E−08 |

Eighth Numerical Example

FIG. 29 illustrates the lens assembly 100-8 of the eighth numerical example according to an embodiment of the disclosure, and Table 22 shows, for example, design data of the eighth numerical example.

f: 10.1 mm to 22.7 mm, FNO: 3.1 to 5.2, 2w=29.0° to 12.9°

TABLE 22

| Lens Surface | R | Dn | Nd | Vd | fn |
|---|---|---|---|---|---|
| obj | infinity | infinity | | | |
| S1* | −44.377 | 0.70 | 1.544 | 56.09 | −12.1 |
| S2* | 7.793 | 0.15 | | | |
| S3* | 9.033 | 0.89 | 1.923 | 20.88 | 36.7 |
| S4* | 11.731 | D1 | | | |
| S5 (ST) | 4.659 | 1.41 | 1.497 | 81.56 | 8.0 |
| S6* | −23.966 | 1.36 | | | |
| S7* | 81.044 | 1.38 | 1.544 | 56.09 | 11.0 |
| S8* | −6.441 | D2 | | | |
| S9* | −10.888 | 0.70 | 1.635 | 23.89 | −11.2 |
| S10* | 21.060 | 3.27 | | | |
| S11* | −9.392 | 1.80 | 1.671 | 19.23 | 19.4 |
| S12* | −5.875 | 0.52 | | | |

TABLE 22-continued

| Lens Surface | R | Dn | Nd | Vd | fn |
|---|---|---|---|---|---|
| S13* | −4.531 | 0.85 | 1.535 | 55.71 | −9.0 |
| S14* | −78.273 | D3 | | | |
| S18 | infinity | 0.21 | 1.517 | 64.2 | |
| S19 | infinity | 0.61 | | | |
| IMG | infinity | — | | | |

Table 23 shows intervals between the lens groups changed during zooming in the eighth numerical example.

TABLE 23

| | Wide Angle End | Telephoto Angle End |
|---|---|---|
| D1 | 7.38 | 0.75 |
| D2 | 3.27 | 2.11 |
| D3 | 2.59 | 10.37 |

Table 24 shows aspherical coefficients in the eighth numerical example.

TABLE 24

| Lens Surface | K (Conic) | A (4th) | B (6th) | C (8th) | D (10th) |
|---|---|---|---|---|---|
| S1 | 14.9571 | −2.6127E−04 | −6.1074E−05 | 7.9783E−07 | 1.2226E−06 |
| S2 | −0.6547 | 1.9130E−04 | −1.0345E−04 | 2.2202E−06 | 1.3916E−06 |
| S3 | 0.0000 | −1.1453E−03 | −3.5829E−05 | 2.4720E−06 | 7.5690E−07 |
| S4 | 0.0000 | −1.5096E−03 | −1.9428E−05 | 5.9502E−06 | 1.2873E−07 |
| S5 | −0.1473 | −8.0514E−04 | −4.3854E−05 | −3.4341E−06 | −1.3348E−07 |
| S6 | −46.4775 | −4.3692E−04 | 1.4072E−05 | 1.3988E−07 | 2.3220E−09 |
| S7 | 8.1063 | −3.1554E−04 | 1.2771E−04 | 1.7429E−05 | 6.1670E−06 |
| S8 | −4.6150 | −4.7076E−05 | −9.1078E−05 | 3.3345E−05 | 4.3405E−06 |
| S9 | −0.2629 | 1.3494E−03 | −7.5622E−05 | −3.2704E−05 | 1.4870E−06 |
| S10 | −89.7837 | 2.9687E−03 | 2.0254E−04 | −4.0389E−05 | −3.1872E−06 |
| S11 | −18.6098 | 2.3132E−02 | −2.8158E−04 | −1.3107E−04 | 3.5457E−04 |
| S12 | −12.9736 | −3.1658E−02 | −9.9490E−04 | −2.0496E−03 | −2.7340E−04 |
| S13 | −38.0882 | −3.2703E−01 | 4.1916E−02 | −9.4422E−03 | −9.6990E−04 |
| S14 | −49.4185 | −1.1310E−01 | 2.1247E−02 | −1.4849E−03 | −3.4915E−03 |

| Lens Surface | E (12th) | F (14th) | G (16th) | H (18th) | J (20th) |
|---|---|---|---|---|---|
| S1 | −5.9519E−08 | 0.0000E+00 | 0.0000E+00 | 0.0000E+00 | 0.0000E+00 |
| S2 | 3.9660E−08 | 0.0000E+00 | 0.0000E+00 | 0.0000E+00 | 0.0000E+00 |
| S3 | −1.0952E−07 | 0.0000E+00 | 0.0000E+00 | 0.0000E+00 | 0.0000E+00 |
| S4 | −1.4889E−07 | 0.0000E+00 | 0.0000E+00 | 0.0000E+00 | 0.0000E+00 |
| S5 | 0.0000E+00 | 0.0000E+00 | 0.0000E+00 | 0.0000E+00 | 0.0000E+00 |
| S6 | −1.6571E−09 | 0.0000E+00 | 0.0000E+00 | 0.0000E+00 | 0.0000E+00 |
| S7 | −8.6609E−07 | 0.0000E+00 | 0.0000E+00 | 0.0000E+00 | 0.0000E+00 |
| S8 | −1.0114E−06 | 0.0000E+00 | 0.0000E+00 | 0.0000E+00 | 0.0000E+00 |
| S9 | 6.2548E−07 | 0.0000E+00 | 0.0000E+00 | 0.0000E+00 | 0.0000E+00 |
| S10 | 3.1155E−06 | −2.2568E−07 | 0.0000E+00 | 0.0000E+00 | 0.0000E+00 |
| S11 | 2.9577E−04 | 1.6850E−04 | 7.6150E−05 | 1.9482E−05 | 0.0000E+00 |
| S12 | 5.1773E−04 | 6.7167E−04 | 4.6142E−04 | 1.1424E−04 | 0.0000E+00 |
| S13 | −2.4471E−03 | −2.1575E−04 | −2.2306E−05 | −1.5275E−05 | −5.1785E−05 |
| S14 | −1.8738E−03 | −6.1990E−04 | −9.1896E−05 | −7.6902E−05 | 0.0000E+00 |

Table 25 shows values of Inequality 1 to Inequality 6 in the lens assemblies of the first to eighth numerical examples.

TABLE 25

| | | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|
| Inequality 1 | TL/ft | 1.02 | 1.01 | 1.06 | 1.01 | 1.00 | 1.04 | 1.05 | 1.05 |
| Inequality 2 | ft/fw | 2.84 | 2.42 | 2.24 | 2.42 | 2.44 | 2.33 | 2.24 | 2.25 |
| Inequality 3 | f1/f3 | 1.42 | 1.51 | 1.42 | 1.26 | 0.98 | 1.05 | 1.18 | 1.12 |
| Inequality 4 | |f1|/fw | 2.06 | 1.85 | 1.84 | 1.78 | 1.64 | 1.51 | 1.69 | 1.72 |
| Inequality 5 | $\Sigma$vd_2G | 164 | 162 | 162 | 164 | 105 | 105 | 162 | 162 |
| Inequality 6 | $\beta$t/$\beta$3t | −0.32 | −0.32 | −0.33 | −0.38 | −0.49 | −0.58 | −0.41 | −0.40 |

The lens assembly according to an embodiment of the disclosure may be applied to, for example, an electronic apparatus employing an image sensor. The lens assembly according to an embodiment may be applied to various electronic apparatuses such as digital cameras, exchangeable lens cameras, video cameras, cellular phone cameras, compact mobile device cameras, VR, AR, drones, or unmanned aerial vehicles, and the like.

Figure 33:
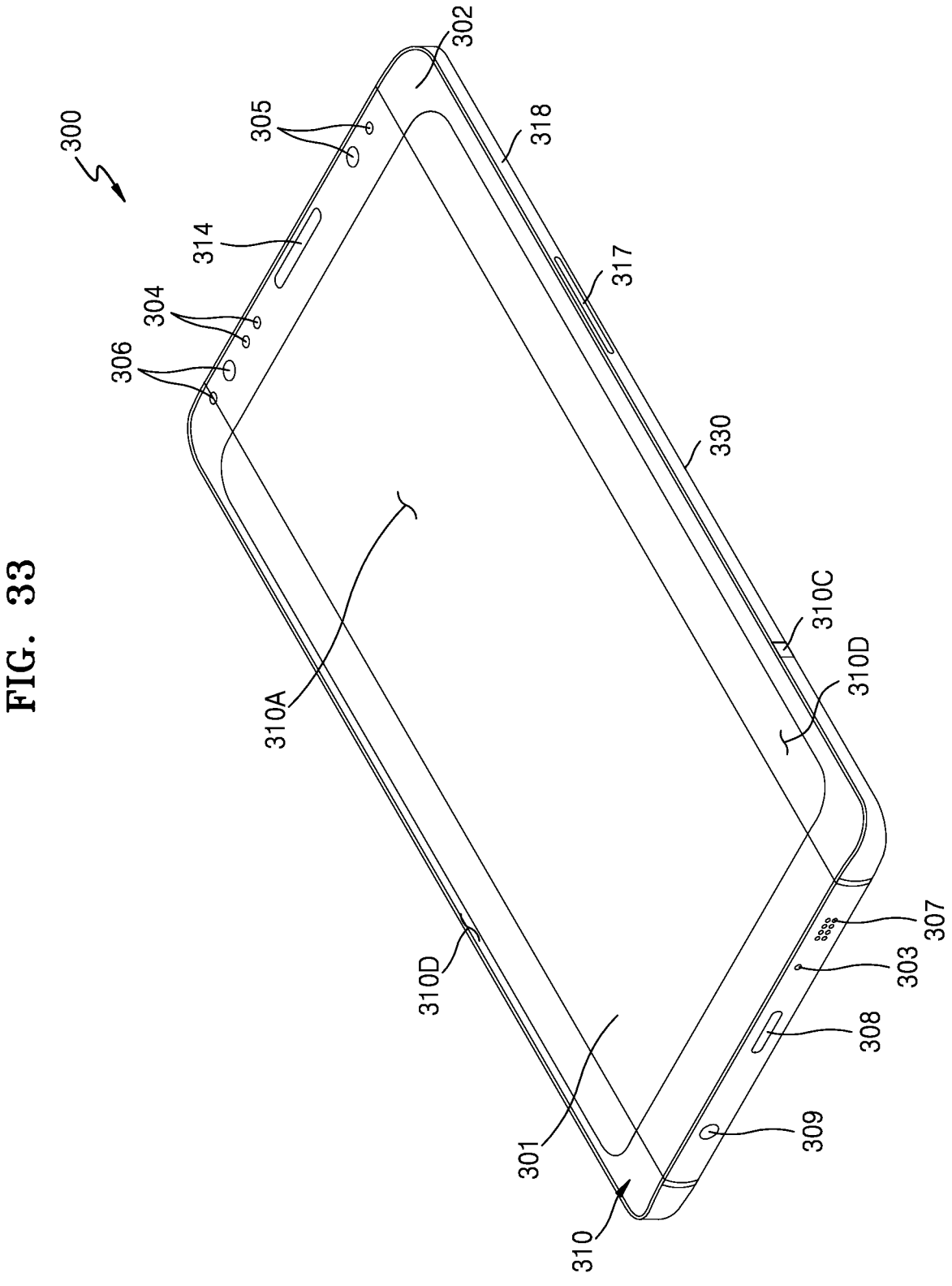
FIG. 33 illustrates a front side of a mobile device including a lens assembly according to an embodiment of the disclosure.
Figure 34:
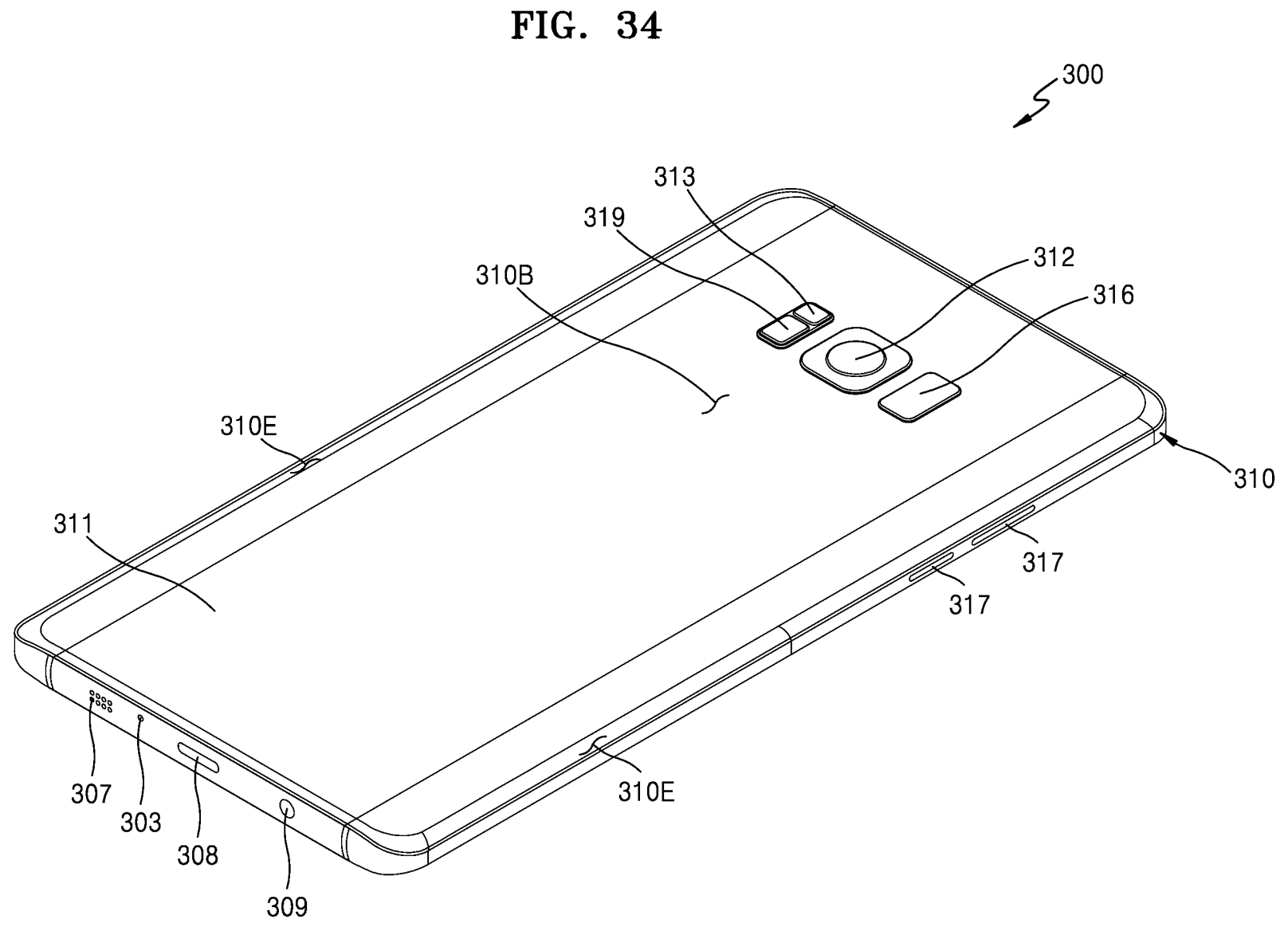

FIGS. 33 and 34 illustrate an example of an electronic apparatus 300 including a lens assembly, according to an embodiment. Although FIGS. 33 and 34 illustrate an example in which the electronic apparatus 300 is applied to a mobile phone, the disclosure is not limited thereto. FIG. 33 illustrates the front surface of a mobile phone, and FIG. 34 illustrates the back surface of the mobile phone.

The electronic apparatus 300 according to an embodiment of the disclosure may include a housing 310 including a first surface (or front surface) 310A, a second surface (or back surface) 310B, and a side surface 310C surrounding a space between the first surface 310A and the second surface 310B. In another embodiment (not shown), the housing 310 may refer to a structure forming part of the first surface 310A, the second surface 310B, and the side surface 310C. According to an embodiment of the disclosure, the first surface 310A may be formed by a front surface plate 302, at least part of which is substantially transparent, for example, a glass plate or polymer plate including various coating layers. In another embodiment of the disclosure, the front surface plate 302 is coupled to the housing 310 to form an internal space with the housing 310. In an embodiment of the disclosure, the internal space may refer to a space for accommodating at least part of a display 301, as a space inside the housing 310.

According to an embodiment of the disclosure, the second surface 310B may be formed by a back surface plate 311 that is substantially opaque. The back surface plate 311 may be formed of, for example, coated or colored glass, ceramic, polymer, metal, for example, aluminum, stainless steel STS, or magnesium, or a combination of at least two of the materials. The side surface 310C may be coupled to the front surface plate 302 and the back surface plate 311, and may be formed by a side surface bezel structure (or a side surface member) 318 including metal and/or polymer. In an embodiment of the disclosure, the back surface plate 311 and the side surface bezel structure 318 may be integrally formed and may include the same material, for example, a metal material such as aluminum.

In the illustrated embodiment, the front surface plate 302 may include, at opposite sides of the long edges of the front surface plate 302, two first regions 310D that are bent and seamlessly extend from the first surface 310A to the back surface plate 311. The back surface plate 311 may include, at opposite ends of the long edges, two second regions 310E that are bent and seamlessly extend from the second surface 310B to the front (ok surface plate 302. In an embodiment of the disclosure, the front surface plate 302 (or the back surface plate 311) may include only one of the first regions 310D (or the second regions 310E). In another embodiment of the disclosure, part of the first regions 310D or the second regions 310E may not be included. In the above-described embodiments of the disclosure, when viewed from the side surface 310C of the electronic apparatus 300(OK), the side surface bezel structure 318 may have a first thickness (or width) at a side surface that does not include the first region 310D or the second region 310E, for example, a side surface where a connector hole 308 is formed, and a second thickness less that the first thickness at a side surface including the first region 310D or the second region 310E, for example, a side surface where a key input device 317 is arranged.

According to an embodiment of the disclosure, the electronic apparatus 300 may include at least one of the display 301, audio modules 303, 307, and 314, sensor modules 304, 316, and 319, camera modules 305 and 312, the key input device 317, a light-emitting element 306, or connector holes 308 and 309. In an embodiment of the disclosure, the electronic apparatus 300 may omit at least one of the constituent elements, for example, the key input device 317 or the light-emitting element 306, or may additionally include other constituent elements.

The display 301 may be exposed through, for example, a considerable portion of the front surface plate 302. In an embodiment of the disclosure, the first surface 310A, and at least part of the display 301 may be exposed through the front surface plate 302 forming the first region 310D of the side surface 310C. In an embodiment of the disclosure, the corners of the display 301 may be formed to be substantially the same as the shape of an outline adjacent to the front surface plate 302. In another embodiment (not shown) of the disclosure, to extend the area for exposing the display 301, the outline of the display 301 may be formed to have substantially the same interval from the outline of the front surface plate 302.

In another embodiment (not shown) of the disclosure, a recess or opening is formed in part of a screen display area, for example, an active region, of the display 301, or an area output the screen display area, for example, an inactive area, and at least one of the audio module 314, the sensor module 304, the camera module 305, or the light-emitting element 306, which are aligned with the recess or the opening, may be provided. Alternatively, at least one of the audio module 314, the sensor module 304, the camera module 305, a fingerprint sensor 316, or the light-emitting element 306 may be provided on the back surface of the screen display area of the display 301. Alternatively, the display 301 may be coupled to or arranged adjacent to a touch sensing circuit, a pressure sensor for measuring the pressure of a touch, and/or a digitizer for detecting a stylus pen of a magnetic field type. In an embodiment of the disclosure, at least part of the sensor modules 304 and 319 and/or at least part of the key input device 317 may be arranged in the first regions 310D and/or the second regions 310E.

The audio modules 303, 307, and 314 may include the microphone hole 303 and the speaker holes 307 and 314. A microphone for obtaining external sound may be arranged in the microphone hole 303, and in an embodiment of the disclosure, a plurality of microphones may be arranged to sense the direction of sound. The speaker holes 307 and 314 may include an external speaker hole 307 and a call receiver hole 314. In an embodiment of the disclosure, the speaker holes 307 and 314 and the microphone hole 303 may be embodied as one hole, or a speaker, for example, a piezo speaker, may be included without the speaker holes 307 and 314.

The sensor modules 304, 316, and 319 may generate electrical signals or data values corresponding to the internal operating state or an external environment state of the electronic apparatus 300. The sensor modules 304, 316, and 319 may include, for example, the first sensor module 304, for example, a proximity sensor, and/or a second sensor module (not shown), for example, a fingerprint sensor, which are arranged on the first surface 310A of the housing 310, and/or the third sensor module 319, for example, an HRM sensor, and/or the fourth sensor module 316, for example, a fingerprint sensor, which are arranged on the second surface 310B of the housing 310. The fingerprint sensor may be arranged not only on the first surface 310A, for example, the display 301, but also on the second surface 310B of the housing 310. The electronic apparatus 300 may further include at least one of sensor modules, for example, a gesture sensor, a gyro sensor, a barometric sensor, a magnetic sensor, an acceleration sensor, a grip sensor, a color sensor, an IR sensor, a bio sensor, a temperature sensor, a humidity sensor, or an illuminance sensor, which are not illustrated.

The camera modules 305 and 312 may include a first camera module 305 arranged on the first surface 310A of the electronic apparatus 300, and a second camera module 312 arranged on the second surface 310B, and/or a flash 313. The camera modules 305 and 312 may include one or a plurality of lenses, image sensors, and/or image signal processors. For example, the camera modules 305 and 312 may include the lens assemblies according to an embodiment of the disclosure described with reference to FIGS. 1 to 24. The flash 313 may include, for example, a light-emitting diode or a xenon lamp. In an embodiment of the disclosure, two or more lenses (an IR camera, a wide angle lens, and a telephoto angle lens) and image sensors may be arranged on one surface of the electronic apparatus 300.

The key input device 317 may be arranged on the side surface 310C of the housing 310. In another embodiment of the disclosure, the electronic apparatus 300 may not include some or all of the key input devices 317, and the key input device 317 that is not included may be embodied in a different form such as a soft key on the display 301 and the like. In an embodiment of the disclosure, the key input device 317 may include the sensor module 316 arranged on the second surface 310B of the housing 310.

The light-emitting element 306 may be arranged, for example, on the first surface 310A of the housing 310. The light-emitting element 306 may provide, for example, state information of the electronic apparatus 300 in the form of light. In another embodiment of the disclosure, the light-emitting element 306 may provide, for example, a light source in association with the operation of the camera module 305. The light-emitting element 306 may include, for example, an LED, an IR LED, and a xenon lamp.

The connector holes 308 and 309 may include the first connector hole 308 for accommodating a connector, for example, a USB connector, to transceive power and/or data with respect to an external electronic apparatus, and/or a second connector hole 309, for example, an earphone jack, for accommodating a connector to transceive an audio signal with respect to the external electronic apparatus.

The electronic apparatus 300 illustrated in FIGS. 33 and 34 corresponds to an example, which does not limit the form of an apparatus to which the technical concept disclosed in this document is applied. The technical concept disclosed in this document may be applicable to various user devices including the first camera module 305 arranged on the first surface 310A, and the second camera module 312 arranged on the second surface 310B. For example, the technical concept disclosed in this document may be applied to a foldable electronic apparatus, a tablet, or a notebook that employs a flexible display and a hinge structure to be foldable in the latitudinal direction or longitudinal direction. Furthermore, the present technical concept may be applied to a case in which the first camera module 305 and the second camera module 312 are arranged to face different directions through rotation, folding, modification, and the like of an apparatus.

According to an embodiment of the disclosure, the electronic apparatus 300 that is illustrated may be part of a rollable electronic device. A "rollable electronic device" may refer to an electronic apparatus having a display, for example, the display 301 of FIG. 33, that is capable of bending so that at least part thereof may be wound or rolled, or accommodated into a housing, for example, the housing 310 of FIGS. 33 and 34. The rollable electronic device can be used by expanding a screen display area by unfolding the display or exposing a larger area of the display to the outside according to the user's needs.

FIG. 35 is a block diagram of the electronic apparatus 401 in a network environment 400, according to an embodiment of the disclosure. Referring to FIG. 35, in the network environment 400, the electronic apparatus 401 may communicate with an electronic apparatus 402 through a first network 498, for example, a short-range wireless communication network, or with at least one of an electronic apparatus 404 or a server 408 through a second network 499, for example, a long-range wireless communication network. According to an embodiment of the disclosure, the electronic apparatus 401 may communicate with the electronic apparatus 404 through the server 408. According to an embodiment of the disclosure, the electronic apparatus 401 may include the processor 420, a memory 430, an input module 450, a sound output module 455, a display module 460, an audio module 470, a sensor module 476, an interface 477, a connection terminal 478, a haptic module 479, a camera module 480, a power management module 488, a battery 489, a communication module 490, a subscriber identification module 496, or an antenna module 497. In an embodiment of the disclosure, in the electronic apparatus 401, at least one of the constituent elements, for example, the connection terminal 478, may be omitted, or one or more other constituent elements may be added. In an embodiment of the disclosure, some of the constituent elements, for example, the sensor module 476, the camera module 480, or the antenna module 497, may be integrated into one constituent element, for example, the display module 460.

The processor 420, by executing, for example, software, for example, the program 440, may control at least one of other constituent elements, for example, hardware or software constituent elements, of the electronic apparatus 401 connected to the processor 420, and may perform various data processing or operations. According to an embodiment of the disclosure, as at least part of the data processing or operations, the processor 420 may store a command or data received from other constituent elements, for example, the sensor module 476 or the communication module 490, in a volatile memory 432, process the command or data stored in the volatile memory 432, and store the resulting data in a non-volatile memory 434. According to an embodiment of the disclosure, the processor 420 may include a main processor 421, for example, a central processing unit or an application processor, or an auxiliary processor 423, for example, graphics processing unit, neural processing unit (NPU), image signal processor, sensor hub processor, or communication processor, which may be operated independently or together. For example, when the electronic apparatus 401 includes the main processor 421 and the auxiliary processor 423, the auxiliary processor 423 may be configured to use power lower than the main processor 421, or to be specified to a designated function. The auxiliary processor 423 may be embodied to be separated from the main processor 421 or as a part thereof.

The auxiliary processor 423 may control at least some of functions or states related to at least one of constituent elements of the electronic apparatus 401, for example, the display module 460, the sensor module 476, or the communication module 490, for example, instead of the main processor 421 when the main processor 421 is in an inactive state, for example, a sleep state, or with the main processor 421 when the main processor 421 is in an active state, for example, an application execution state. The auxiliary processor 423, for example, an image signal processor or a communication processor, may be implemented as a part of other functionally related constituent elements, for example, the camera module 480 or the communication module 490. According to an embodiment of the disclosure, the auxiliary processor 423, for example, a neural processing unit, may include a hardware structure specified to process an artificial intelligence model. An artificial intelligence model may be generated through machine learning. Such learning may be performed, for example, in the electronic apparatus 401 where an artificial intelligence model is performed, or through a separate server, for example, the server 408. A learning algorithm may include, for example, supervised learning, unsupervised learning, semi-supervised learning, or reinforcement learning, but the disclosure is not limited thereto. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more thereof, but the disclosure is not limited thereto. The artificial intelligence model may include additionally or alternatively a software structure in addition to the hardware structure.

The memory 430 may store various pieces of data used by at least one of constituent element of the electronic apparatus 401, for example, the processor 420 or the sensor module 476. The data may include, for example, software such as the program 440 and input data or output data regarding instructions related thereto. The memory 430 may include the volatile memory 432 or the non-volatile memory 434.

The program 440 may be stored as software in the memory 430 and may include, for example, an operating system 442, a middleware 444, or an application 446.

The input module 450 may receive instructions or data used for the constituent element of the electronic apparatus 401, for example, the processor 420, from the outside of the electronic apparatus 401, for example, from a user. The input module 450 may include, for example, a microphone, a mouse, or a keyboard, for example, a button, or a digital pen, for example, a stylus pen.

The sound output device 455 may output a sound signal to the outside of the electronic apparatus 401. The sound output device 455 may include, for example, a speaker or a receiver. A speaker may be used for a general purpose such as multimedia reproduction or recording reproduction. The receiver may be used for receiving an incoming call. The receiver may be implemented separated from or as a part of the speaker.

The display module 460 may visually provide information to the outside of the electronic apparatus 401, for example, to a user. The display module 460 may include, for example, a display, a hologram device, or a projector, and a control circuit for control any of the devices. The display module 460 may include a touch sensor configured to sense a touch, or a pressure sensor configured to measure the strength of a force generated by the touch.

The audio module 470 may convert sound to an electrical signal or reversely an electrical signal to sound. The audio module 470 may obtain sound through the input module 450 or output sound through the sound output device 455 or an external electronic apparatus, for example, the electronic apparatus 402 such as a speaker or a headphone, directly or wirelessly connected to the electronic apparatus 401.

The sensor module 476 may detect an operating state, for example, power or temperature, of the electronic apparatus 401, or an external environment state, for example, a user state, and generate an electrical signal or a data value corresponding to a detected state. The sensor module 476 may include, for example, a gesture sensor, a gyro sensor, a barometric pressure sensor, a magnetic sensor, an acceleration sensor, a grip sensor, a proximity sensor, a color sensor, an IR sensor, a biological sensor, a temperature sensor, a humidity sensor, or an illuminance sensor.

The interface 477 may support one or more designated protocols to be used for the electronic apparatus 401 to directly or wirelessly connect to the external electronic apparatus, for example, the electronic apparatus 402. The interface 477 may include, for example, a high definition multimedia interface (HDMI), a universal serial bus (USB) interface, an SD card interface, or an audio interface.

A connection terminal 478 may include a connector through which the electronic apparatus 401 is physically connected to the external electronic apparatus, for example, the electronic apparatus 402. The connection terminal 478 may include, for example, an HDMI connector, a USB connector, an SD card connector, or an audio connector, for example, a headphone connector.

The haptic module 479 may convert an electrical signal to a mechanical stimulus, for example, a vibration or a movement, which may be recognized by a user through a tactile sense or a sense of movement, or to an electrical stimulus. The haptic module 479 may include, for example, a motor, a piezoelectric device, or an electrical stimulation device.

The camera module 480 may photograph a still image and a video. The camera module 480 may include one or more lenses, image sensors, image signal processors, or flashes.

The power management module 488 may manage electric power supplied to the electronic apparatus 401 The power management module 488 may be implemented as, for example, at least a part of a power management integrated circuit (PMIC).

The battery 489 may supply electric power to at least one of the constituent elements of the electronic apparatus 401. The battery 489 may include, for example, non-rechargeable primary cells, rechargeable secondary cells, or fuel cells.

The communication module 490 may establish a direct communication channel, for example, a wired communication channel, or a wireless communication channel between the electronic apparatus 401 and the external electronic apparatus, for example, the electronic apparatus 402, the electronic apparatus 404, or the server 408, and support a communication through the established communication channel.

The communication module 490 may include one or more communication processors that are independently operated of the processor 420, for example, an application processor, and support a direct communication, for example, a wired communication, or a wireless communication. According to an embodiment, the communication module 490 may include a wireless communication module 492, for example, a cellular communication module, a short-range wireless communication module, or a global navigation satellite system (GNSS) communication module, or a wired communication module 494, for example, a LAN communication module, or a power line communication module. A communication module among the communication modules may communicate with the external electronic apparatus 404 through the first network 498, for example, a short-range communication network such as Bluetooth, wireless fidelity (WiFi) direct, or infrared data association (IrDA), or the second network 499, for example, a long-range communication network such as a cellular network, a 5G network, a next-generation communication network, the Internet, or a computer network such as LAN or WAN. These various types of communication modules may be implemented by being integrated into one constituent element, for example, a single chip, or as a plurality of separate constituent elements, for example, a plurality of chips. The wireless communication module 492 may check and approve the electronic apparatus 401 in a communication network such as the first network 498 or the second network 499 by using subscriber information, for example, the International Mobile Subscriber Identity (IMSI), stored in the subscriber identification module 496.

The wireless communication module 492 may support the 5G network after the 4G network and the next generation communication technology, for example, the new radio (NR) access technology. The NR access technology may support high-speed transmission of high-capacity data (enhanced mobile broadband (eMBB)), minimization of terminal power and access to multiple terminals (massive machine type communications (mMTC)), or high reliability and low delay (ultra-reliable and low-latency communications (URLLC)). The wireless communication module 492 may support, for example, a high frequency band, for example, an mmWave band, to achieve a high data rate. The wireless communication module 492 may support various technologies for securing performance in high-frequency bands, for example, beamforming, massive multiple-input and multiple-output (MIMO), full dimensional MIMO (FD-MIMO), array antenna, analog beam-forming, or large scale antenna. The wireless communication module 492 may support various requirements specified in the electronic apparatus 401, an external electronic apparatus, for example, the electronic apparatus 404, or a network system, for example, the second network 499. According to an embodiment of the disclosure, the wireless communication module 492 may support a peak data rate for eMBB realization, for example, 20 Gbps or more, loss coverage for mMTC realization, for example, 164 dB or less, or U-plane latency for URLLC realization, for example, a downlink (DL) and an uplink (UL) of 0.5 ms or less each, or a round trip of 1 ms or less.

The antenna module 497 may transmit a signal or power to the outside, for example, the external electronic apparatus, or receive the same from the outside. According to an embodiment of the disclosure, the antenna module 497 may include an antenna including a conductor formed on a substrate, for example, a PCB, or a radiator having a conductive pattern. According to an embodiment of the disclosure, the antenna module 497 may include a plurality of antennas, for example, an array antenna. In this case, at least one antenna suitable for a communication method used for a communication network such as the first network 498 or the second network 499 may be selected by, for example, the communication module 490 from among the antennas. The signal or power may be transmitted or received between the communication module 490 and the external electronic apparatus through the selected at least one antenna. According to an embodiment of the disclosure, a part other than the radiator, for example, a radio frequency integrated circuit (RFIC), may be additionally formed as part of the antenna module 497.

According to an embodiment of the disclosure, the antenna module 497 may form an mmWave antenna module. According to an embodiment of the disclosure, the mmWave antenna module may include a printed circuit board, an RFIC arranged on a first surface, for example, a lower surface, of the printed circuit board, or adjacent thereto, and capable of supporting a designated high frequency band, for example, a mmWave band, and a plurality of antennas, for example, an array antenna, arranged on a second surface of the printed circuit board, for example, an upper or side surface, or adjacent thereto, and capable of transmitting or receiving a signal of the designated high frequency band.

At least some of the above constituent elements may be connected to each other by a communication method between neighboring machines, for example, a bus, general purpose input and output (GPIO), a serial peripheral interface (SPI), or a mobile industry processor interface (MIPI), and may mutually exchange signals, for example, commands or data.

According to an embodiment of the disclosure, the commands or data may be transmitted or received between the electronic apparatus 401 and the external electronic apparatus 404 through the server 408 connected to the second network 499. Each external electronic apparatus 402 or 404 may be of the same type as or a different type from the electronic apparatus 401. According to an embodiment of the disclosure, all or some of the operations performed in the electronic apparatus 401 may be performed in one or more external apparatuses of the external electronic apparatuses 402, 404, and 408. For example, when the electronic apparatus 401 needs to perform a function or a service automatically or in response to a request from a user or another apparatus, the electronic apparatus 401 may request, rather than performing the function or the service by itself, or additionally, one or more external electronic apparatuses to perform at least part of the function or the service. The one or more external electronic apparatuses having received the request may perform at least part of the requested function or service, or an additional function or service related to the request, and transmit a result of the performance to the electronic apparatus 401. The electronic apparatus 401 may process the result, as it is or additionally, and provide the result as at least part of a response to the request. To this end, for example, cloud computing, distributed computing, mobile edge computing (MEC), or client-server computing technologies may be used. The electronic apparatus 401 may provide an ultra-low delay service by using, for example, the distributed computing or MEC. In another embodiment of the disclosure, the external electronic apparatus 404 may include an internet-of-things (IoT) machine. The server 408 may be an intelligent server using machine learning and/or a neural network. According to an embodiment of the disclosure, the external electronic apparatus 404 or the server 408 may be included in the second network 499. The electronic apparatus 401 may be applied to an intelligent service, for example, smart home, smart city, smart car, or health care, on the basis of 5G communication technologies and IoT related technologies.

Figure 36:
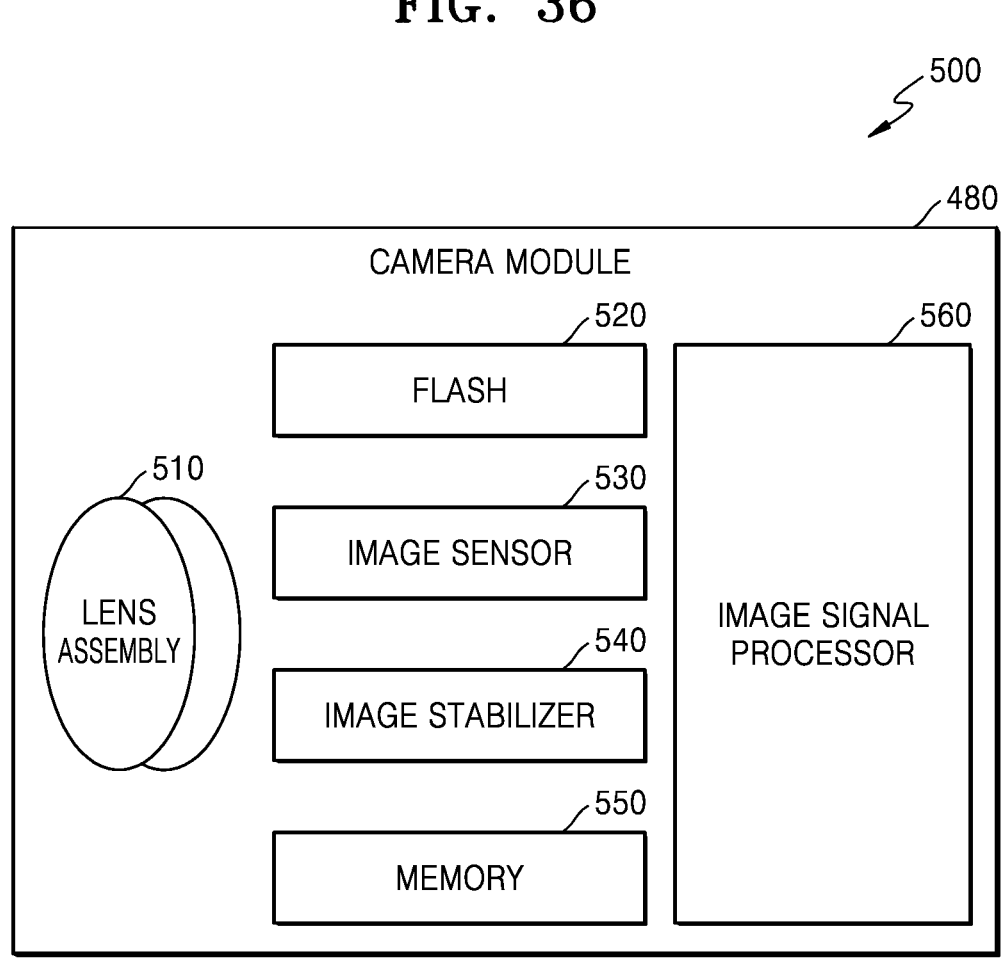
FIG. 36 is a block diagram of a camera module in the electronic apparatus, according to an embodiment of the disclosure.

FIG. 36 is a block diagram of the camera module 480 according to an embodiment of the disclosure. Referring to FIG. 36, the camera module 480 may include an optical lens assembly 510, a flash 520, an image sensor 530, an image stabilizer 540, a memory 550, for example, a buffer memory, and an image signal processor 560. The lens assembly 510 may collect light emitted from an object that is subject to image capturing. The lens assembly 510 may include one or more lenses. The embodiments described with reference to FIGS. 1 to 24 may be applied to the lens assembly 510. According to an embodiment of the disclosure, the camera module 480 may include a plurality of lens assemblies as the lens assembly 510. In this case, the camera module 480 may form, for example, a dual camera, a 360 degrees camera, or a spherical camera. Some of the optical lens assemblies 510 may have the same lens properties, for example, a viewing angle, a focal length, an automatic focus, an f number, or an optical zoom, or at least one of the lens assemblies 510 may have one or more lens properties different from the lens properties of other lens assemblies. The optical lens assembly 510 may include, for example, a wide angle lens or a telephoto angle lens.

The flash 520 may emit light used to reinforce the light emitted or reflected from an object. According to an embodiment of the disclosure, the flash 520 may include one or more light-emitting diodes, for example, red-green-blue (RGB) LED, a white LED, an IR LED, or an ultraviolet (UV) LED, or a xenon lamp. The image sensor 530 may convert the light emitted or reflected from the object and transmitted through the optical lens assembly 510 into an electrical signal, thereby acquiring an image corresponding to the object. According to an embodiment of the disclosure, the image sensor 530 may include one image sensor selected from among image sensors having different properties, for example, an RGB sensor, a black and white (BW) sensor, an IR sensor, or a UV sensor, a plurality of image sensors having the same properties, or a plurality of image sensors having different properties. Each image sensor included in the image sensor 530 may be implemented by using, for example, a charged coupled device (CCD) sensor or a complementary metal oxide semiconductor (CMOS) sensor.

The image stabilizer 540, in response to a movement of the camera module 480 or the electronic apparatus 401 including the optical lens assembly 510, may move at least one lens or the image sensor 530 included in the lens assembly 510 in a particular direction or control the operating properties, for example, read-out timing, of the image sensor 530. Accordingly, at least part of a negative effect on the captured image due to the movement may be compensated. According to an embodiment of the disclosure, the image stabilizer 540 may detect a movement of the camera module 480 or the electronic apparatus 401 by using a gyro sensor (not shown) or an acceleration sensor (not shown) arrange inside or outside the camera module 480. According to an embodiment of the disclosure, the image stabilizer 540 may be implemented by, for example, an optical image stabilizer. The memory 550 may at least temporarily store at least part of the image acquired through the image sensor 530 for the subsequent image processing task. For example, when the image acquisition is delayed according to a shutter or a plurality of images are acquired at high speed, the acquired original image, for example, a Bayer-patterned image or a high resolution image, is stored in the memory 550 and a copy image corresponding thereto, for example, a low resolution image, may be previewed through the display module 460. Then, when a designated condition, for example, a user input or a system command, is satisfied, at least part of the original image stored in the memory 550 may be acquired and processed by, for example, the image signal processor 560. According to an embodiment of the disclosure, the memory 550 may be configured as at least part of the memory 430, or as a separate memory that is operated independently.

The image signal processor 560 may perform one or more image processing on the image acquired through the image sensor 530 or stored in the memory 550. The one or more image processing may include, for example, depth map generation, three-dimensional modeling, panorama generation, feature point extraction, image synthesis, or image compensation, for example, noise reduction, resolution adjustment, brightness adjustment, blurring, sharpening, or softening. Additionally or alternatively, the image signal processor 560 may perform control, for example, exposure time control, read-out timing control, and the like, on at least one, for example, the image sensor 530, of the constituent elements included in the camera module 480. The image processed by the image signal processor 560 may be stored again in the memory 550 for the additional processing, or provided to a constituent element outside the camera module

480, for example, the memory 430, the display module 460, the electronic apparatus 402, the electronic apparatus 404, or the server 408. According to an embodiment of the disclosure, the image signal processor 560 may be configured as at least part of the processor 420, or a separate processor that is operated independently of the processor 420. When the image signal processor 560 includes the processor 420 and a separate processor, at least one image processed by the image signal processor 560 may be displayed through the display module 460 by the processor 420 as it is or after passing additional image processing.

According to an embodiment of the disclosure, the electronic apparatus 401 may include a plurality of camera modules having different properties or functions, as the camera modules 480. In this case, for example, at least one of the camera modules 480 may be a wide angle camera and at least the other may be a telephoto camera. Similarly, at least one of the camera modules 480 may be a front camera, and at least the other may be a rear camera.

According to an embodiment of the disclosure, in a lens assembly including a plurality of lenses that are arranged from an object side to an image side, the image side being where an image sensor is located, the lens assembly includes a first lens group having negative refractive power, a second lens group having positive refractive power, and a third lens group having negative refractive power, wherein, during zooming, the second lens group and the third lens group move to the object side, and the third lens group performs focusing, and the lens assembly satisfies the following inequalities, $$TL/ft<1.26 \text{ and}$$

$$ft/fw \geq 2.$$

In the inequalities, TL denotes a distance from an apex of an object side surface of a first lens to a surface of the image sensor, ft denotes a total focal length at a telephoto angle end, and fw denotes a total focal length at a wide angle end.

The first lens group and the third lens group may satisfy the following inequality, $$0.9 < f1/f3 < 1.7.$$

In the inequality, f1 denotes a focal length of the first lens group, and f3 denotes a focal length of the third lens group.

The first lens group may satisfy the following inequality, $$1.4 < |f1|/fw < 2.5.$$

In the inequality, f1 denotes the focal length of the first lens group, and fw denotes the total focal length at a wide angle end.

The first lens group may include a negative lens and a positive lens, the second lens group may include one or more positive lenses and one negative lens, and the third lens group may include a positive lens and one or more negative lenses.

The first lens group may include a bi-concave lens arranged closest to the object side, and a meniscus lens convex to the object side and arranged at the image side of the bi-concave lens.

The first lens group may include two aspherical plastic lenses or an aspherical glass lens.

The first lens group may include a compound lens in which a negative lens and a positive lens are bonded to each other.

The negative lens and the positive lens may be spherical glass lenses.

The first lens group may include a negative lens and a positive lens, and the negative lens or the positive lens may be a spherical glass lens.

The lens assembly may satisfy the following inequality, $$\Sigma vd\_2G \geq 80.$$

In the inequality, $\Sigma vd\_2G$ denotes a sum of the Abbe numbers of all lenses included in the second lens group.

The lens assembly may satisfy the following inequality, $$-0.7 \leq \beta 2t/\beta 3t \leq -0.28.$$

In the inequality, $\beta 2t$ denotes image forming magnification of the second lens group at the telephoto angle end, and $\beta 3t$ denotes image forming magnification of the third lens group at the telephoto angle end.

The third lens group may include a positive lens and one or more negative lenses.

All lenses included in the third lens group may be aspherical plastic lenses.

The lens assembly may further include a reflection member disposed at the object side of the first lens group.

The reflection member may perform image stabilization.

An electronic apparatus according to an embodiment of the disclosure includes a lens assembly, at least one camera configured to acquire information about an object from light incident through the lens assembly, and an image signal processor configured to process an image of the object on the basis of the information, wherein the lens assembly includes a first lens group having negative refractive power, a second lens group having positive refractive power, and a third lens group having negative refractive power, the first to third lens groups being arranged from an object side to an image side, the image side being where an image sensor is located, wherein, during zooming, the second lens group and the third lens group move to the object side, and the third lens group performs focusing, wherein the lens assembly satisfies the following inequalities, $$TL/ft<1.26 \text{ and}$$

$$ft/fw \geq 2.$$

In the inequalities, TL denotes a distance from an apex of an object side surface of a first lens to a surface of the image sensor, ft denotes a total focal length at a telephoto angle end, and fw denotes a total focal length at a wide angle end.

The embodiment disclosed in this document is presented for explanation and understanding of the disclosed technology, and does not limit the scope of the technology described in this document. Accordingly, the scope of this document should be construed to include all changes or various other embodiments based on the technical concept of this document. The above-described embodiments are merely exemplary, and various modifications and equivalent other embodiments are possible from those skilled in the art to which the present technology pertains to. Accordingly, the true technical protection scope according to the embodiment of the disclosure will be determined by the technical concept of the disclosure defined in the claims below.

The invention claimed is:

1. A lens assembly comprising a plurality of lenses that are arranged from an object side to an image side, the image side being where an image sensor is located, wherein the plurality of lenses includes a first lens group having negative refractive power, a second lens group having positive refractive power, and a third lens group having negative refractive power, wherein, during zooming, the second lens group and the third lens group move to the object side, and the third lens group performs focusing, wherein the first lens group comprises two aspherical plastic lenses, wherein the lens assembly satisfies inequalities:

$1 < TL/ft < 1.1$ and $ft/fw \geq 2$, wherein TL denotes a distance from an apex of an object side surface of a first lens to a surface of the image sensor, ft denotes a total focal length at a telephoto angle end, and fw denotes a total focal length at a wide angle end, wherein the lens assembly satisfies an inequality:

$-0.7 \leq \beta 2t/\beta 3t \leq -0.28$, wherein $\beta 2t$ denotes image forming magnification of the second lens group at the telephoto angle end, and $\beta 3t$ denotes image forming magnification of the third lens group at the telephoto angle end.

2. The lens assembly of claim 1, wherein the first lens group and the third lens group satisfy an inequality:

$0.9 < f1/f3 < 1.7$, wherein f1 denotes a focal length of the first lens group, and f3 denotes a focal length of the third lens group.

3. The lens assembly of claim 1, wherein the first lens group satisfies an inequality:

$1.4 < |f1|/fw < 2.5$, wherein f1 denotes a focal length of the first lens group.

4. The lens assembly of claim 1, wherein the first lens group comprises a negative lens and a positive lens, the second lens group comprises one or more positive lenses and one negative lens, and the third lens group comprises a positive lens and one or more negative lenses.

5. The lens assembly of claim 1, wherein the first lens group comprises a bi-concave lens arranged closest to the object side and a meniscus lens convex to the object side and arranged at the image side of the bi-concave lens.

6. The lens assembly of claim 1, wherein the first lens group comprises a compound lens in which a negative lens and a positive lens are bonded to each other.

7. The lens assembly of claim 6, wherein the negative lens and the positive lens are spherical glass lenses.

8. The lens assembly of claim 1, wherein the first lens group comprises a negative lens and a positive lens, and the negative lens or the positive lens is a spherical glass lens.

9. The lens assembly of claim 1, wherein the third lens group comprises a positive lens and one or more negative lenses.

10. The lens assembly of claim 9, wherein all lenses included in the third lens group are aspherical plastic lenses.

11. The lens assembly of claim 1, further comprising a reflection member disposed at the object side of the first lens group.

12. The lens assembly of claim 11, wherein the reflection member performs image stabilization.

13. An electronic apparatus comprising:

a lens assembly;

at least one camera configured to acquire information about an object from light incident through the lens assembly; and an image signal processor configured to process, based on the information, an image of the object, wherein the lens assembly comprises a first lens group having negative refractive power, a second lens group having positive refractive power, and a third lens group having negative refractive power, the first to third lens groups being arranged from an object side to an image side, the image side being where an image sensor is located, wherein, during zooming, the second lens group and the third lens group move to the object side, and the third lens group performs focusing, wherein the first lens group comprises two aspherical plastic lenses, wherein the lens assembly satisfies inequalities:

$1 < TL/ft < 1.1$ and $ft/fw \geq 2$, wherein TL denotes a distance from an apex of an object side surface of a first lens to a surface of the image sensor, ft denotes a total focal length at a telephoto angle end, and fw denotes a total focal length at a wide angle end, wherein the lens assembly satisfies an inequality:

$-0.7 \leq \beta 2t/\beta 3t \leq -0.28$, wherein $\beta 2t$ denotes image forming magnification of the second lens group at the telephoto angle end, and $\beta 3t$ denotes image forming magnification of the third lens group at the telephoto angle end.

14. The electronic apparatus of claim 13, wherein the first lens group and the third lens group satisfy an inequality:

$0.9 < f1/f3 < 1.7$, wherein f1 denotes a focal length of the first lens group, and f3 denotes a focal length of the third lens group.

15. The electronic apparatus of claim 13, wherein the first lens group satisfies an inequality:

$1.4 < |f1|/fw < 2.5$, wherein f1 denotes a focal length of the first lens group.

16. The electronic apparatus of claim 13, wherein the first lens group comprises a bi-concave lens arranged closest to the object side and a meniscus lens convex to the object side and arranged at the image side of the bi-concave lens.

17. The electronic apparatus of claim 13, wherein the first lens group comprises a compound lens in which a negative lens and a positive lens are bonded to each other, and the negative lens and the positive lens are spherical glass lenses.

18. The electronic apparatus of claim 13, wherein the lens assembly further comprises a reflection member disposed at the object side of the first lens group.

19. The electronic apparatus of claim 18, wherein the reflection member performs image stabilization.

* * * * *